US008008606B2

(12) United States Patent
Kaiserman et al.

(10) Patent No.: US 8,008,606 B2
(45) Date of Patent: Aug. 30, 2011

(54) COMPOSITE HEATING ELEMENT WITH AN INTEGRATED SWITCH

(75) Inventors: Terrance Kaiserman, Loxahatchee, FL (US); John Gentile, Montclair, NJ (US); Anthony Gentile, New York, NY (US)

(73) Assignee: T-Ink, Inc., New York, NY (US)

( * ) Notice: Subject to any disclaimer, the term of this patent is extended or adjusted under 35 U.S.C. 154(b) by 558 days.

(21) Appl. No.: 11/867,600

(22) Filed: Oct. 4, 2007

(65) Prior Publication Data

US 2008/0083740 A1 Apr. 10, 2008

Related U.S. Application Data

(60) Provisional application No. 60/849,418, filed on Oct. 4, 2006.

(51) Int. Cl.
*H04B 3/06* (2006.01)
*H05B 3/34* (2006.01)

(52) U.S. Cl. ........ 219/520; 219/211; 219/212; 219/528; 219/529; 219/540; 219/542; 219/544; 219/545; 219/546; 219/548; 219/549; 219/552; 219/553

(58) Field of Classification Search .................. 219/520, 219/211–2, 528–9, 540, 542–9, 552–3
See application file for complete search history.

(56) References Cited

U.S. PATENT DOCUMENTS

| | | | |
|---|---|---|---|
| 2,188,396 | A | 1/1940 | Semon |
| 4,250,397 | A | 2/1981 | Gray et al. |
| 4,534,886 | A | 8/1985 | Kraus et al. |
| 4,626,664 | A | 12/1986 | Grise |
| 4,656,339 | A | 4/1987 | Grise |
| 5,432,322 | A | 7/1995 | Ingram et al. |
| 5,445,749 | A | 8/1995 | Hong |
| 5,565,124 | A | 10/1996 | Balzano |
| 5,626,948 | A | 5/1997 | Ferber et al. |
| 5,893,991 | A | 4/1999 | Newell |
| 5,973,420 | A | 10/1999 | Kaiserman et al. |
| 6,093,910 | A | 7/2000 | McClintock et al. |
| 6,194,692 | B1 | 2/2001 | Oberle |
| 6,311,350 | B1 | 11/2001 | Kaiserman et al. |
| 6,641,860 | B1 | 11/2003 | Kaiserman et al. |
| 6,664,860 | B2 | 12/2003 | Fallisgaard et al. |

(Continued)

OTHER PUBLICATIONS

Office Action from U.S. Appl. No. 11/867,591 mailed Feb. 4, 2010.

(Continued)

*Primary Examiner* — Shawntina Fuqua
(74) *Attorney, Agent, or Firm* — Lerner, David, Littenberg, Krumholz & Mentlik, LLP

(57) ABSTRACT

The present invention provides a composite heating element suitable for heating an article when activated by a power source. The composite heating element comprises a first backing layer and a discontinuous circuit formed of a conductive material disposed on the first backing layer. The discontinuous circuit has terminal ends for electrical connection with the power source and defines at least one gap between the terminal ends. The composite article further comprises a second backing layer spaced from the first backing layer. A trace formed of a conductive material is disposed on the second backing layer. The trace is aligned with the at least one gap for forming a complete circuit when the first and second backing layers at least partially abut each other with the trace extending across the gap and contacting the discontinuous circuit.

25 Claims, 22 Drawing Sheets

U.S. PATENT DOCUMENTS

| | | | |
|---|---|---|---|
| 6,748,646 | B2 * | 6/2004 | Von Arx et al. ................. 29/613 |
| 6,875,963 | B2 | 4/2005 | Rock et al. |
| 7,131,187 | B2 | 11/2006 | Check et al. |
| 2002/0148827 | A1 | 10/2002 | Watanabe et al. |
| 2002/0170902 | A1 | 11/2002 | Check et al. |
| 2002/0185483 | A1 | 12/2002 | Check et al. |
| 2004/0100131 | A1 | 5/2004 | Howick et al. |
| 2004/0149732 | A1 | 8/2004 | Usui et al. |
| 2005/0017295 | A1 | 1/2005 | Kim et al. |
| 2005/0231879 | A1 | 10/2005 | Gentile et al. |
| 2007/0084293 | A1 | 4/2007 | Kaiserman et al. |

OTHER PUBLICATIONS

Office Action from U.S. Appl. No. 11/867,606 mailed Aug. 19, 2010.

* cited by examiner

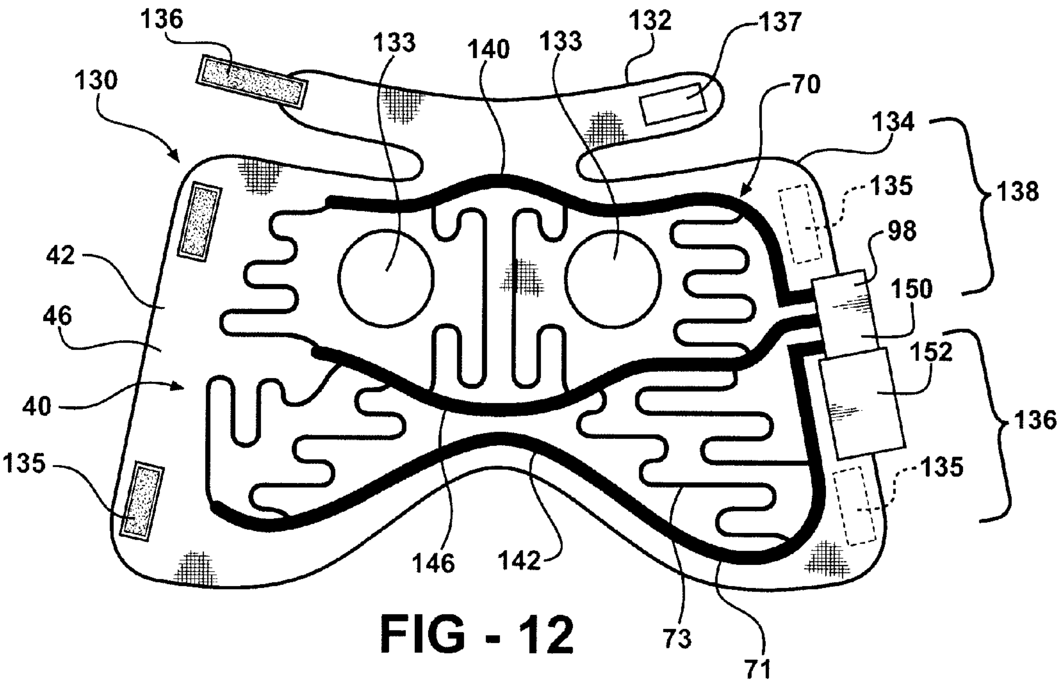
FIG - 12
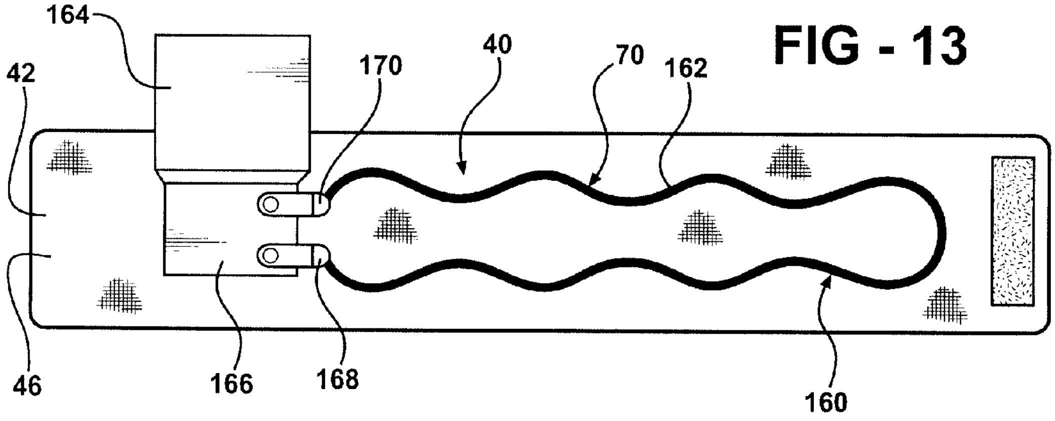
FIG - 13
FIG - 14
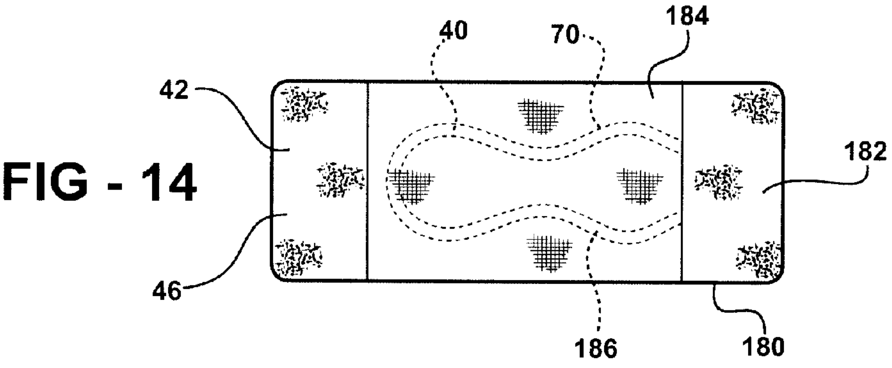

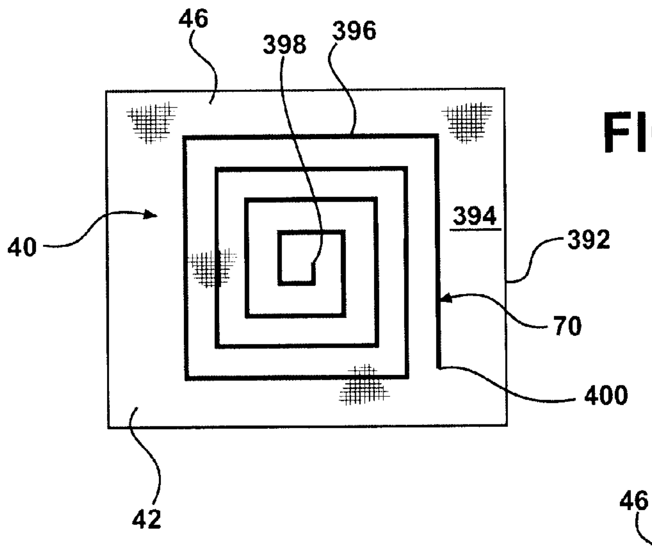
FIG - 22
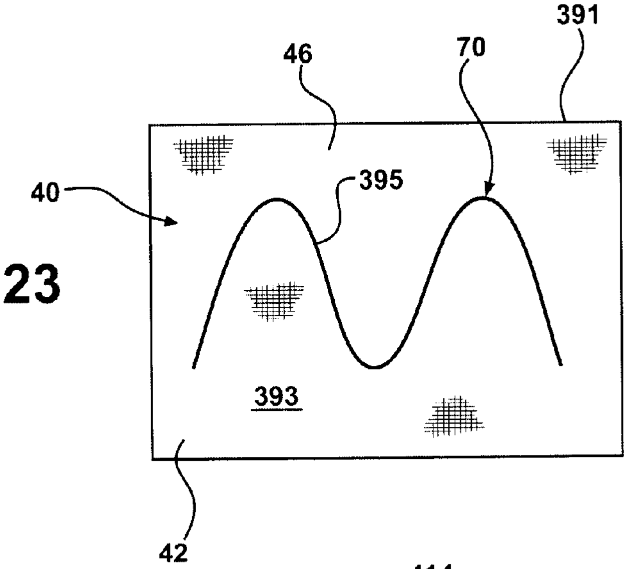
FIG - 23
FIG - 24
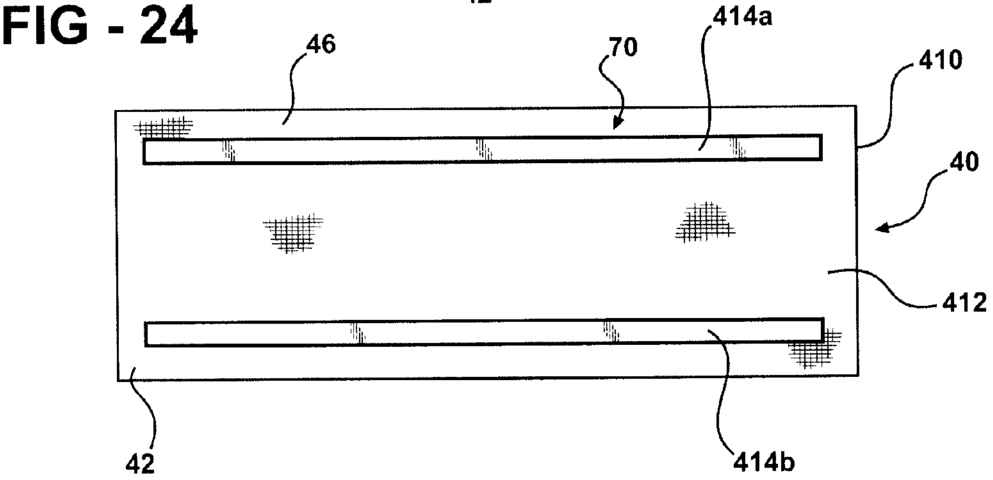

FIG - 32
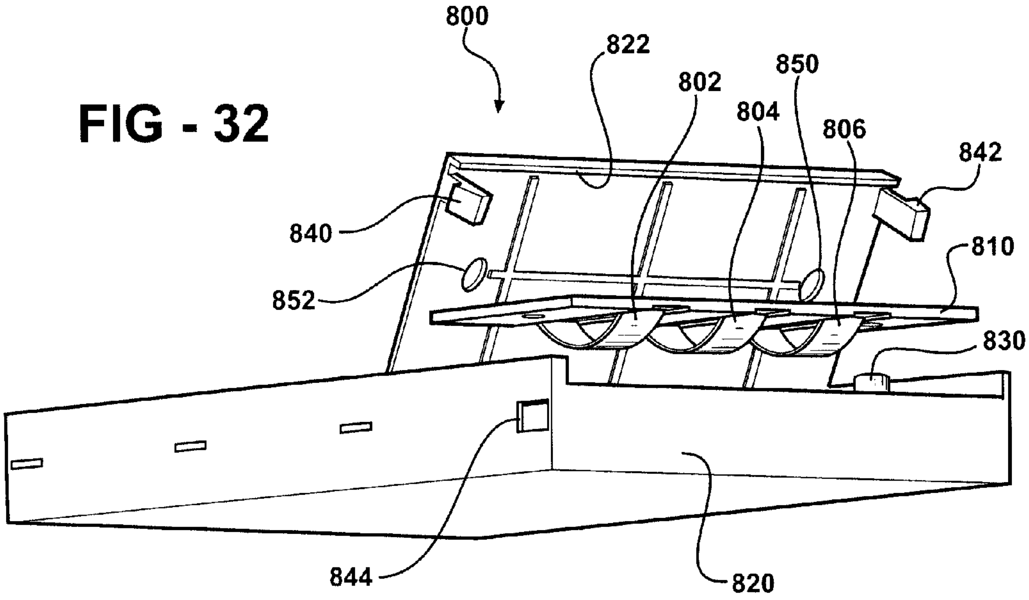
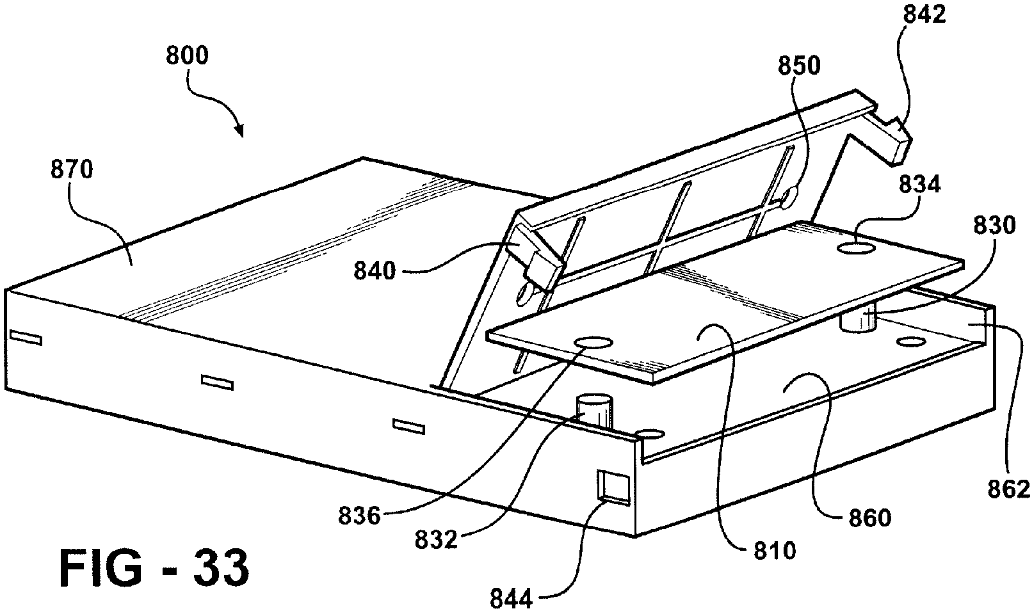
FIG - 33

COMPOSITE HEATING ELEMENT WITH AN INTEGRATED SWITCH

CROSS REFERENCE TO RELATED APPLICATIONS

This application claims the benefit of U.S. Provisional Patent Application Ser. No. 60/849,418 filed on Oct. 4, 2006 and incorporated herewith in its entirety.

FIELD OF THE INVENTION

The present invention generally relates to a composite heating element, and, more specifically, to a composite heating element suitable for heating an article when activated by a power source, and to an article including the composite heating element.

DESCRIPTION OF THE RELATED ART

Articles having heating elements to heat a wearer of the article, such as heated jackets and vests, are well known in the art. Many of these articles have a heating element to heat one zone of the article, e.g. a back side of the article, while other articles have two or more heating elements to heat two or more zones of the article, e.g. a left and right side of the article. The heating elements are generally powered by one or more batteries to power the heating elements and thereby initiate heating of the article. The aforementioned articles generally include a controller to turn power supplied to the heating elements "on" or "off", or optionally, allow entry of a desired temperature setting by the wearer of the article, such as "low" or "high". Size of both the heating elements and the batteries generally determines a maximum heating potential, i.e., a maximum temperature, of the article, and a total time that the batteries can provide power for heating the article.

Typically, a larger heating element, or a plurality of smaller heating elements, requires a larger battery to reach a desired temperature. Larger batteries are heavy, bulky, aesthetically displeasing, functionally awkward, and may be potentially hazardous to the wearer of the article. A smaller battery may be used to overcome many of these problems, however, the total time of heating the article is reduced accordingly.

To overcome this reduced heating time problem, some articles include separate smaller batteries for heating individual zones of the article as, for example, described in U.S. Pat. No. 5,893,991 to Newell (the '991 patent). The '991 patent generally describes a vest or jacket having a left and right side. Each side of the vest or jacket includes a heating element formed from an insulated wire and a corresponding battery electrically connected thereto. A wearer of the vest or jacket can control the heating of the left and right side separately. However, the wearer of the vest or jacket of the '991 patent must constantly monitor and control each side of the vest or jacket to obtain a desired temperature of the vest or jacket. Further, the wearer is unaware of how much heating time remains for each zone, i.e., how much power each individual battery can still provide each zone over extended use. For example, one side of the vest or jacket can abruptly stop heating altogether, while the remaining side is still heating the wearer.

To address the problem of total heating time being reduced, some articles include a heating element that automatically cycles on and off in an effort to extend an apparent total heating time of the heating element as, for example, described in U.S. Pat. No. 6,875,963 to Rock (the '963 patent). The '991 patent generally describes a jacket having a composite heating element including an oscillator chip (or other timing or cycling device) for cycling application of power from the battery to the heating element, which extends life of the battery. As an example, the '963 patent describes a timing cycle of three minutes "on" following by one minute "off" of the heating element. A wearer of the jacket is, however, not able to control the oscillator chip, which may cycle in a manner that is uncomfortable for the wearer. For example, when the heating element is "off", the wearer may quickly become cold during this down time, such as while the wearer is skiing. Further, devices such as the oscillator chip increases cost of the articles that utilize them and such devices can fail over time. The failures can occur with normal use over time or with exposure to impact or moisture, which requires repair or replacement of the device, if not replacement of the entire article.

Accordingly, there remains an opportunity to provide composite heating elements that overcome one or more of the aforementioned problems.

SUMMARY OF THE INVENTION AND ADVANTAGES

The present invention generally relates to a composite heating element, and, more specifically, to a composite heating element suitable for heating an article when activated by a power source. The composite article comprises a first backing layer and a discontinuous circuit formed of a conductive material disposed on the first backing layer. The discontinuous circuit has terminal ends for electrical connection with the power source and defines at least one gap between the terminal ends. The composite article further comprises a second backing layer spaced from the first backing layer. A trace formed of a conductive material is disposed on the second backing layer. The trace is aligned with the at least one gap for forming a complete circuit when the first and second backing layers at least partially abut each other with the trace extending across the gap and contacting the discontinuous circuit.

The discontinuous circuit of the composite heating element of the present invention allows for excellent conservation of battery power, reduction of battery size, and flexibility in using a plurality of the composite heating elements and locations thereof. The discontinuous circuit of the composite heating element also allows for selectively heating one or more heating zones, provides uniform and consistent heating of one or more heating zones, and allows for excellent flexibility in using various power sources and locations thereof.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 12 is a perspective view of a heated dog jacket employing an embodiment of the composite heating element;

FIG. 13 is a perspective view of an embodiment of the heating element comprising a conductive layer having conductive material particles dispersed therein;

FIG. 14 is a perspective view of a heated bandage including a heating element (in phantom);

FIG. 22 is a plan view of a heating element comprising an inherently conductive fabric;

FIG. 23 is a plan view of another embodiment of the heating element comprising an inherently conductive fabric;

FIG. 24 is a plan view of another embodiment of the heating element comprising an inherently conductive fabric;

FIG. 32 is a perspective view of a control module housing and battery housing showing spring contacts for interfacing the heating elements; and FIG. 33 is another view of the control module housing and battery housing of FIG. 32 showing a pressure surface for the spring contacts to interface with heating elements.

DETAILED DESCRIPTION OF THE INVENTION

The present invention provides heating elements suitable for heating an article when activated by a power source. The article may be any type of article known in the art. Non-limiting examples of suitable articles, for purposes of the present invention, include, but are not limited to, jackets, vests, shirts, pants, shorts, bibs, coveralls, seats, mattresses, mattress-pads, pads, sleeping-bags, shoes, boots, ski-boots, snowboard-boots, waders, socks, mittens, gloves, hats, scarves, headbands, ear-muffs, underwear, bandages, neck-gators, face-masks, balaclavas, wetsuits, drysuits, hoods, helmets, wraps, bandages, sheets, blankets, pillows, pillow-cases, comforters, duvet-covers, bags, containers, carpet, flooring, wallboard, and ceiling tile. The composite heating elements are especially suitable for articles worn, such as jackets, gloves, hats, boots, wraps, and bandages. The composite heating elements are also especially suitable for articles laid upon, such as mattresses, beds, and pet beds, e.g. dog beds. Some of the aforementioned articles will be described in further detail below.

The power source may be any type of power source known in the electrical art. Suitable power sources, for purposes of the present invention, include power sources that provide DC power, e.g. disposable and rechargeable batteries, and/or power sources that provide AC power. In one embodiment, the power source is a DC power source providing from about 1.5 to about 48V, more typically from about 3 to about 24V; however, it is to be appreciated that the power source may provide lower or higher voltages. The power source should be able to provide adequate current, voltage, and power, depending on specific applications and requirements of the heating element and/or the article.

Figure 1:
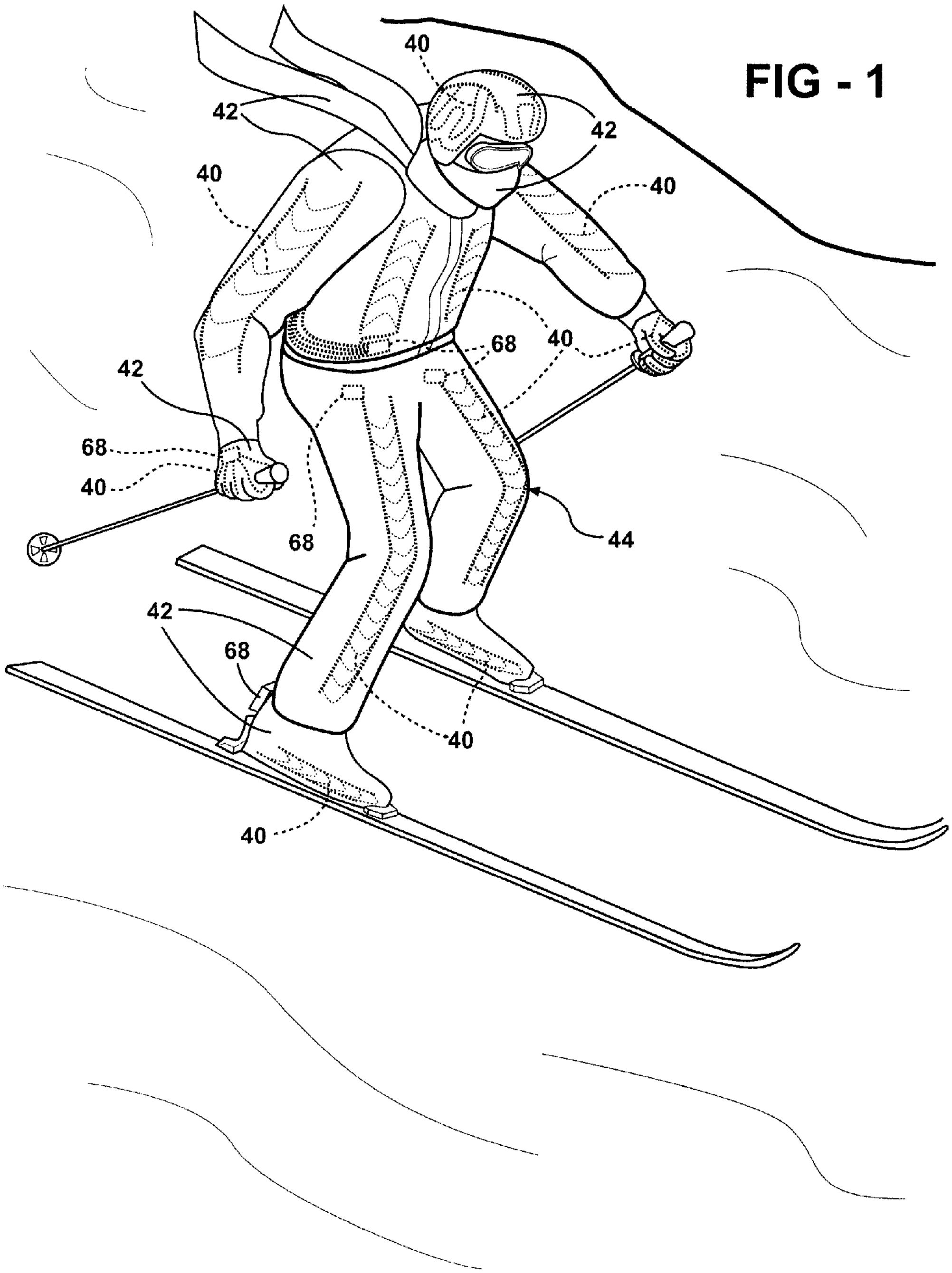
FIG. 1 is a perspective view of a plurality of articles and heating elements (in phantom) of the present invention being worn by a skier.

Referring now to the Figures, wherein like numerals indicate like parts throughout the several views, a heating element is shown generally at 40. As shown in FIG. 1, a plurality of articles 42 including one or more of the heating elements 40 (shown in phantom) is shown being worn by a skier 44. The article 42 includes a substrate 46 (see e.g. FIG. 4), such a textile fabric, that the heating element 40 is adhered to. The substrate 46 may be formed from various kinds of materials known in the art, some of which are described in further detail below. As alluded to above, it is to be appreciated that the heating elements 40 of the present invention may be used in various types of articles 42, and not just those articles 42 specifically illustrated and described herein. Further, the term article as used herein may equate to an individual textile, such as pants or a coat, or an interconnected group of textiles, such as the pants or coats that are electrically interconnected through the heating element 40.

Figure 2:
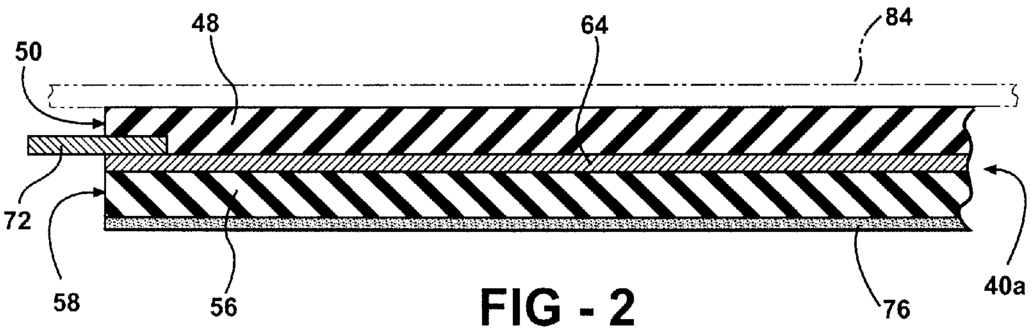
FIG. 2 is a cross-sectional view of a composite heating element disposed on a transfer sheet (in phantom)
Figure 3:
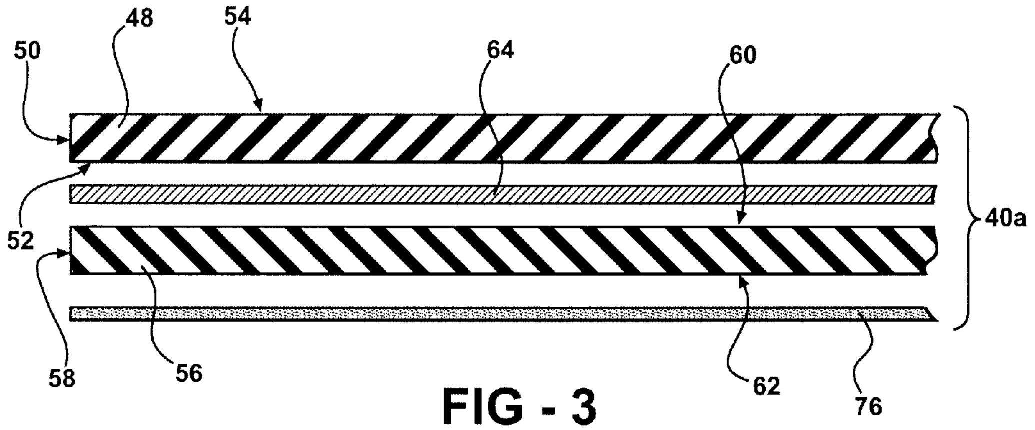
FIG. 3 is an exploded cross-sectional view of the composite heating element.
Figure 4:
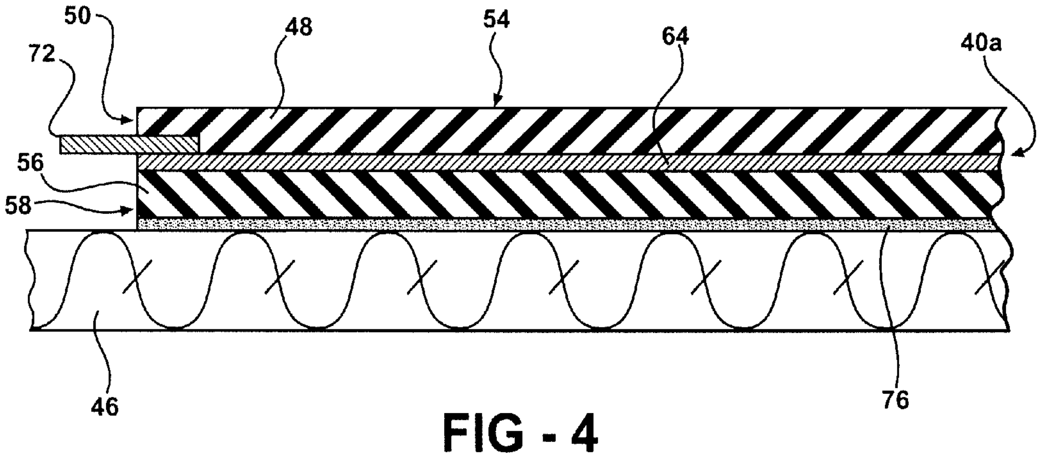
FIG. 4 is a cross-sectional view of the composite heating element of FIG. 2 attached to a substrate, such as an article.

Referring to FIGS. 2-4, the present invention further provides a composite heating element 40*a*. The composite heating element 40*a* comprises a first dielectric layer 48 defining an outer edge 50 and having an inner surface 52 and an outer surface 54. The composite heating element 40*a* further comprises a second dielectric layer 56 spaced from the first dielectric layer 48. The second dielectric layer 56 defines an outer edge 58 and has an inner surface 60 and an outer surface 62. The dielectric layers 48, 56 may be formed from various dielectric materials known in the art, and may be the same as or different than each other. The dielectric material should be one that is substantially nonconductive of electricity, for example, a material with electrical conductivity of less than a millionth of a siemens; however, the material may have higher electrical conductivity depending on end application of the composite heating element 40*a*. It is to be appreciated that the dielectric material may be classified as an insulative material, or vice versa. The dielectric material is generally electrically insulative and thermally conductive. Reference to the heating element 40 and the composite heating element 40*a* is interchangeable in the description of the subject invention.

Each of the first and second dielectric layers 48, 56 may be of various thicknesses, and may have a thickness the same as or different than each other. The first dielectric layer 48 may be relatively thin, e.g. about 1 micron or more. The first dielectric layer 48 may also be thicker. For example, the first dielectric layer 48 may have a thickness of at least about 150, alternatively at least about 175, alternatively at least about 200, microns. In certain embodiments, the first dielectric layer 48 typically has a thickness of from about 150 to about 300, more typically from about 175 to about 250, and most typically a thickness from about 190 to about 210, microns. The second dielectric layer 56 may be relatively thin, e.g. about 1 micron or more. The second dielectric layer 56 may also be thicker. For example, the second dielectric layer 56 may have a thickness of at least about 150, alternatively at least about 175, alternatively at least about 200, microns. In certain embodiments, the second dielectric layer 56 typically has a thickness of from about 150 to about 300, more typically from about 175 to about 250, and most typically a thickness from about 190 to about 210, microns. It is to be appreciated that thickness of the first and second dielectric layers 48, 56 may be uniform or may vary.

The first and second dielectric layers 48, 56 are typically formed from a plastic material, and may be formed from a plastic material the same as or different than each other. In certain embodiments, the first electric layer 48 is formed from a plastisol. In other embodiments, the second dielectric layer 56 is formed from a plastisol. In yet further embodiments, both of the first and second dielectric layers 48, 56 are formed from a plastisol. Any kind of plastisol known in the polymeric art may be used. Those skilled in the polymeric art appreciate that plastisols generally comprise at least two components, which are resin particles and a plasticizer. Plastisols are generally considered to be 100% solids when in the aforementioned two component state, however, some plastisols may further include some amount of water or other volatile, such as an organic solvent, thus making the plastisol less than 100% solids. It is to be appreciated that the plastisol may be less than 100% solids based on an amount of, for example, an additive, if included.

Typically, the resin particles of the plastisol comprise polyvinyl chloride resin, i.e., PVC resin. The PVC resin may be any type of PVC resin known in the polymeric art, such as a PVC dispersion and/or a PVC blend. The plastisol may include a blend of two or more different types of PVC resins. The PVC resin, or blends thereof, is typically included in the plastisol in an amount of from about 10 to about 70, more typically from about 40 to about 60, and most typically from about 45 to about 55, parts by weight, based on 100 parts by weight of the plastisol. Suitable PVC resins, for purposes of the present invention, are commercially available from PolyOne Corporation of Avon Lake, Ohio, under the trade name Geon, e.g. Geon 138.

The plastisol may include any kind of plasticizer known in the polymeric art. Typically, the plasticizer is one that is compatible with PVC resins, such as those PVC resins described and exemplified above. The plasticizer is typically included in the plastisol in an amount of from about 20 to about 90, more typically from about 30 to about 70, and most typically from about 45 to about 60, parts by weight, based on 100 parts by weight of the plastisol. Suitable plasticizers, for purposes of the present invention, are commercially available from Ferro Corporation of Walton Hills, Ohio, under the trade name Santicizer®, e.g. Santicizer® 2148. Other suitable plastisols, for purposes of the present invention, are described in U.S. Pat. No. 2,188,396 to Semon, the disclosure of which is incorporated herewith in its entirety. It is to be appreciated that combinations of two or more of the aforementioned plastisols may be used for purposes of the present invention.

The plastisol may further include an additive. Any type of additive suitable for use with plastisols may be used. Examples of suitable additives include, but are not limited to, heat stabilizers, rheology modifiers, dispersants, diluents, cross-linkers, biocide, mildicide, fungicide, surfactants, thickeners, fillers, flame retardants, pigments, and combinations thereof. If employed, the additive, e.g. dispersants, is typically included in the plastisol in an amount of from about 0.5 to about 30, more typically from about 0.5 to about 25, and most typically from about 0.5 to about 10, parts by weight, based on 100 parts by weight of the plastisol. It is to be appreciated that the additive may be added separately from the plastisol, if employed in the present invention.

Generally, plastisols are fused, i.e., cured, by application of heat to form a solid end product, such as the first and second dielectric layers 48, 56. The plastisol generally goes through a gel state prior to fully curing, as understood by those skilled in the polymeric art, and as described further below. Generally, when the plastisol is heated, the resin particles absorb the plasticizer and swell, i.e., are solvated, and begin to merge and fuse with each other to form a tough, elastic film. This curing scheme is an excellent property of plastisols, as plastisols must be actively heated to cure. In addition, plastisols generally do not require catalysts or curing agents to cure, only heating. In other words, plastisols will not generally cure, or are very slow to cure, at normal working temperatures, e.g. at room temperature or at temperatures encountered in typical manufacturing facilities. The higher curing temperatures allows for ease of use of the plastisol and manufacture of the composite heating element 40*a*, and cost savings due to, for example, reduction of waste, waste recovery and recycling of the plastisol. Plastisols are generally classified as a thermoplastic material, and therefore typically include the physical properties associated with thermoplastic materials as known in the polymeric art.

The plastisol can be heated by various methods to cure and fuse, typically by application of radiant heat, convective heat, e.g. hot air, heated platen, hotplate, etc. The time required for the plastisol to fuse is mainly a function of the temperature, time, and thickness of a layer of the plastisol to be cured. When the heating process is complete, the fused plastisol is typically allowed to cool to room temperature. In some embodiments, the fused plastisol is force cooled to expedite cooling; however, force cooling is not necessary. Through this heating and curing process the plastisol transforms from a liquid material to a solid material with excellent physical properties.

In addition to excellent dielectric properties, plastisols, once fused, generally have the same basic physical properties commonly associated with vinyls. These physical properties generally include, but are not limited to, flexibility including low temperature flexibility, such as down to about −65° F.; toughness; outdoor stability; abrasion, marring, and impact resistance; chemical and acid resistance; reduced flammable and flame retardancy; excellent optical clarity and gloss; excellent tensile strength, such as from about 200 to about 4000 psi; excellent elongation at break, such as from about 100 to about 600%; excellent tear strength, such as from about 100 to about 500 pounds/inch; excellent resistance to heat distortion, such as up to about 250° F. before softening; and varying hardness, such as from about 10 Shore00 to about 80 ShoreD, with lower hardness being preferred. The cured plastisol thereby imparts the first and second dielectric layers 48, 56, and therefore the composite heating element 40*a*, with similar properties, if employed. The plastisol is especially useful for importing the composite heating elements 40*a* with excellent washability properties, which are described further below. It is to be appreciated that the physical properties described above will vary depending on the specific plastisol employed, thickness, configuration, etc. of the plastisol after fusing.

Generally, while curing, plastisols will start to become dry to the touch or gelled, also called semi-cured, between temperatures from about 160° F. to about 250° F. Those of ordinary skill in the polymeric art understand that gel time of a plastisol is reached when as much plasticizer is absorbed as possible into the resin particles of the plastisol, and depends, in part, on the temperature that the plastisol is cured under. In one embodiment, the gel time of the plastisol is typically of from about 0.5 to about 10, more typically from about 1 to about 8, and most typically from about 2 to about 5, seconds at 300° F. It is to be appreciated that gel time can depend in thickness, and may be faster or slower than previously described. To completely cure, plastisols must generally reach temperatures of from about 280° F. to about 330° F. Increasing the temperature during curing, e.g. to about 400° F. or greater, can decrease curing time of the plastisol relative to employing lower temperatures, e.g. 280° F. The temperature at which the plastisol is fully cured is often referred to as the fusion temperature by those skilled in the polymeric art.

The plastisol is typically in the form of a liquid paste, or a highly viscous liquid, but can be reduced in viscosity with increased amounts of the plasticizer or, optionally, with addition of a solvent, surfactant, diluent, etc. The plastisol typically has a viscosity of from about 500 to about 1,000,000, more typically from about 1,000 to about 100,000, and most typically from about 1,500 to about 10,000, cP, according to ASTM D2196.

The composite heating element 40*a* further comprises a conductive layer 64. As shown in FIGS. 2-4, the conductive layer 64 is disposed between the inner surfaces 52, 60 of the first and second dielectric layers 48, 56. Typically, at least a portion of the outer edges 50, 58 of the first and second dielectric layers 48, 56 is fused to define an outer periphery 66 (not shown in these Figures) of the composite heating element 40*a* to encapsulate the conductive layer 64. Encapsulating the conductive layer 64 is useful for keeping moisture or other contaminants out of the conductive layer 64. As shown FIGS. 2 and 4, at least a portion of the conductive layer 64 is fused to and sandwiched between the inner surfaces 52, 60 of the first and second dielectric layers 48, 56.

The conductive layer 64 releases heat when the composite heating element is activated by the power source 68 (see e.g. FIG. 1). As best shown in FIGS. 5-11, the conductive layer 64 defines a circuit 70 having a first terminal end 72 and a second terminal end 74. The circuit 70 may be of various sizes and configurations, some of which are illustrated by the Figures and further described below. The circuit 70 can include one or more wider portions, e.g. circuit buses 71, and one or more narrower portions 73. Generally, the circuit buses 71 have less resistance than the narrower portions 73, such that the narrower portions 73 generally release more heat than the circuit buses 71, however, the opposite may also be true. It is to be appreciated that the circuit buses 71 and narrower portions 73 may be about the same width. Generally, various configurations of the conductive layer 64 are employed to obtain varying degrees of conductivity.

Typically, the circuit buses 71, and other buses described hereafter, are configured to carry current with as small a voltage drop as is practical. The narrower portions 73, and other similar portions described hereafter, are configured to have sufficient resistance so as to provide for heat release, i.e., provide heating of the article 42. In certain embodiments, three general ranges of conductivity are encountered within the heating element 40: 1) higher conductivity, i.e., low resistance, suitable for a bus, meant, for example, to simulate a current carrying wire; 2) medium conductivity, suitable for a narrower section and some buses, meant to have sufficient resistance so as to provide sufficient release of heat; and 3) lower conductivity, i.e., high resistance, which is meant, for example, to carry high impedance signals used for control purposes, e.g. for a integrated switch. It is to be appreciated that these ranges may be used outside of the heating element 40, such as for a switch connected to the heating element 40, e.g. a non-integrated switch.

Size and configuration of the circuit 70 can dictate heating profiles of the composite heating element 40*a*. The first and second terminal ends 72, 74 are for electrical connection to the power source 68, and may be formed from various conductive materials, such as a layer of conductive ink, metal foil, conductive textiles, conductive nonwoven fabric, wires, etc. In one embodiment, the first and second terminal ends 72, 74 are formed from a conductive ink composition, which is described below. As shown in FIGS. 2 and 4, the terminal ends 72, 74 (one shown) may be formed into the composite heating element 40*a*. While not shown, it is to be appreciated that a portion of the conductive layer 64 may present the terminal ends 72, 74 extending therefrom.

The conductive layer 64 may be of various thicknesses. For example, the conductive layer 64 has a thickness of at least about 60, alternatively at least about 70, alternatively at least about 80, microns. In certain embodiments, the conductive layer 64 typically has a thickness of from about 1 to about 200, more typically from about 30 to about 120, even more typically from about 60 to about 100, and most typically from about 75 to about 85, microns. It is to be appreciated that thickness of the conductive layer 64 may be uniform or may vary.

The conductive layer 64 is typically formed from at least one conductive ink composition. For example, in one embodiment, the conductive layer 64 is formed from a conductive ink composition. In other embodiments, some of which are described further below, the conductive layer 64 comprises two or more conductive ink compositions. Examples of suitable ink compositions are described in further detail below.

In one embodiment, the conductive ink composition comprises a plastisol component and a conductive component. The plastisol component of the conductive ink composition may be the same as or different than the plastisol as described and exemplified above with description of the first and second dielectric layers 48, 56. If the conductive layer 64 is formed from two or more different conductive ink compositions, each of the plastisol components may be the same as or different than each other. The plastisol component imparts the conductive layer 64 with excellent physical properties, as described and exemplified above with description of the first and second dielectric layers 48, 56. The plastisol component is typically included in the conductive ink composition in an amount of from about 10 to about 90, more typically from about 30 to about 80, and most typically from about 40 to about 60, parts by weight, based on 100 parts by weight of the conductive ink composition.

Suitable conductive materials, for purposes of the present invention, include, but are not limited to, silver particles, nickel particles, iron particles, stainless steel particles, graphite particles, carbon particles, carbon nanotubes (e.g. single- and/or multi-wall nanotubes), conductive polymer, gold particles, platinum particles, palladium particles, copper particles, zinc particles, aluminum particles, silver-coated glass particles, silver coated-copper particles, silver-coated nickel particles, and combinations thereof. The particles may be of various sizes and shapes, such as nano and bulk size, i.e., macro size, powders, spheres, rods, shavings, etc. In one embodiment, the conductive ink composition includes silver particles. In another embodiment, the conductive ink composition includes nickel particles. In yet another embodiment, the conductive ink composition includes graphite. Generally, better conducting materials, e.g. silver, are more expensive than those having lower conductively, e.g. nickel. To compensate for price differences and/or conductive properties, more or less of the conductive component can be used, accordingly. Heat released by the conductive layer 64 can be adjusted based on the type and amount of conductive material used. In addition, thickness and/or width of the conductive layer 64 can be adjusted to adjust heat released by the conductive layer 64. Generally, use of less conductive materials mandates use of thicker and/or wider conductive layers 64 relative to use of more conductive materials. Other suitable conductive materials, for purposes of the present invention, are described in U.S. Patent Pub. No. 2005/017295 to Aisenbrey, the disclosure of which pertaining to conductive powders and fibers is incorporated herewith in its entirety.

In certain embodiments, such as where the conductive component comprises silver and/or silver coating, the conductive component is typically included in the conductive ink composition in an amount of from about 20 to about 90, more typically from about 30 to about 80, and most typically from about 50 to about 70, parts by weight, based on 100 parts by weight of the conductive ink composition. In other embodiments, such as where the conductive component comprises carbon and/or graphite, the conductive component is typically included in the conductive ink composition in an amount of from about 5 to about 50, more typically from about 8 to about 40, and most typically from about 20 to about 35, parts by weight, based on 100 parts by weight of the conductive ink composition. It is to be appreciated that the amount of the conductive component employed can vary from the aforementioned amounts, based on the type of conductive material employed in the conductive component. In addition, the conductive component may comprise any conductive material known in the art.

In certain embodiments, the conductive layer 64 is formed from a conductive ink composition having two or more different conductive materials. For example, the conductive ink composition can include silver particles and iron particles. In this example, the iron particles are more resistive than the silver particles, which increases heat released by the conductive layer. Those skilled in the art appreciate that various combinations of the conductive materials described above may be used to adjust heat released by the conductive layer 64. In addition, the conductive material or materials employed, the amounts thereof, and/or the thickness of the conductive layer 64 may also be adjusted to obtain different levels of heating. Other suitable conductive ink compositions, for purposes of the present invention, are described in U.S. Pat. No. 5,445,749 to Ferber, U.S. Pat. No. 5,626,948 to Ferber et al., U.S. Pat. No. 5,973,420 to Kaiserman et al., U.S. Patent Pub. No. 2005/0231879 to Gentile et al., U.S. Patent Pub. No. 2007/0084293 to Kaiserman et al., the disclosures of which pertaining to conductive compositions and coatings, is incorporated herewith in its entirety.

In one embodiment, the conductive layer 64 comprises a first layer and a second layer disposed on the first layer. In this embodiment, the first and second layers may be the same as or different than each other. For example, the first and second layers may each include silver particles. As another example, the first layer can include silver particles and the second layer can include graphite particles. This embodiment is useful for insuring a uniform conductive layer 64, such as one formed by printing the conductive ink composition. The second layer helps to fill any voids, skips, or other printing errors that may have occurred while printing the first layer. Layers having different ink compositions, such as the silver and graphite example described above, can also be used to adjust conductivity of the conductive layer 64. In other words, the first layer may be formed from a first ink composition comprising a first conductive component and the second layer may be formed from a second conductive ink composition comprising a second conductive component different than the first conductive component of the first conductive ink composition. It is to be appreciated that the conductive layer 64 may comprise various combinations of two or more of the aforementioned conductive materials, in two or more separate layers. In these embodiments, the first and second layers may have a combined thickness as described above with thicknesses of the conductive layer 64. However, each of the first and second layers may each be of various thicknesses. For example, each of the first and second layers may be about the same thickness, e.g. about 30 to about 40 microns each, or of different thicknesses, e.g. the first layer has a thickness of about 20 microns and the second layer has a thickness of about 60 microns, or vice versa.

Depending on configuration and thickness of the conductive layer 64, the conductive layer 64 can have various loop resistances. In one embodiment, the conductive layer 64 typically has a loop resistance of from about 0.2Ω to about 100Ω, more typically for from about 1Ω to about 10Ω, and most typically of from about 1.5Ω to about 3Ω. It is to be appreciated that the loop resistance can be higher or lower than described above depending on how much voltage is supplied by the power source 68.

In one embodiment, the conductive ink composition includes a solvent component. The solvent component is useful for controlling the viscosity of the conductive ink composition, and can also be useful for forming the conductive layer 64, which is described in further detail below. Various types and blends of solvents may be used, such as organic solvents. In one embodiment, the solvent component comprises an ester alcohol. A specific example of a suitable ester alcohol is Texanol, commercially available from Eastman Chemical Company of Kingsport, Tenn. If employed, the solvent component is typically included in the conductive ink composition in an amount of from about 1 to about 30, more typically from about 5 to about 20, and most typically from about 10 to about 15, parts by weight, based on 100 parts by weight of the conductive ink composition. It is to be appreciated that if the solvent component is employed, the amount of the solvent component used may vary depending on, for example, which conductive material is employed in the conductive ink composition.

The composite heating element 40*a* further comprises an adhesive layer 76 coupled to at least one of the outer surfaces 54, 62 of the first and second dielectric layers 48, 56 opposite the conductive layer 64. It is to be appreciated that the adhesive layer 76 may be integral with the second dielectric layer 56 or the adhesive layer 76 may be a distinct layer. As best shown in FIGS. 2 and 4, the adhesive layer 76 is disposed on the second dielectric layer 56. The adhesive layer 76 may be formed from various adhesive compositions known in the art, and is typically a thermoplastic adhesive. In one embodiment, the adhesive layer 76 comprises a plastisol. The plastisol may be the same as or different than the plastisols described and exemplified above with description of the first and second dielectric layers 48, 56. The adhesive layer 76 may be formed from two or more different adhesive compositions.

The adhesive layer 76 may be of various thicknesses. For example, the adhesive layer 76 has a thickness of at least about 10, alternatively at least about 20, alternatively at least about 30, alternatively at least about 40, microns. In certain embodiments, the adhesive layer 76 typically has a thickness of from about 10 to about 200, more typically of from about 30 to about 80, and most typically of from about 35 to about 45, microns. It is to be appreciated that thickness of the adhesive layer 76 may be uniform or may vary.

Figure 9:
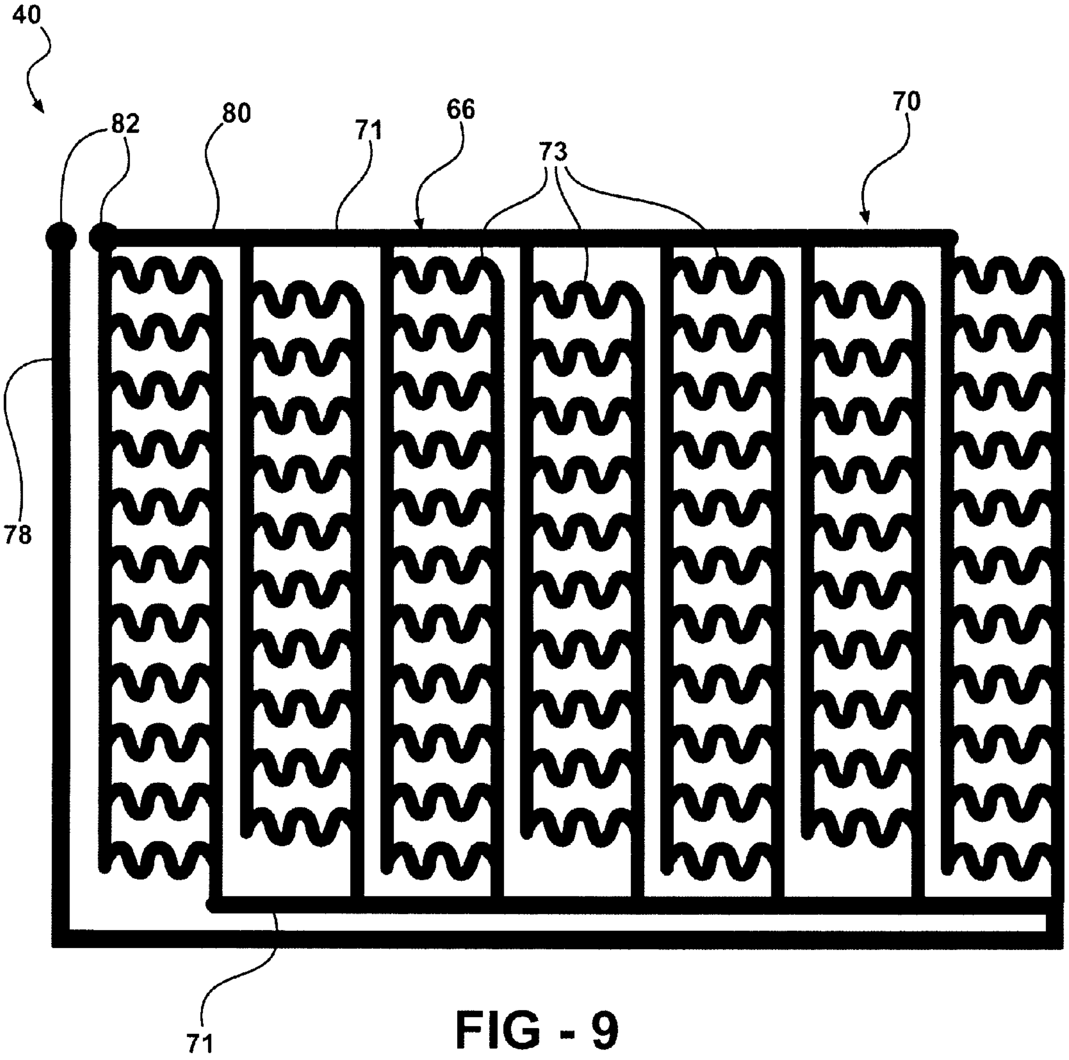
FIG. 9 is a plan view of yet another alternative configuration of the composite heating element, which can be used for a heated mattress pad.
Figure 10:
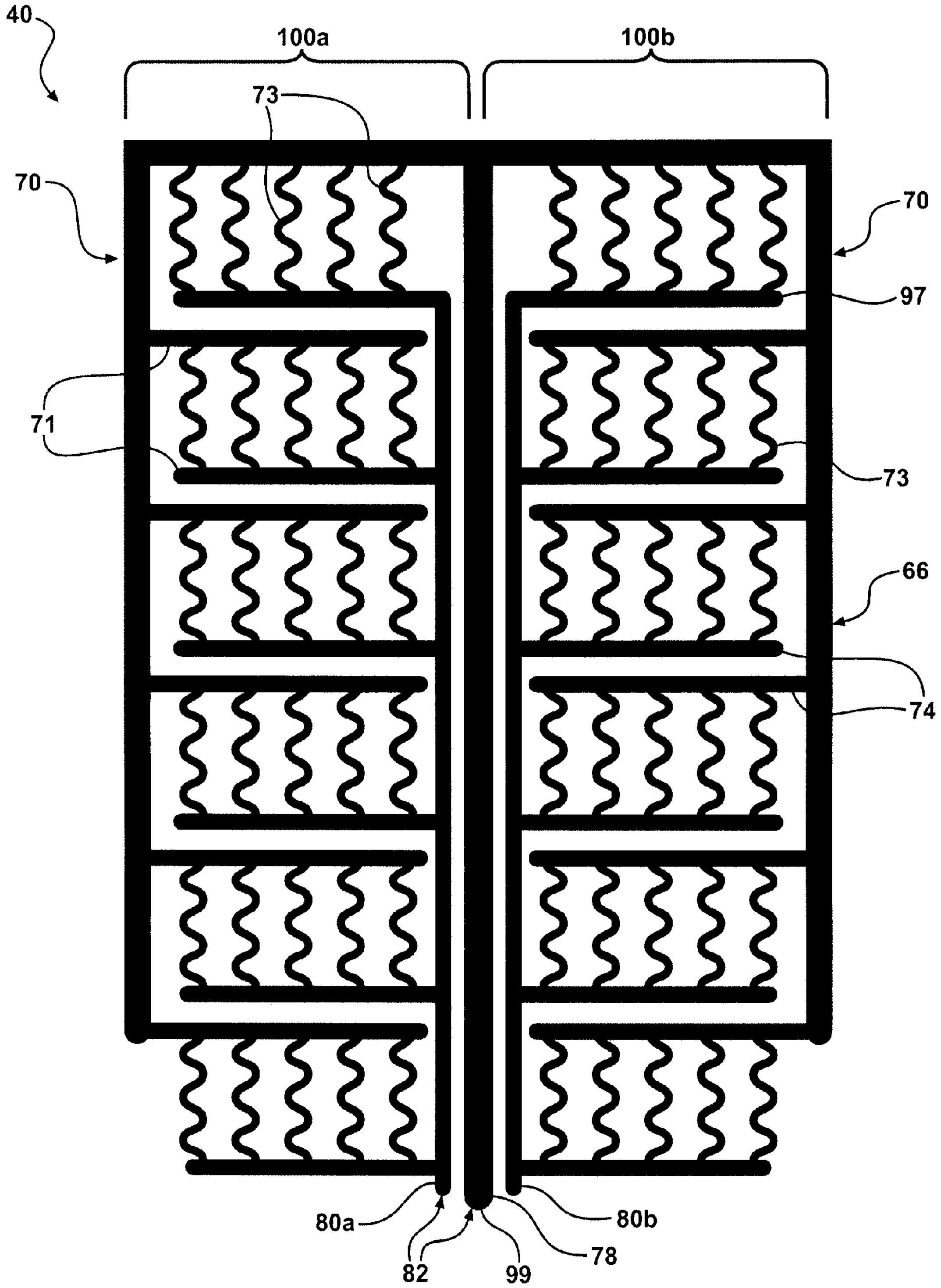
FIG. 10 is a plan view of another alternative configuration of the composite heating element with the element having two heating zones.
Figure 11:
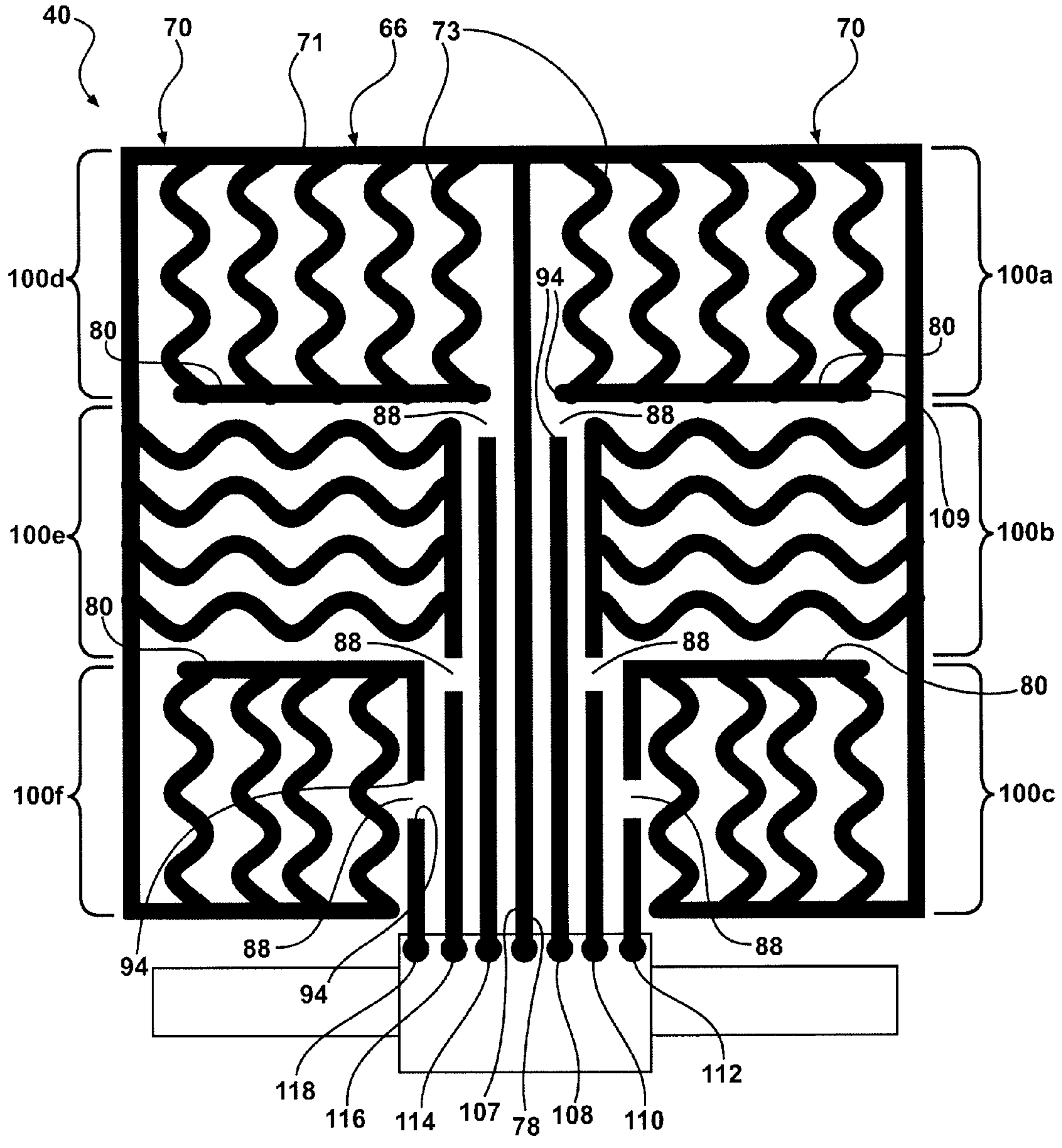
FIG. 11 is a plan view of another alternative configuration of the composite heating element having a plurality of heating zones and a plurality of integrated switches.

As best shown in FIGS. 9-11, the composite heating element 40*a* further comprises a first electrical bus 78 electrically connected to the first terminal end 72 of the conductive layer 64. The composite heating element 40*a* further comprises a second electrical bus 80 electrically connected to the second terminal end 74 of the conductive layer 64. Each of the first and second electrical buses 78, 80 has a tip 82 for electrically connecting to the power source 68 for activating the composite heating element 40*a* to heat the article 42. Typically, the conductive layer 40 has a resistance higher than a resistance of the first and second electrical buses 78, 80 for heating the composite heating element 40*a*. This allows for more controlled heating in portions of the article 42, by configuration of the composite heating element 40*a* and the first and second electrical buses 78, 80. In one embodiment, at least one of the first and second electrical buses 78, 80 comprises a second conductive layer different than the conductive ink composition. In this embodiment, the second conductive layer typically includes a conductive component having a lower resistivity relative to the conductivity component employed in the conductive layer 64. This embodiment is useful for easily forming the conductive layer 64 and electrical buses 78, 80 with similar materials, by just changing the conductive component employed in each of the corresponding ink compositions. When current is applied to the conductive layer 64, the conductive particles of both ink compositions heat up at different rates. This embodiment avoids the need for discrete electrical buses 78, 80 and narrower sections. In another embodiment (not shown), the electrical buses 78, 80 are formed from wire, such a copper wire. In other embodiments (not shown), the electrical buses 78, 80 are formed from a combination of conductive ink compositions and wires. It is to be appreciated that description to various buses described herein is interchangeable, e.g. “circuit” buses 71, “electrical” buses 78, 80, etc.

The electrical buses 78, 80 may be of various widths. Typically, the electrical buses 78, 80 have a width of from about 1 mm to about 50 cm, more typically from about 2 mm to about 10 cm, and most typically from about 3 mm to about 1 cm. The circuit buses 71 of the circuit 70 may be of the same widths as the electrical buses 78, 80. The sections 73 of the circuit 70 are generally narrower than the circuit buses 71. Typically, the narrower sections 73 have a width of from about 1 mm to about 50 cm, more typically from about 2 mm to about 10 cm, and most typically from about 3 mm to about 1 cm. It is to be appreciated that thickness may vary depending on end application, for example, the thicknesses will tend to be wider for larger articles, e.g. carpet, flooring, wallboard, and ceiling tile, and will be narrower for smaller articles, e.g. socks, hats, and gloves. In addition, thicknesses can vary depending on location of the power source 68, e.g. a closer power source 68 allows for narrower thicknesses.

Washability of the composite heating element 40*a* is excellent, due to the materials used to form the composite heating element 40*a*, such as the conductive ink composition employing the plastisol composition. Washability is required for many of the aforementioned articles 42, such as those worn, e.g. jackets and shirts. In one embodiment, a jacket 42 employing the composite heating element 40*a* passes at least 25 wash tests according to a modified AATCC-124-1992 method. In another embodiment, a shirt 42 employing the composite heating element 40*a* passes at least 200 wash tests according to a modified AATCC-124-1992 method. The modified AATCC-124-1992 procedure uses the wash cycle procedure of AATCC-124-1992, and the composite heating element 40*a* is tested thereafter to see if the composite heating element 40*a* still operates, e.g. heats. It is to be appreciated that the washability of the heating element 40 is not important or necessary for other applications, such as for ceiling tiles, wallboard, etc.

The present invention also provides a method of forming the composite heating element 40*a* on a transfer sheet 84 (shown in phantom in FIG. 2). The transfer sheet 84 may be formed from various materials, such as paper, wax-paper, plastic, etc. The method comprises the steps of applying a first dielectric composition onto the transfer sheet 84 to form the first dielectric layer 48. The method further comprises the step of applying the conductive ink composition comprising the plastisol component and the conductive component onto the first dielectric layer 48 to form the conductive layer 64. The method yet further comprises the step of applying a second dielectric composition onto the conductive layer 64 to form the second dielectric layer 56. The method further comprises the step of applying an adhesive composition onto the second dielectric layer to form the adhesive layer 76. Each of the aforementioned compositions may be applied by various methods known in the art, such as by coating, painting, spraying, etc. Typically, the compositions are applied by printing. Suitable methods of printing the compositions, for purposes of the present invention include, but are not limited to, screen printing, stencil printing, off-set printing, gravure printing, flexographic printing, pad printing, intaglio printing, letter press printing, ink jet printing, and bubble jet printing. Registration marks may be used to assist in printing multiple layers of the composite heating element 40*a*. In other words, it is to be appreciated that more than one application of each of the layers 48, 56, 64, 76 described above may be applied during the method.

If plastisol is employed, each of the layers 48, 56, 64, 76 may be gelled or fused by application of heat prior to application of a subsequent layer. In one embodiment, the first dielectric layer 48, the conductive layer 64, and the second dielectric layer 56 are fused prior to application of a subsequent layer, and the adhesive layer 76 is left at least partially gelled to facilitate attachment of the composite heating element 40*a* to the substrate 46. Drying stations may be used on a print press between printing of each composition to gel or fuse the layer printed. Generally, thicker layers require longer curing periods than thinner layers, and sometimes metallic components, such as those used as the conductive material in the conductive ink composition, can increase curing time, due to, for example, reflection of infrared radiation, i.e., heat. Drying station temperature and speed can vary greatly with changes in line speed, room temperature, air movement, and other fluctuations. Other suitable methods of making the composite heating element 40*a*, for purposes of the present invention, are described in U.S. Pat. No. 6,664,860 to Kaiserman et al., the disclosure of which is incorporated herewith in its entirety.

As described above, the composite heating element 40*a* is typically adhered to the substrate 46 of the article 42. More specifically, the composite heating element 40*a* is typically secured to the substrate 46 by the adhesive layer 76. For example, the heating element 40 or composite heating element 40*a* may be deposited on the substrate 46, such as by coating, e.g. printing, painting, etc. It is to be appreciated that in certain embodiments, one or more of the layers, e.g. the conductive layer 64, may be directly applied to the substrate 46, such as by printing. Typically, the composite heating element 40*a* is transferred and attached to the substrate 46 by various heat transfer methods known in the art. For example, application of heat and/or pressure can be used to fuse the adhesive layer 76 onto, and optionally, partially into, the substrate 46, e.g. such as by heat lamination. One suitable method of the adhering the composite heating element 40*a* to the substrate 46 is often referred to as a cold-peel transfer method. In this method, the transfer sheet 84 including the composite heating element 40*a* is positioned on the substrate 46 with the adhesive layer 76 in contact with the substrate 46. Heat and/or pressure is then applied to the adhesive layer 76 to melt and fuse the adhesive layer 76 to the substrate 46, thereby adhering the composite heating element 40*a* to the substrate 46. It is to be appreciated that heat and/or pressure may be applied to the adhesive layer 76 from the top, the bottom, or the top and bottom or the composite heating element 40*a*. After fusing, the adhesive layer 76, i.e., the composite heating element 40*a*, is allowed to partially cool, and the transfer sheet 84 is removed, leaving the composite heating element 40*a* adhered to the substrate 46. Typically, as described above, the adhesive layer 76 is left gelled or partially-cured until the composite heating element 40*a* is attached to the substrate 40*a*. It is to be appreciated that the transfer sheet 84 including the composite heating element 40*a* may be shipped or stored for some period of time prior to application of the composite heating element 40*a* to the substrate 46. In addition, once the composite heating element 40*a* is made, the transfer sheet 84 may be removed therefrom and discarded, and just the composite heating element 40*a* can be stored or shipped until such time of application to the substrate 46.

The present invention also provides a method of decreasing resistance of the composite heating element 40*a*. The method comprises the step applying at least one of pressure and heat to the composite heating element 40*a* for a period of time. In one embodiment, pressure is applied to the composite heating element 40*a* for a period of time. In another embodiment, heat is applied to the composite heating element 40*a* for a period of time. In yet another embodiment, pressure and heat is applied to the composite heating element 40*a* for a period of time. In the aforementioned embodiments, the pressure and/or heat may be constant or may vary. The period of time may vary from mere milliseconds to minutes, and may be constant or may vary. The method further comprises the step of simultaneously separating the plastisol component and the conductive component of the conductive ink composition to decrease resistance of the conductive layer. In other words, the conductive particles of the conductive component become more intimate with each other, e.g. a void space therebetween is reduced. Generally, the higher the pressure and/or temperature, and the longer the period of time, the more separation of the plastisol component and the conductive component occurs. It is believed that this increased separation creates agglomeration and cold-welding of the conductive materials of the conductive ink composition, which leads to a decrease in resistance of the conductive layer 64, and therefore, the composite heating element 40*a*. It is to be appreciated that different amounts of pressure and/or heat can be applied at various locations of the composite heating element 40*a*. The time period for applying heat and/or pressure can also be varied at various locations of the composite heating element 40*a*. Heat and/or pressure may be applied to the composite heating element by various methods known in the molding and forming art. Suitable methods for applying pressure to the composite heating element 40*a*, for purposes of the present invention, are described in U.S. Pat. No. 6,641,860 to Kaiserman et al., previously incorporated above. Determining subsequent changes in resistance of the composite heating element 40*a* with various applied heating and/or pressures, and time periods, can be determined through routine experimentation.

Figure 5:
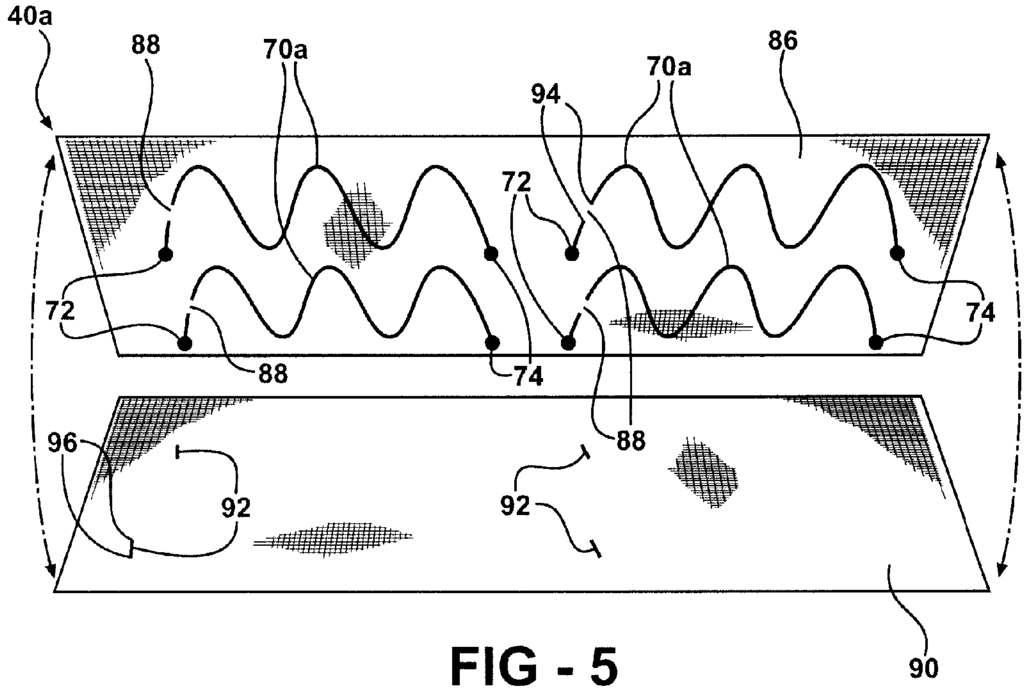
FIG. 5 is a perspective view of a fragmented article with a plurality of composite heating elements each having an integrated switch.
Figure 6:
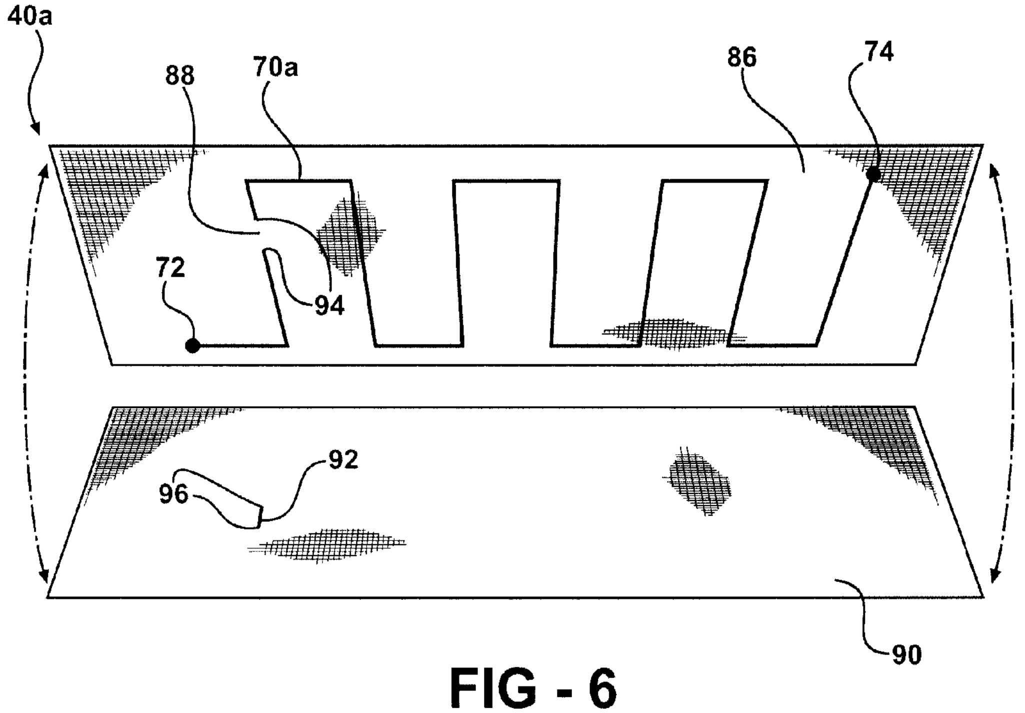
FIG. 6 is a perspective view of the fragmented article of FIG. 5 with a single composite heating element having an alternative configuration.
Figure 7:
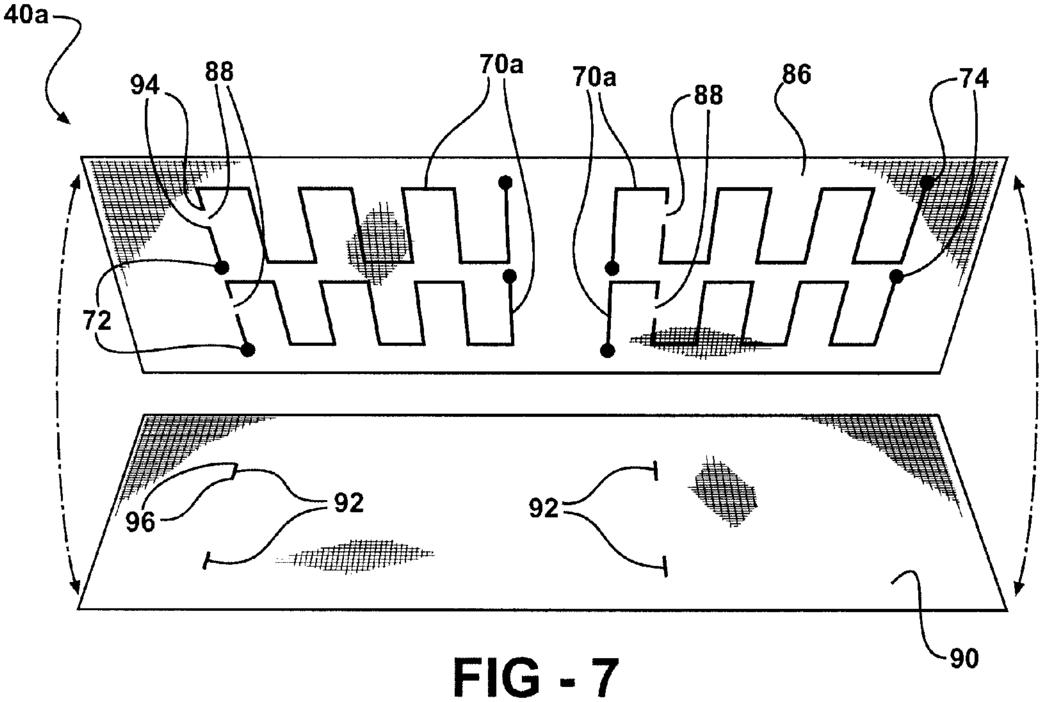
FIG. 7 is a perspective view of the fragmented article of FIG. 5 with a plurality of composite heating elements each having the alternative configuration of FIG. 6.

In certain embodiments, as shown in FIGS. 5-7, the composite heating element 40*a* comprises a first backing layer 86 and a discontinuous circuit 70*a* formed of a conductive material disposed on the first backing layer 86. The conductive material may be, for example, the same as the conductive layer 64. The discontinuous circuit 70*a* has terminal ends 72, 74 for electrical connection with the power source 68 and defines at least one gap 88 between the terminal ends 72, 74. A second backing layer 90 is spaced from the first backing layer 86. As best shown in FIGS. 5-7, a trace 92 formed of the conductive material is disposed on the second backing layer 88. The trace 92 or traces 92, is aligned with the gap 88, or gaps 88, for forming a complete circuit 70 when the first and second backing layers 86, 90 at least partially abut each other with the trace 92, or traces 92, extending across the gap 88, or gaps 88, and contacting the discontinuous circuit 70*a*. The complete circuit 70 allows the composite heating element 40*a* to activate and heat, in other words, in these embodiments, the composite heating element 40*a* includes an integrated switch, activated by pressure, which is described in further detail below. Each of the first and second backing layers 86, 90 may be formed of the dielectric material, such as the plastisol, as described and exemplified above. However, the backing layers 86, 90 may be formed of different materials, such as those described and exemplified with description of the substrate 46.

The discontinuous circuit 70*a* includes at least one pair of opposing terminals 94 creating a break in the discontinuous circuit 70*a* and defining the gap 88. The trace 92 includes at least one pair of opposing trace terminals 96 aligned with the terminals 94 of the discontinuous circuit 70*a* for engaging the terminals 94 of the discontinuous circuit 70*a*. In one embodiment, the conductive material of the discontinuous circuit 70*a* and the trace 92 are each formed from the conductive ink composition, as described and exemplified above.

Figure 8:
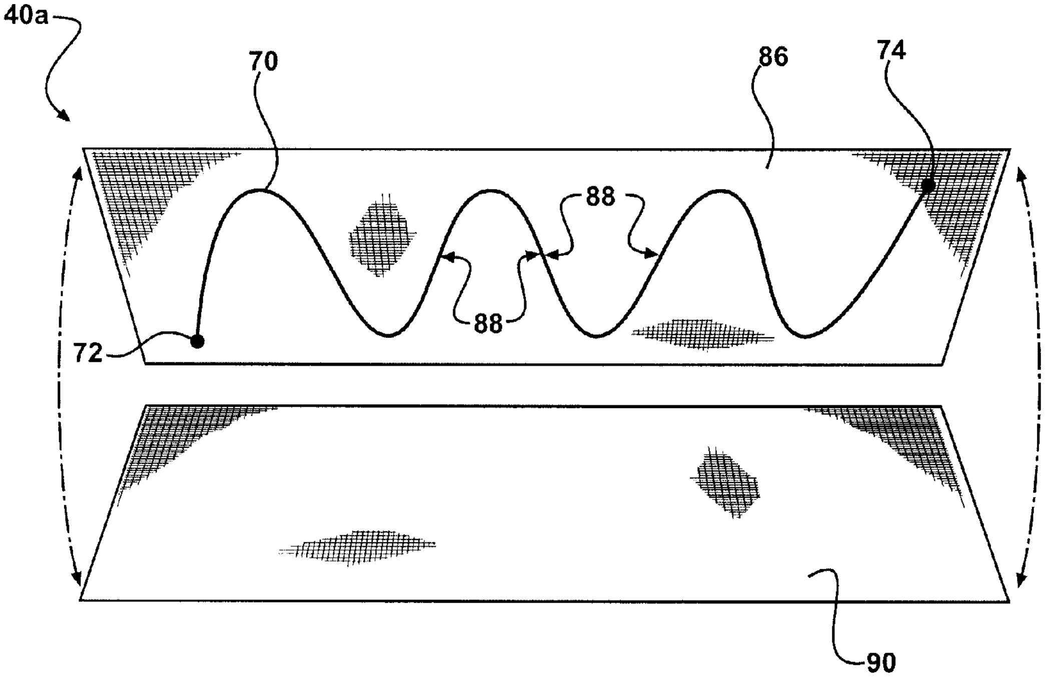
FIG. 8 is a perspective view of the fragmented article of FIG. 5 with a composite heating element having another alternative configuration.

The first dielectric layer 48 may be disposed over the discontinuous circuit 70*a* opposite the first backing layer 86 (not shown). The first dielectric layer 48 may include at least one aperture aligned with the gap 88 for allowing the trace 92 to contact the discontinuous circuit 70*a* when the first and second backing layers 86, 90 are compressed. Preferably, the aperture of the first dielectric layer 48 will allow access to the terminals 94. The second dielectric layer 56 may be disposed over at least a portion of the trace 92 opposite the second backing layer 90 with a remaining portion of the trace 92, preferably the trace terminals 96, being exposed for allowing the trace 92 to contact the discontinuous circuit 70*a* when the first and second backing layers 86, 90 are compressed. The conductive material of the discontinuous circuit 70*a* may be the same as or different than the conductive material of the trace 92. In certain embodiments, each of the conductive materials of the discontinuous circuit 70*a* and the trace 92 are formed from at least one of a metal, a conductive polymer, a conductive ink composition, a conductive fabric, conductive thread, and combinations thereof. The conductive ink composition may be as described and exemplified above. In one embodiment, as shown in FIG. 8, the circuit 70 disposed on the first backing layer 86 interacts with an inherently conductive fabric, which is the second backing layer 90, when the backing layers 86, 90 are compressed together. In certain embodiments, the integrated switch is a high resistance switch which closes under the application of weight to tell a microprocessor that a particular heating element 40 should be turned on. Other materials suitable for forming the discontinuous circuit are disclosed in U.S. Pat. No. 5,626,948 to Ferber et al., the disclosure of which is incorporated herewith in its entirety. Other suitable integrated switches, for purposes of the present invention, are described in U.S. Pat. No. 6,311,350 to Kaiserman et al., the disclosure of which is incorporated herewith in its entirety.

The present invention further provides a method of heating the article 46 having a plurality of heating elements 40 separated into a plurality of distinct heating zones 100 utilizing a controller 98. Examples of heating zones are shown in FIGS. 9-11 and examples of suitable controllers are shown in the Figures and described further below. The method comprises the step of providing power to the heating elements 40 of a first heating zone 100*a* to heat a portion of the article 46. The method further comprises the step of monitoring at least one parameter associated with the heating elements 40 to determine when a predetermined event occurs. The method further comprises the step of simultaneously discontinuing power to the heating elements 40 of the first heating zone 100*a* and providing power to the heating elements 40 of a second heating zone 100*b* upon occurrence of the predetermined event. It is to be appreciated that "simultaneously" does not necessarily mean instantaneous. For example, there may be a ramping up and/or ramping down of power provided to the heating elements 40 during the step of simultaneously discontinuing power to the heating elements 40.

In one embodiment, the predetermined event is defined as a specified period of time and the step of simultaneously discontinuing power and providing power to the heating elements 40 is further defined as simultaneously discontinuing power to the heating elements 40 of the first heating zone 100*a* and providing power to the heating elements 40 of the second heating zone 100*b* upon the expiration of the specified period of time. The specified period of time may vary, and is typically between about 10 milliseconds to about 100 milliseconds.

In another embodiment, the predetermined event is defined as a period of time unique to each heating zone 100 and the step of simultaneously discontinuing and providing power to the heating elements 40 is further defined as simultaneously discontinuing power to the heating elements 40 of the first heating zone 100*a* and providing power to the heating elements 40 of the second heating zone 100*b* upon the expiration of the period of time unique to the first heating zone 100*b*.

In one embodiment, the predetermined event is defined as a specified temperature and the step of simultaneously discontinuing power and providing power to the heating elements 40 is further defined as simultaneously discontinuing power to the heating elements 40 of the first heating zone 100*a* and providing power to the heating elements 40 of the second heating zone 100*b* upon reaching the specified temperature at the first heating zone 100*a*. The specified temperature may vary, and is typically between about 20° C. to about 150° C. Lower temperatures may be used for articles worn, e.g. jackets, while higher temperatures may be used in non-worn articles, e.g. wallboards.

In another embodiment, the predetermined event is defined as a temperature unique to each heating zone 100 and the step of simultaneously discontinuing and providing power to the heating elements 40 is further defined as simultaneously discontinuing power to the heating elements 40 of the first heating zone 100*a* and providing power to the heating elements 40 of the second heating zone 100*b* upon reaching the temperature unique to the first heating zone 100*a* at the first heating zone 100*a*.

In certain embodiments, the article 46 further includes a temperature sensor (not shown) disposed within the article 46. In these embodiments, the method may further include the step of monitoring the temperature of at least one of the heating elements 40, heating zone 100, and article 46 with the temperature sensor. The method may further include the step of selecting a temperature setting for the article utilizing the controller 98.

As mentioned above, it is to be appreciated that the article 46 may include two or more sub-articles 46, such as a jacket 46 with gloves 46, a ski-boot 46 with a bootie 46 disposed therein, etc. The sub-articles 46 may be connected to one another by various connectors (not shown), such as by quick-connects, that supply power and/or control signals between the sub-articles 46.

Additional embodiments, and embodiments previously introduced, will now be further described below. In certain embodiments, as alluded to above, the heating element 40 may comprise a textile that is inherently conductive at various levels of conductivity, or they may comprise a separate conductive composition of various levels of conductivity, that is applied to the substrate 46 of the article 42. The textile may be, for example, formed from carbon fibers, nickel coated fibers, silver coated fibers, etc.

The separate conductive composition may be, for example, the conductive ink composition, as described and exemplified above. Other conductive compositions may comprise electrically conductive liquids, inks, pastes, powders and/or granules. These conductive compositions generally comprise the conductive material, as described and exemplified above, a resin, and a vehicle. The resin may be any type of resin typically used for surface coatings, including, but not limited to, acrylamides, acrylics, phenolics, bisphenol A type epoxies, shellacs, carboxymethylcellulose, cellulose acetate butyrate, cellulosics, chlorinated polyethers, chlorinated rubbers, epoxy esters, ethylene vinyl acetate copolymers, maleics, melamine, natural resins, nitrocellulose solutions, isocyanates, hydrogenated resins, polyamides, polycarbonates, rosins, polyesters, polyethylenes, polyolefins, polypropylenes, polystyrenes, polyurethanes, polyvinyl acetate, silicones, vinyls and water thinned resins. The resin may be either water soluble or soluble in an organic solvent-based system. Alternatively, the resin may be dispersible in a suitable liquid, or in a suspension, rather than truly soluble therein. A liquid dispersion medium may be used in which the resin is dispersed, but in which other materials are truly dissolved. The resin may be used with or without cross-linking. If cross-linking is desired, it may be obtained by using a cross-linking agent or by application of heat or radiation to the conductive composition, such as application of infrared or ultraviolet radiation or microwave or radio frequencies to the composition.

As indicated above, the resin may be dissolved or dispersed in various liquids that serve as a vehicle for carrying the resin to facilitate its application to the substrate 46, for example, by a printing process. The vehicle may be water based, water miscible, or water dispersible. The vehicle may also be solvent based.

Suitable substrates 46, for purposes of the present invention, include, but are not limited to, textiles, spun and non-spun fabrics, plastics, paper, PVC, glass, rubber, woven fabrics, non-woven fabrics, knit fabrics, foams, fiberfills, wall boards, wood, ceiling tiles, flooring, clay, carpet, and metals. Further suitable substrates 46 include, but are not limited to, both natural and synthetic fibers, and water proof and non water proof materials.

Suitable woven fabrics include, but are not limited to, plain weaves, poplin, twill, sateen, mesh, mattress ticking, and canvas. Suitable non-woven fabrics include, but are not limited to, polyester, carbon fiber, polyacrylonitrile, and polypropylene fabrics. Suitable knit fabrics include, but are not limited to, warp and weft knitted fabrics, flat knits and tubular knits. Suitable foams include, but are not limited to, ethylene vinyl acetate, expanded polyethylene, polyurethane, polytetrafluoroethylene, polypropylene, polyvinylidene fluoride, vinyl acetate, polyvinyl acetate, polychloroprene, polystyrene, linear low density polyethylene, polyolefin, polyether, and nitrocellulose ester foams. Suitable fiberfills include, but are not limited to, textured yarn, quilt batting, PET, organic cotton, foam, broadcloth, nylon, heirloom, yarn, polyfil, cotton, filament, glass cardboard, and fibermesh fiberfills.

As described above, certain embodiments include inherently conductive fabrics of various levels of conductivity. Inherently conductive fabrics include a conductive component that is incorporated during the process of making the fibers that comprise the conductive fabric. In certain embodiments, the conductive fabric includes fibers whose chemical composition and/or structure imparts electrical conductivity. Examples of inherently conductive fabrics include carbon fiber and carbon polyester textiles, such as fabrics that are produced by baking and oxidizing polyacrylonitrile fibers. Suitable inherently conductive fabrics include Grade 8000020 carbon fabric and Grade 8168902 carbon fabric, commercially available from Hollingsworth & Vose of East Walpole, Mass. Further examples of inherently conductive fabrics include nickel coated carbon fiber fabrics, such as Grade 8000838 Nickel Carbon fabric, commercially available from Hollingsworth & Vose.

In certain embodiments, the conductive ink composition is applied directly to the substrate 46. Various printing techniques may be used to apply the conductive ink compositions, such as those described and exemplified above. The conductive ink composition is typically selected to be compatible with the substrate 46 and the printing process employed for application. Depending on the printing process selected, relatively high viscosity ink pastes may be used, as well as liquid inks, such as those having a viscosity of about 5000 cP or less according to Brookfield testing. High viscosity ink pastes are well-suited for screen printing processes while lower viscosity liquid inks are better suited for processes such as gravure and flexo printing. Depending on the specific printing process and the substrate 46, shear thinning ink such as pseudoplastic or thixotropic inks may be used, as well as dilatent or shear thickening inks.

In certain embodiments, the dielectric layers 48, 56 are classified as insulating layers. The insulating layers are preferably electrically insulative and thermally conductive. The insulating layers may cover all or a portion of the conductive layer 64. The insulating layer may be made of various materials, including, but not limited to, polyurethanes, polyvinyl chlorides, polyamides, polyesters, polyimides, polycarbonates, polyethylenes, thermoplastic urethanes and polyurethanes, polypropylenes, etc., and combinations thereof. The insulating layer may be fixed onto the substrate 46 by ironing, pressing, heating, etc. The insulating layer may also be printed onto the circuit 70 so as to be generally coextensive with the circuit bus 71 and/or narrower portion 73 of the circuit 70.

Certain embodiments of the present invention will now be further described with reference to the Figures. In the embodiments of FIGS. 5-7, the integrated switch is incorporated into the heating element 40 to allow the article 46 to be heated as desired. The integrated switch is especially useful for uses where pressure is applied, such as in boots, on beds, on seats, etc. For example, a ski-boot 46 may include the integrated switch such that the ski-boot 46 only heats while the skier 44 is pressing his or her foot down.

Optionally, a resilient spacing material (not shown), such as a foam, a fiberfill, or other material may be placed between the first and second backing layers 86, 90. The resilient spacing material may comprise a separate layer or it may be affixed to the first and/or second backing layer 86, 90. If employed, the resilient spacing material is preferably configured to include an orifice that is sized to accommodate the trace 92, the orifice being located between the gap 88 and the trace 92. As a result, when a force is applied to the first and/or second backing layer 86, 90, the trace 92 passes through the resilient spacing thereby forming the completed circuit 70 and energizing the heating element 40. As a result, the integrated switch embodiment can be used to provide a switchable heating element 40 that only consumes power and generates heat when a force is applied to one or both of the backing layers 86, 90. As described above, and as further described below, this feature is particularly useful in applications where a user sits or lies on the article 46 because the heating element 40 automatically provides heating when the article 46 is being used and discontinues heating when the article 46 is not in use. Thus, these embodiments are particularly beneficial for heated seat applications, such as for cars, trucks, motorcycles, buses, airplanes, bikes, boats, snowmobiles, etc., as well as for heated mattresses, beds, shoe and boot soles, etc.

Depending on the size of the article 46, it may be desirable to provide a plurality of the integrated switches, each of which can be individually operated, such as with the controller 98 and/or by the method of heating described and exemplified above. By using a plurality of integrated switches, switchable and localized heating at different locations, i.e., heating zones 100, of the article 46 can be provided. Referring to FIGS. 5 and 7, an embodiment of a multiple integrated switch is illustrated. While the integrated switches are shown as being relatively close together, the integrated switches can also be distributed at a wide variety of locations in article 46, providing for greater flexibility and localized switching. These embodiments also allow heat to be generated within a specific heated zone 100 of the article 46, reducing energy losses incurred in heating zones 100 of the article 46 that are not proximal to the user.

As described in part above, the heating elements 40 and integrated switches described and exemplified herein have numerous applications, and can be used to heat a variety of articles 46. Some exemplary embodiments of articles 46 incorporating the heating elements 40, and optionally, the integrated switches, will now be described. It is to be appreciated that the composite heating element 40*a* may be used in place of the heating elements and circuits described below.

Referring to FIG. 9, an embodiment of a heated mattress pad is shown. The mattress pad comprises a flexible canvas substrate (not separately shown). The circuit 70 is applied to the canvas substrate 46, preferably using a printing process of the type previously described. The circuit 70 comprises columns which are spaced apart across a given dimension, e.g. a length or width, of the canvas substrate 46. Each column comprises a plurality of narrower sections 73, each of which preferably comprises a conductive ink such as a washable, water-based carbon ink. In an exemplary embodiment, the narrower sections 73 are about 10 mm in width and are formed from an ink composition comprising from about 30 percent to about 60 percent of a carbon dispersion, from about 30 percent to 60 percent of a urethane dispersion, from about one-half (0.5) percent to about two (2) percent of a thickener flow additive, and from about five (5) percent to about 9 percent of a humectant, with all percentages by weight. A preferred embodiment of a washable, carbon-based conductive ink comprises about 49 percent CDI 14644 carbon dispersion, about 42.25 percent Zeneca R-972 Urethane dispersion, about one (1) percent RM-8W Rohm & Haas flow thickener, and about 7.75 percent diethylene glycol humectant, with all percentages by weight.

For a given conductive ink material, the length, width, and thickness of each narrower section 73 will affect the overall loop resistance, which for a given power supply determines the heat load. Each narrower section 73 is generally sinusoidal in the embodiment of FIG. 9 in order to increase the effective length of each section. Circuit buses 71 supply power to the sections 73. In the embodiment of FIG. 9, the circuit buses 71 preferably comprise a printed conductive ink, such as a washable, water-based silver-based ink. In an exemplary embodiment, the circuit buses 71 are about 15 mm in width and are formed from an ink comprising about 30 percent to about 60 percent of a urethane dispersion, about 30 percent to about 60 percent silver powder, about one (1) percent defoamer, and about 20 percent to about 30 percent silver flakes, with all percentages by weight. A preferred example of a washable, water-based silver ink comprises about 29.8 percent of a Zeneca R972 urethane dispersion, about one (1) percent of a C. J. Patterson, Patcoat 841 Defoamer, about 45.2 percent of HRP Metals D3 Silver powder, and about 24 percent of Technics 135 silver flakes, with all percentages by weight.

The dimensions of the various sections 73 and the types of conductive ink compositions used are preferably selected based on a desired heat load to be provided and the available power source 68. For example, in one exemplary embodiment, the mattress pad of FIG. 9 comprises a canvas material of about 0.5 mm thickness and heats to a temperature above 45° C. within about 5 minutes using a 24V power supply. In this exemplary embodiment, the loop resistance as measured from the lower right corner of the pad to the upper left corner of the mattress pad is from about 10Ω to about 12Ω. In another exemplary embodiment, the mattress pad heats to a temperature above about 45° C. in about 5 minutes using a 36V power supply. In this exemplary embodiment, the loop resistance as measured from the lower right corner of the pad to the upper left corner of the mattress pad is from about 20Ω to about 24Ω.

If the circuit 70 is to be used in a mattress pad, it preferably includes an electrically insulative and thermally conductive moisture barrier to protect circuit 70 from fluids that may be spilled or which may otherwise contact and damage the circuit 70. In one embodiment, circuit 70 is directly printed on the mattress pad ticking and a moisture barrier film is laminated on the exposed side of the circuit 70. In an especially preferred embodiment, circuit 70 is parted of the composite heating element 40*a*, which is applied to the mattress ticking or other fabric substrate 46 using processes such as heat transfer printing. An exemplary moisture barrier film is the polyurethane film sold as Product No. 3220, commercially available from the Bemis Company of Shirley, Mass.

Referring to FIG. 10, an embodiment of a heating blanket will now be described. The heating blanket comprises a fabric substrate (not shown) such as a woven or knit fabric of the type typically used for blankets. The circuit 70 may be printed on the fabric substrate 46 to generate heat when connected to a power supply. Alternatively, the circuit 70 may part of the composite heating element 40*a*. The circuit 70 is divided into two individually operable heated zones 100*a*, 100*b*. The first electrical bus 78 acts as a common bus for heated zone 100*a*, 100*b*. A pair of the second electrical buses 80*a*, 80*b* supplies power to each heated zone 100*a*, 100*b*, separately. The narrower sections 73 preferably comprise a water-based carbon ink of the type described above. The sections 73 are about 10 mm in width and are printed on the fabric substrate 46 using one of the printing processes described previously. The first electrical bus 78 preferably comprises a water-based silver ink of about 15 mm in width. The second electrical buses 80*a*, 80*b* preferably comprise a similar ink section of about 10 mm in width. The conductive inks are preferably washable.

In one exemplary embodiment of a heating blanket, a fabric substrate 46 of about 24 inches by about 36 inches is heated. In this exemplary embodiment, a 24V power source is used and the overall loop resistance of circuit 90 as measured between locations 97 and 99 is less than about 19Ω. In this embodiment, the blanket heats to a temperature of about 45° C. to about 55° C. in about one (1) minute.

To operate the first heating zone 100*a*, a current is supplied to the first electrical bus 78, and the second electrical bus 80*a* is connected to ground. The remaining secondary bus 80*b* is left open by a control circuit, such as the one depicted in FIG. 29, which is discussed in detail below with respect to FIGS. 29-31, or the remaining secondary bus 80*b* may be connected to ground. To operate the second heating zone 100*b* alone, a current is supplied to the first electrical bus 78, and the second electrical bus 80*b* is connected to ground. The remaining secondary bus 80*a* is left open by the control circuit. To provide this switching capability, an integrated circuit controller may be connected to the circuit 70 to switch the second electrical buses 80*a* and 80*b* in an alternating fashion. In one embodiment, pulsed currents are provided to each of the second electrical buses 80*a* and 80*b* in alternating sequence so that only one of the second electrical buses 80*a* or 80*b* is powered at a time. The use of individually operable heating zones 100 in this fashion allows one portion of the blanket to be heated up at a time, thereby conserving power consumption, and in the case of DC power, reducing the required battery size.

FIG. 11 depicts an embodiment of a heated textile article comprising a plurality of individually switchable heated zones 100. The embodiment of FIG. 11 is particularly suited for articles 46 that a person or animal sits or lies upon because it uses a switching technology such as the one described above with respect to FIGS. 5-7. In accordance with the embodiment, circuit 70 is applied to a fabric substrate 46, preferably using a printing process such as those described above. Circuit 70 comprises heating zones 100*a*-100*f*. Each heating zone 100*a*-100*f* comprises a plurality of narrower sections 73 which generate heat when a current is applied to them. Each heating zone 100*a*-100*f* is connected to a common bus 107 and its own switchable, main bus. Common bus 107 supplies power to each heated zone 100*a*-100*f*. Main bus 108 supplies power to heated zone 100*a*. Main bus 110 supplies power to heated zone 100*b*. Main bus 112 supplies power to heated zone 100*c*. Main bus 114 supplies power to heated zone 100*d*. Main bus 116 supplies power to heated zone 100*e*, and main bus 118 supplies power to heated zone 100*f*. Typically, a positive voltage is applied to common bus 107 and buses 108, 110, 112, 114, 116, and 118 are selectively switched to ground to enable heating. If it is not desired to operate certain heated zones 100*a*-100*f*, their respective buses 108, 110, 112, 114, 116, and 118 may be left open. Gaps 120*a*-120*f* are provided in buses 108, 110, 112, 114, 116, and 118, respectively. A second fabric substrate (not shown) is also provided and includes six (6) sections 92 that are substantially aligned with the gaps 88. A resilient spacing material is affixed to the substrate 46 on which the circuit 70 is applied and/or the substrate 46 on which the six (6) sections 92 are applied and biases the fabric substrates 46 away from one another. The resilient spacing material includes gaps that allow the sections 92 to contact their corresponding gaps 88 when a force is applied to one or both fabric substrates 46, i.e., backing layers 86, 90. The resilient spacing material may also be provided as a separate layer between the two substrates 46. In addition, the resilient spacing material may itself comprise a conductive material with a pressure responsive resistance, such as a conductive foam or fiberfill. If a conductive spacing material is used, its uncompressed or natural resistance is preferably selected such that no current flows to buses 108, 110, 112, 114, 116, or 118 when no force is applied to the material. However, when a force is applied to the spacing material proximate one of the main buses, the resistance preferably drops in the region of the force to allow a current to flow through the bus in that region.

To illustrate the foregoing, the circuit 70 may be provided on a dog bed. When a dog lays on the bed in the heated zone 100*f*, proximal the gap 88, a current will flow through bus 118, causing the sections 73 of heated zone 100*f* to generate heat. If the dog lays down in one of the other heated zones 100*a*-100*f*, that zone will similarly heat up. If a resilient conductive spacing material is placed in electrical communication with circuit 70, it will be selected to have a resistance in the uncompressed state that prevents current from flowing through the gaps 88. However, when the dog lays down in one of the heated zones 100*a*-100*f*, the spacing material will compress, lowering its resistance in the area of compression and allowing current to flow through the gap 88 that is proximate the compressed heated zone 100. The use of a conductive resilient material is advantageous in that it eliminates the need for a separate fabric layer with sections 92 and the potential problems of ensuring the alignment of the sections 92 with the gaps 88. As described herein, heating zones 100 may also be referred to as regions.

In this embodiment, the sections 92 preferably comprise a mixture of water-based carbon ink and water-based silver ink of the types described previously. Buses 107, 108, 110, 112, 114, 116, and 118 preferably comprise a water-based silver ink. In one exemplary embodiment, the circuit 70 is used to heat an 18 inch by 18 inch dog bed to a temperature of from about 38° C. to about 40° C. in about one (1) minute using a 12V power source 68. In this exemplary embodiment, the loop resistance as measured between locations 107 and 109 is preferably less than about 18Ω. Narrower sections 73 are preferably about 10 mm long. Buses 108, 110, 112, 114, 116, and 118 are preferably about 1 mm wide, and common bus 107 is preferably about 12 mm wide. If a separate switching layer is used, the ink switch sections 92 preferably comprise water-based silver ink sections 92 about 10 mm in length. Buses 107, 108, 110, 112, 114, 116, and 118 may be connected to an integrated circuit that is connected to the power supply 68.

Referring to FIG. 12, an embodiment of a heated dog jacket 130 is described. In accordance with the embodiment, jacket 130 comprises a main portion 134 which wraps around the body of a dog and which may be secured via fasteners 135. Jacket 130 comprises a woven, nylon material. Openings 133 are preferably circular and are designed to accommodate the dog's front legs. Fasteners 135 on each side of jacket 130 mate proximate the dog's spine. Fasteners 135 may comprise a variety of known fastening structures, including but not limited to buttons, straps, hooks, and hook & loop, i.e., VELCRO®. Collar portion 132 wraps around the neck of the animal and is secured by fasteners 136 and 137, which are preferably VELCRO® fasteners. Jacket 130 preferably comprises a heated circuit including individually operable heated regions 136 and 138. Common bus 146 connects a plurality of sections 148. Bus 142 supplies power to region 136, and bus 140 supplies power to region 138. Narrower sections 148 preferably comprise a washable, carbon-based ink of the type described previously which generates heat when a current is applied to it. Buses 140, 142 and 146 preferably comprise a conductive ink such as a washable, silver-based ink of the type described previously. Jacket 130 is preferably designed to reach a temperature of about 45° C. within about 1 minute and has an overall loop resistance of about 12Ω as measured between locations 140 and 146.

Power supply 152 is preferably an 7.4 V battery. Buses 140, 142, and 146 are preferably connected to an integrated circuit controller 150 that allows power to be supplied to buses 140 and 142, as desired. In an especially preferred embodiment, controller 150 provides alternating, pulsed currents to buses 140 and 142. This configuration allows regions 136 and 138 to be heated in alternating sequences, which saves battery power and reduces the necessary battery size. Although not depicted in the figure, integrated circuit controller 150 and power supply 152 may be provided in separate housings or the same housing, which is preferably a sturdy plastic material that can withstand use by a dog.

Referring to FIG. 13, another embodiment of a circuit for heating a textile is depicted. Circuit 160 comprises a narrower section 162 which is printed on a textile substrate 46. Narrower section 162 is connected at each end 168 and 170 to a power supply 164 and an integrated circuit controller 166. Unlike the previous embodiments, circuit 160 does not include separate buses and narrower sections. Instead, section 162 comprises a highly conductive ink with conductive particles dispersed therein. The highly conductive ink does not heat up to an appreciable degree itself. However, it supplies current to the conductive particles which generate heat.

The highly conductive ink is preferably a combination of silver and nickel inks. The conductive particles are preferably iron filings ranging from about 100 mesh to about 400 mesh in size. Conductive particles other than iron filings, such as aluminum, zinc, and/or stainless steel, may also be used. The highly conductive ink preferably has a resistivity in the range of 1 mΩ/square to about 10Ω/square. The iron filings preferably have a resistivity ranging from about 10Ω/square to about 10 kΩ/square. In an especially preferred embodiment, the iron filings are about 200 mesh and comprise from about 15 percent to about 25 percent by weight of the ink/filing mixture. In one embodiment, section 162 is screen printed as a mixture of the ink and the conductive particles. In another embodiment, the highly conductive ink is printed first and then a layer of iron filings in a vehicle (such as those described above) is printed on top of it.

One application of the circuit of FIG. 13 is depicted in FIG. 14. FIG. 14 illustrates a heated bandage 180, such as an Ace bandage used to wrap strained or sprained muscles or ligaments. In accordance with the embodiment, a bandage fabric substrate 46 such as stockinet fabric used in typical Ace bandages is provided. Conductive section 186 (shown in phantom) comprises a mixture of highly conductive ink and conductive particles of the type described with respect to FIG. 13. Section 186 is preferably laminated between protective film layers (not shown) such as polyurethane film layers which are electrically insulative but thermally conductive. The film layers protect section 186 from damage due to moisture. Protective layer 184 is preferably a fabric layer that contacts the wearer's body. The film-laminated conductive section 186 is disposed between fabric substrate 46 and protective layer 184. In an alternative embodiment, section 186 is printed directly onto fabric substrate 46 and is positioned away from the wearer's body. In the alternate embodiment, only one film, which is disposed on section 186 away from the stockinet layer, is used to protect section 162. Although not depicted in FIG. 14, a power source such as a battery is preferably electrically connected to section 186 to supply power to it for the heating.

Figure 15:
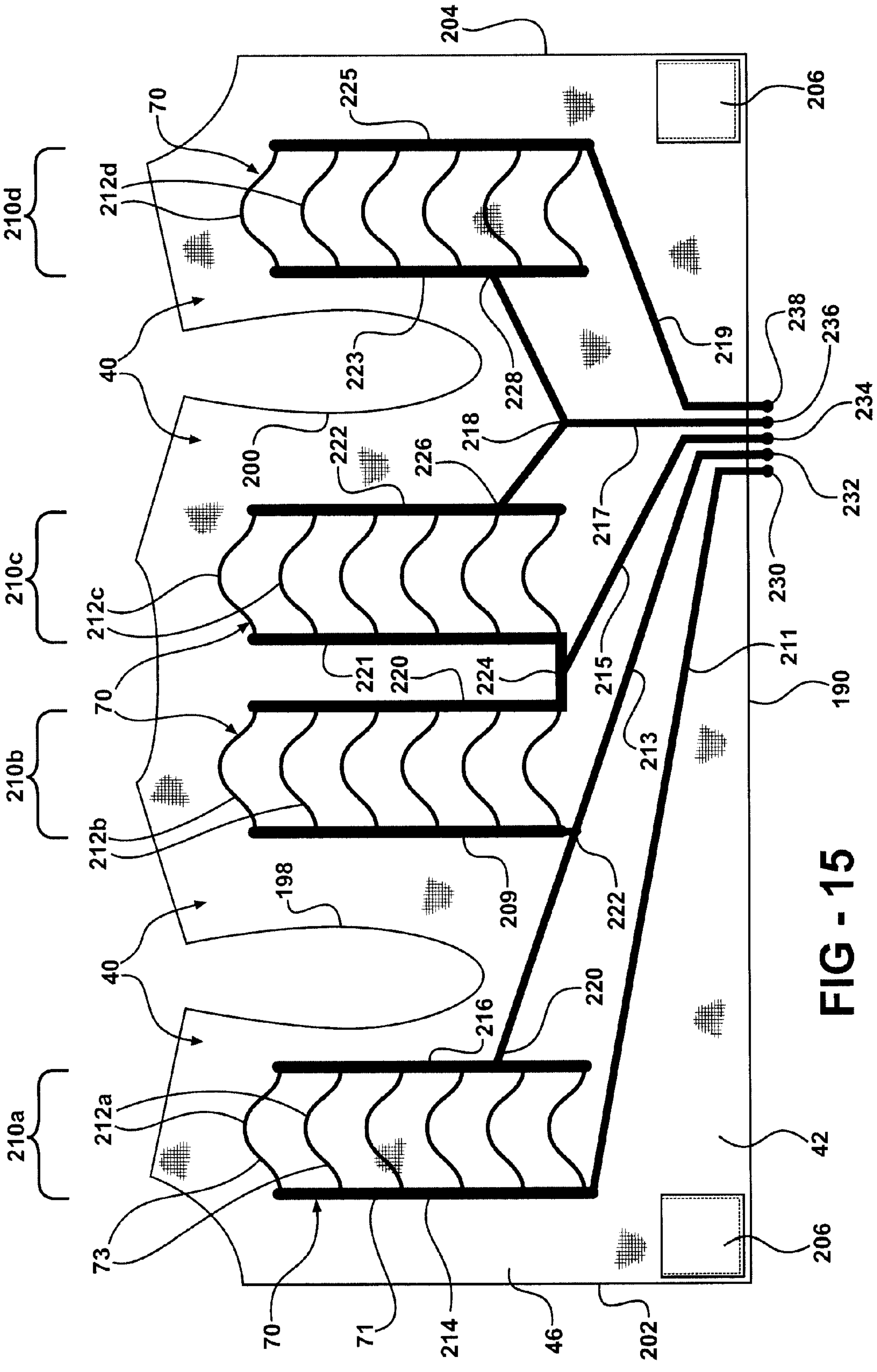
FIG. 15 is a schematic plan view of a heated vest including four heating zones each including a heating element.

The heated textile circuits disclosed herein have a variety of applications. Referring to FIG. 15, a heated vest 190, such as a hunting vest, is depicted. As depicted, vest 190 is not sewn and is laid out to better illustrate the positioning of the heating elements 40. Vest 190 comprises a fabric such as a brushed nylon tricot fabric. In a preferred embodiment, vest 190 is designed to heat to a temperature of about 55° C. within about 2 minutes and includes a heater circuit having a loop resistance of about 16Ω.

Vest 190 comprises four (4) heated regions 210*a*-210*d*. Openings 198 and 200 are sized to accommodate the wearer's arms. Although not shown in the figure, border 202 comprises a fastener such as a zipper, hooks, buttons, VELCRO®, etc., which connects to a corresponding fastener on border 204. Pockets 206 may be provided on the inside or outside of the vest.

When the vest is sewn together and worn, region 210*a* provides heat proximate the right side of the wearer's chest, while region 210*d* provides heat proximate the left side of the wearer's chest. Region 210*c* provides heat proximate the left side of the wearer's back, and region 210*b* provides heat proximate the right side of the wearer's back. Each region 210*a*-210*d* comprises its own plurality of sections 212*a*-212*d*, respectively. Main buses 211-219 supply power to the four heated regions 210*a*-210*d* of vest 190.

A network of buses is provided to connect the resistive sections of each region 210*a*-210*d* to terminals 230, 232, 234, 236, and 238, which are selectively connected to a power supply via an integrated circuit controller (not shown). Bus bar 214 is connected to terminal 230 via main bus 211. Bus bar 216 is connected to terminal 232 via main bus 213 and junctions 220 and 222. Bus bar 209 is connected to terminal 232 via junction 222 and main bus 213. Bus bars 220 and 221 are connected to terminal 234 via main bus 215 and junction 224. Bus bar 222 is connected to terminal 236 via main bus 217 and junctions 218 and 226. Bus bar 223 is connected to terminal 236 via main bus 217 and junctions 218 and 228. Bus bar 225 is connected to terminal 238 via main bus 219.

Because of the configuration of buses and terminals, various combinations of regions 210*a*-210*d* may be heated without heating the entirety of vest 190. Regions 210*a* and 210*b* are individually operable. For example, region 210*a* can be individually heated by connecting terminal 230 to the positive terminal of a power supply and connecting terminal 232 to ground, with terminals 234, 236, and 238 being left open. Region 210*d* can be individually operated by connecting terminal 238 to the positive terminal of a power supply and connecting terminal 236 to ground, with terminals 230, 232, and 234 being left open.

In the embodiment of FIG. 15, regions 210*b* and 210*c* can be operated with other regions. For example, by connecting terminal 236 to the positive terminal of a power supply and connecting terminals 234 and 238 to ground, regions 210*c* and 210*d* can be heated. Terminals 230 and 232 are left open. By connecting terminal 234 to the positive terminal of a power supply and connecting terminals 232 and 236 to ground, regions 210*b* and 210*c* can be heated together. Terminals 230 and 238 are left open. By connecting terminal 232 to the positive terminal of a power supply and connecting terminals 230 and 234 to ground, regions 210*a* and 210*b* can be heated together. Although not separately shown, a battery pack and control module are preferably provided and may be removably attached to vest 190 to allow it to be washed without damaging the electronics or battery. Accordingly, resistive sections 212*a*-212*d* preferably comprise a conductive ink such as a washable, carbon-based ink of the type described previously. Buses 211, 213, 215, 217, and 219 preferably comprise a conductive ink such as a washable silver-based ink, as do bus bars 214, 216, 209, 220, 221, 222, 223 and 225.

Figure 16A:
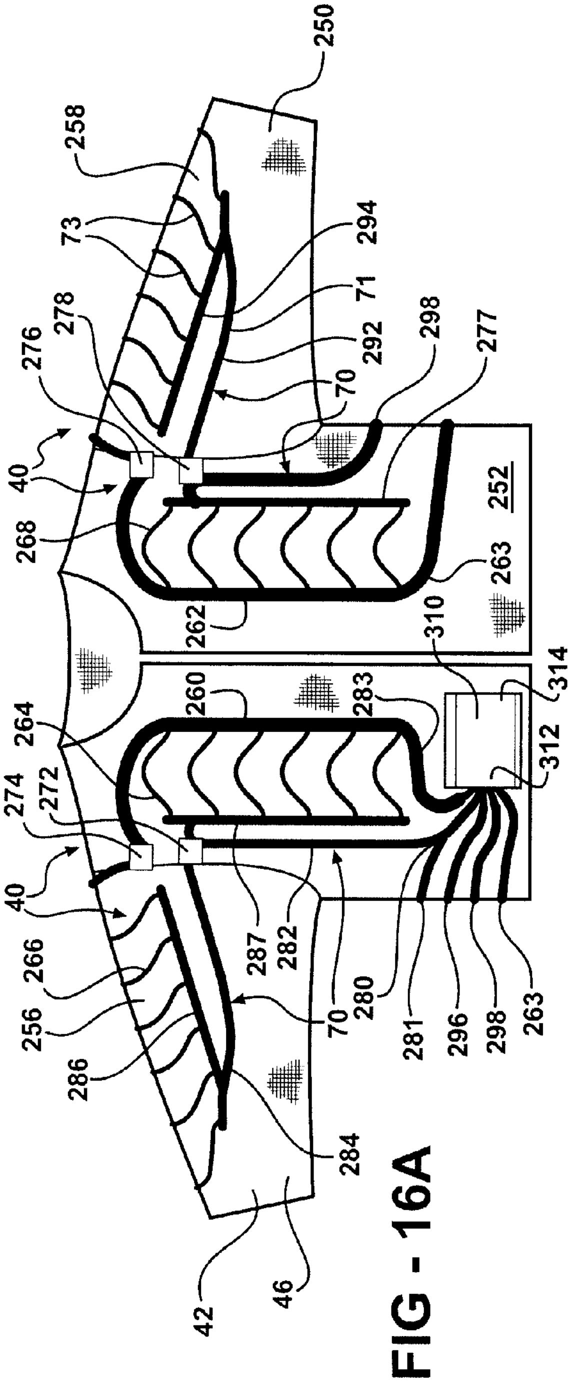
FIG. 16A is a schematic plan view of a heated jacket or shirt including four heated zones as viewed from the front.
Figure 16B:
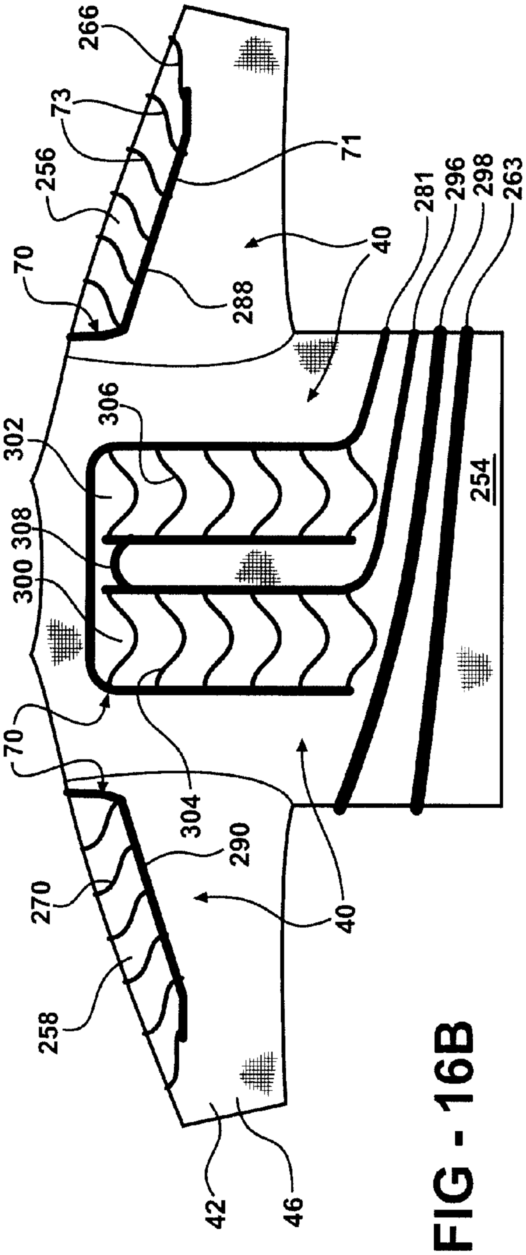
FIG. 16B is a schematic plan view of the heated jacket or shirt of FIG. 16A as viewed from the rear.

Referring to FIGS. 16A and 16B, an embodiment of a heated shirt or jacket 250 is described. FIG. 16A depicts jacket front 252, and FIG. 16*b* depicts jacket back 254. Jacket 250 includes right sleeve heating region 256, left sleeve heating region 258, right chest heating region 260, left chest heating region 262, left back heating region 300 and right back heating region 302. Main bus section 280 is connected to right sleeve region 256 and right chest region 260 via junction 272 and buses 282, 284, 286 and 287. Main bus 280 is also connected to back regions 300 and 302 via bus 281. Main bus 296 is connected to back region 300 and is also connected to back region 302 via connecting bus 308. Main bus 298 is connected to left sleeve region 258 and left chest region 262 via junction 278 and buses 277 and 292. Main bus 263 is connected to left chest heating region 262 and left sleeve heating region 256 via junction 276 and bus 288. Main bus 283 is connected to right chest heating region 260 and right sleeve heating region 258 via junction 274 and bus 290.

Regions 256, 258, 260, 262, 300, and 302 each include a plurality of sections which generate heat when a current is applied to them. Region 256 includes sections 266. Region 260 includes sections 264. Region 262 includes sections 268. Region 258 includes sections 270. Region 300 includes sections 304, and region 302 includes sections 306. Sections 264, 266, 268, 270, 304, and 306 preferably comprise a conductive ink such as a washable carbon-based ink. The depicted bus sections, e.g. 262, 280, 283, 296, 298, etc., preferably comprise a conductive ink, such as a washable silver-based ink.

Jacket 250 preferably includes a detachable battery/integrated circuit. Pocket 314 is provided and is removably affixed to jacket 250 by a removable fastener such as a VELCRO fastener. Battery 310 supplies power to jacket 250 via integrated circuit 312. Integrated circuit 312 preferably includes a controller for providing user operable controls. Integrated circuit 312 may include snap connectors that mate with corresponding snap connectors provided at the terminal ends of buses 263, 280, 283, 296 and 298 allowing the controller and battery to be removably and electrically connected to the heater circuit.

In one exemplary embodiment, integrated circuit 312 includes a temperature controller for regulating the temperature of jacket 250. To provide temperature control, a temperature sensor may be provided and may feedback the jacket temperature to the controller. The temperature sensor may comprise, but is not limited to, a wire, a thread, a piezo sensor, a thermistor, or a probe. However, in a more preferred embodiment, the controller includes a look up table that correlates jacket temperature to a predetermined heating time and voltage. In this embodiment, the user inputs a desired temperature set point and the controller supplies power to one or more regions 256, 258, 260, 262, 300, 302 for a required period of time as dictated by the look up table. In addition, positive thermal coefficient (PTC) materials may be used to provide thermal self-regulation and prevent possible overheating.

In a preferred embodiment, pulsed currents are supplied to the various regions of jacket 250, allowing only specific regions to be heated at any one time. As shown in FIGS. 16A and 16B, regions 260 and 256, regions 258 and 262, and regions 300 and 302, are individually operable as region-pairs by integrated circuit 312. However, integrated circuit 312 may also activate multiple region-pairs as desired. As indicated in the figure, heat can be supplied by regions 260 and 256 by connecting bus 283 to the positive terminal of a power supply and connecting bus 280 to ground, with buses 263, 296, and 298 being left open by a controller in integrated circuit 312. If more than one region-pair is desired to be operated, heat can be supplied, for example, by regions 256, 260, 300, and 302 by connecting bus 280 to the positive terminal of a power supply and connecting buses 296 and 283 to ground, with buses 263 and 298 being left open. Where activation of only a single region-pair is desired, heat can be supplied, for example, by regions 300 and 302 by connecting bus 296 to the positive terminal of a power supply and connecting bus 280 to ground, with buses 263, 283, and 298 being left open. Heat can be supplied by regions 258 and 262 by connecting bus 298 to the positive terminal of a power supply and connecting bus 263 to ground, with buses 280, 283 and 296 being left open. Heat can also be supplied by regions 258 and 262 by connecting bus 263 to the positive terminal of a power supply and connecting buses 298 to ground with buses 296, 280, and 283 being left open.

The heating circuit of FIGS. 16A and 16B can be directly printed on the inner lining of jacket 250. If jacket 600 comprises multiple garment layers, the heating circuit can also be printed on the inner surface of one of the layers to avoid exposing it to the wearer's body or the environment. Also, a protective film layer of the type described previously can be provided on the various buses and conductive layers to protect the circuit. If a film layer is used, it is preferably electrically insulative and thermally conductive to maximize efficient heat transfer to the wearer.

Figure 16C:
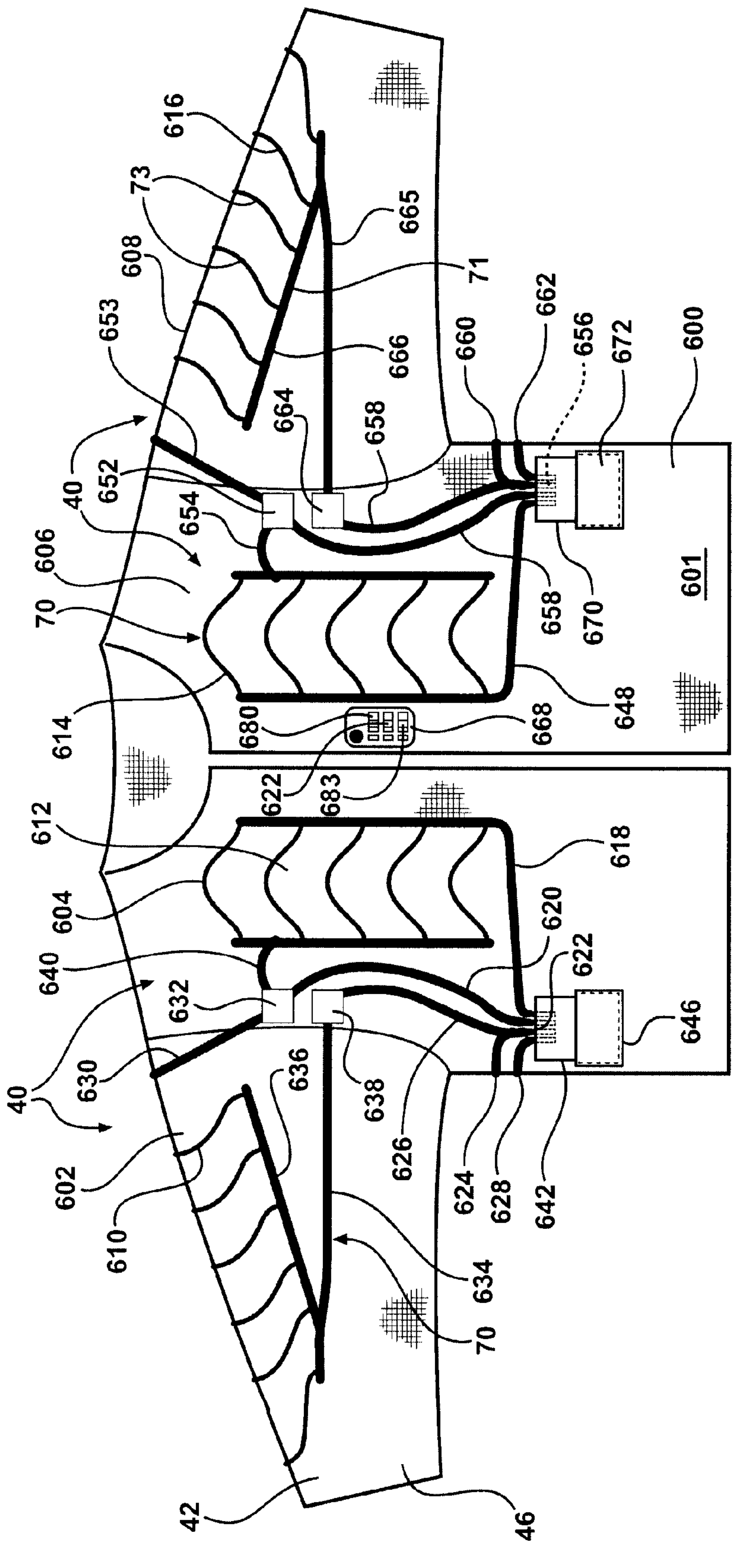
FIG. 16C is a schematic plan view of an alternative embodiment of the heated jacket or shirt of FIGS. 16A and 16B including additional heating zones as viewed from the front.

Referring to FIG. 16*c*, an alternative embodiment of the jacket of FIGS. 16A and 16B is depicted. Jacket 200 comprises a fabric substrate 46 which includes six (6) heating regions: right sleeve heating region 602, left sleeve heating region 608, right chest heating region 604, left chest heating region 606, right back heating region 603 (not shown) and left back heating region 605 (not shown). Heating regions 602, 604, 606, and 608 are individually operable by their respective integrated circuits 642, 656 and comprise section pluralities 610, 612, 614, and 616, respectively. Although not separately depicted, left back heating region 605 is substantially identical to left chest heating region 606, and right back heating region 603 is substantially identical to right chest heating region 604. Thus, right and left back heating regions 603 and 605 contain the same pluralities of sections as their corresponding chest heating regions 604 and 606. The sections in section pluralities 610, 612, 614, and 616 preferably comprise a washable, carbon-based ink, as do the section pluralities (not shown) for left and back heating regions 603 and 605 (not shown).

Jacket 600 includes a network of buses for supplying current to the various sections in each heating region. Unlike the embodiments of FIGS. 16A and 16B, however, the right and left sides of jacket 600 have their own dedicated bus networks, integrated circuits, and power supplies. Starting with the right-side (from the perspective of the wearer) of jacket 600, bus 618 supplies current to right chest heating region 604. Bus 620 supplies current to right chest heating region 604 via junction 632 and bus 640, as well as to right sleeve heating region 602 via junction 632 and bus 630. Although not visible in the figure, bus 630 wraps around the back side of the right sleeve of jacket 620 to connect to section plurality 610.

Bus 622 supplies current to right-sleeve heating region 602 via bus 626, junction 638, and bus 634. It also supplies current to right back heating region 603 via bus 624, which wraps around the back of jacket 600. Bus 628 supplies current to right back heating region 603.

The left side of jacket 600 is configured similarly to the right-side. Bus 648 supplies current to left chest heating region 606. Bus 650 supplies current to left chest heating region 606 via junction 652 and bus 654, as well as to left sleeve heating region 608 via junction 652 and bus 653. Although not visible in the figure, bus 653 wraps around the back of the left sleeve of jacket 600 and connects to section plurality 616. Bus 656 supplies current to left sleeve heating region 608 via junction 664, bus 658, bus 665, and bus 666. Bus 656 also supplies current to left back heating region 605 (not shown) via bus 660, which wraps around the back of jacket 600. Bus 662 supplies current to left back heating region 605. The buses and junctions depicted in FIG. 16*c* preferably comprise a washable, water-based silver ink.

Each side of jacket 600 has its own dedicated power supply and integrated circuit controller. Right side of jacket 600 is powered by battery 646 and driven by integrated circuit 642. Left side of jacket 600 is powered by battery 672 and driven by integrated circuit 670. As in the embodiments of FIGS. 16A and 16B, each side of jacket 600 preferably includes a detachable pocket or other means for removably attaching battery 646/integrated circuit 642 and battery 672/integrated circuit 670. The integrated circuits 642 and 670 may be connected to their corresponding buses in the manner described previously with respect to FIGS. 16A and 16B.

They also may be configured to provide temperature control in a similar fashion. However, because jacket 600 includes separate dedicated buses, controllers and power sources for the right and left sides of the jacket, each side can be individually temperature controlled.

In a preferred embodiment, pulsed currents are applied to the various regions of jacket 600, allowing only specific regions to be heated at any one time. Referring to the right-side of jacket 600, heat can be supplied by region 604 by connecting bus 618 to the positive terminal of a power supply and connecting bus 620 to ground, with buses 622 and 628 being left open. Heat can be supplied by regions 602 and 604 by connecting bus 620 to the positive terminal of a power supply and connecting buses 618, 622, and 626 to ground. Heat can be supplied by regions 602 and 603 (not shown) by connecting bus 622 to the positive terminal of a power supply and connecting buses 620, and 628 to ground, with bus 618 being left open. Heat can be supplied by region 603 by connecting bus 628 to the positive terminal of a power supply and connecting bus 622 to ground, with buses 618 and 620 being left open.

Referring to the left side of jacket 600, heat can be supplied by region 606 by connecting bus 648 to the positive terminal of a power supply and connecting bus 650 to ground, with buses 656 and 662 being left open. Heat can be supplied by region 608 by connecting bus 650 to the positive terminal of a power supply and connecting bus 656 to ground, with buses 648 and 662 being left open. Heat can be supplied by region 608 and 605 (not shown) by connecting bus 656 to the positive terminal of a power supply and connecting buses 650 and 662 to ground, with bus 648 being left open. Heat can be supplied by region 605 (not shown) by connecting bus 662 to the positive terminal of a power supply and connecting bus 660 to ground, with buses 648 and 650 being left open.

User controller 668 is preferably provided to allow the wearer to control the operation of the heated regions 602, 603, 604, 605, 606, and 608. Controller 668 may be connected to integrated circuits 642 and 670 by wires or by a separate network of conductive ink sections disposed on jacket 600. In the embodiment of FIG. 16C, controller 668 includes three user input keys "H", "M," and "L," representing high, medium, and low temperature settings, respectively. It is to be appreciated that the controller 668 may include any number of user inputs and/or temperature settings. The user input keys preferably comprise membrane switches that communicate the desired temperature setting to temperature control circuits in integrated circuits 642 and 670 using one of the temperature control methods described above with respect to FIGS. 16A and 16B. However, integrated circuits 642 and 670 preferably include controllers that have a programmed look-up table that correlates a desired temperature with a voltage and time of operation which is used to control the sequence and duration of heating for the various heating regions 602, 603, 604, 605, 606, and 608.

Figure 17:
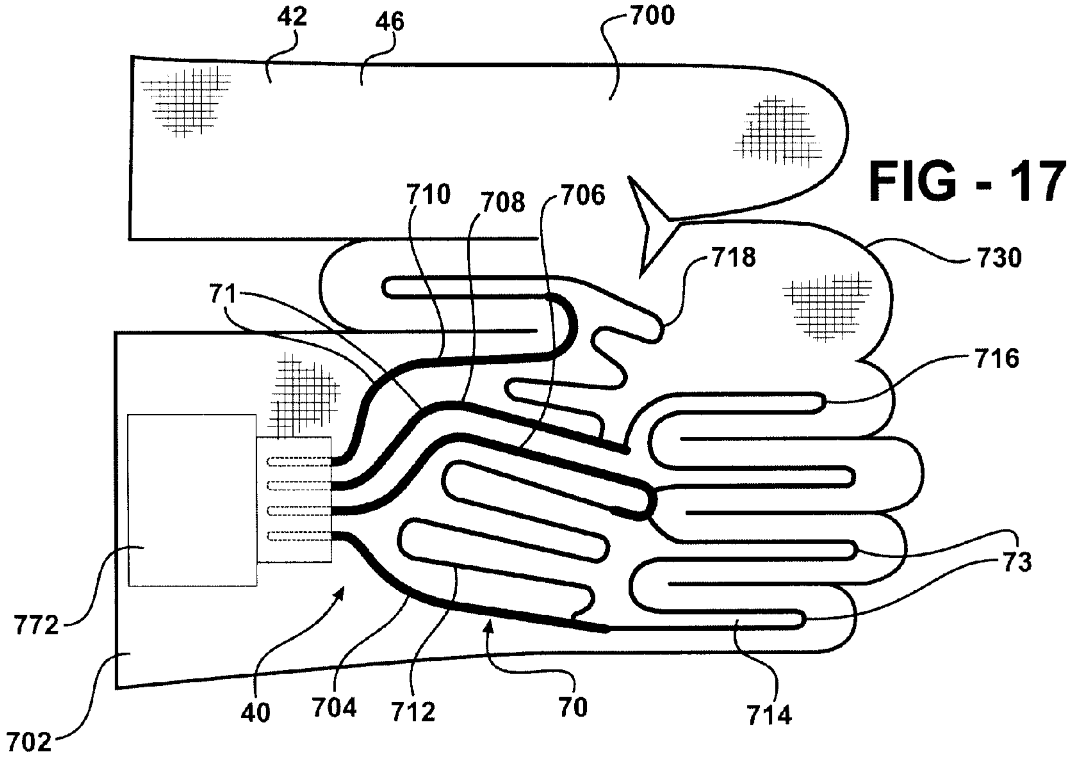
FIG. 17 is a schematic plan view of a heated glove including a heating element, a pulse module and a battery pack.

FIG. 17 shows a heated glove 700 including a substrate 46, a first conductor 704, a second conductor 706, a third conductor 708, a fourth conductor 710, a first heating element 712, a second heating element 714, a third heating element 716, a fourth heating element 718, a pulse control module 720, and a battery 722. Substrate 46 is cut into the shape of a glove upper at perimeter 730. When assembled with a mating glove lower (not shown) and an outer shell (not shown), heated glove 700 will function to heat the hand of the wearer.

Conductors 704, 706, 708, 710 are located on a smooth side of substrate 46 and are generally used to distribute power to heating elements 712, 714, 716, 718. Conductors 704, 706, 708, 710 are highly conductive and are typically printed onto substrate 46 using a printed conductive ink, such as a washable, water-based silver-based ink. In an exemplary embodiment, conductors 704, 706, 708, 710 are about 10 mm in width.

Heating elements 712, 714, 716, 718 are typically compositions and are used to generate heat for heated glove 700. Each heating element 712, 714, 716, 718 comprises a sections formed from a conductive ink such as a washable, water-based carbon ink. In an exemplary embodiment, heating elements 712, 714, 716, 718 are about 8 mm in width.

Heating elements 712, 714, 716, 718 are preferably printed onto substrate 46 and, at their ends, generally overlap conductors 704, 706, 708, 710 to make an electrical connection thereto. Heating elements 714 and 716 are located in areas advantageous to heat fingers. Heating element 712 is located in a region to heat the top of the hand. Heating element 718 is located in an area to heat the thumb region. When current is switched through a pair of conductors 704, 706, 708, 710, the associated heating elements 712, 714, 716, 718 are activated.

For example, when a positive voltage is applied to conductor 710 and conductor 708 is grounded, current will flow through heating element 718 and heat is generated by heating element 718. Similarly, if a positive voltage is applied to conductor 706 and conductors 704 and 708 are grounded, current will flow through heating elements 714 and 716 and heat will be generated by them.

Figure 18:
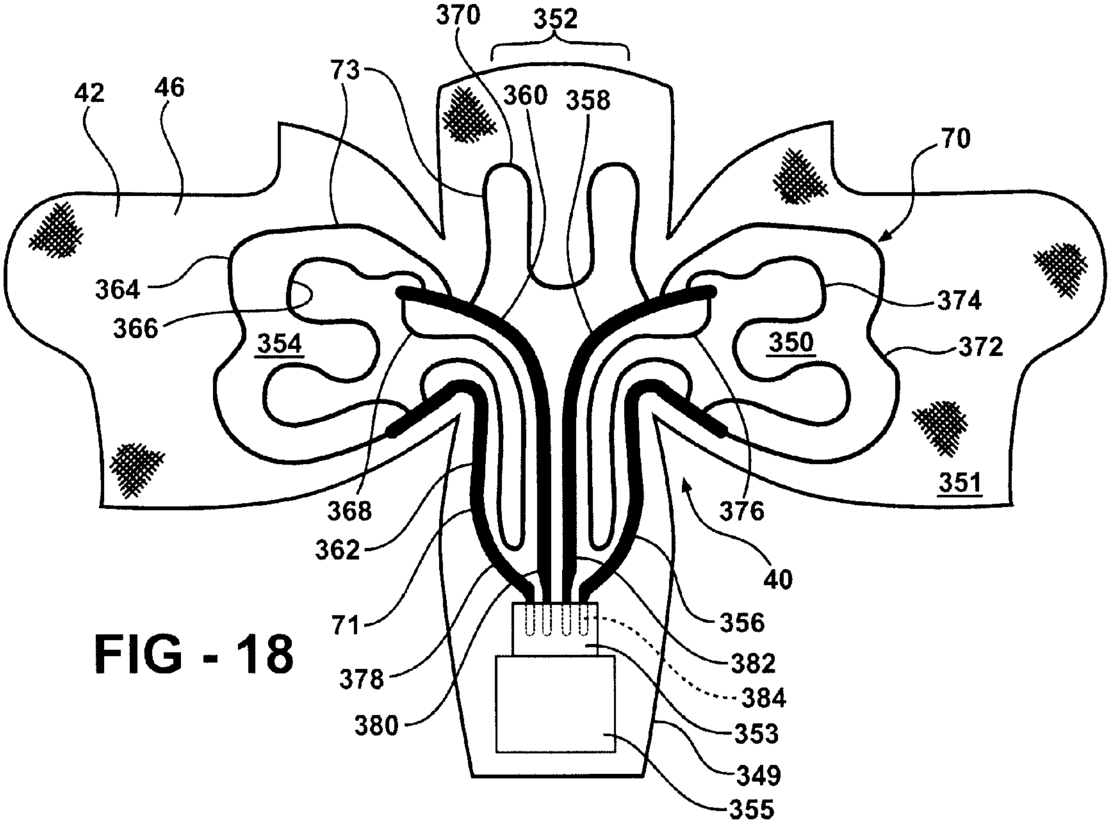
FIG. 18 is a schematic plan view of a heating element for a hat.

Referring to FIG. 18, a heated textile for a hat is depicted. Heated textile circuits of the type described herein may comprise a variety of shapes, including irregular and decorative patterns. One such pattern is depicted in FIG. 18. Referring to FIG. 18, textile heater circuit 349 is preferably applied to a woven, non-woven, or knit fabric substrate 46 using the printing methods describe herein. The heated textile of FIG. 18 is sewn into the lining of a hat, preferably with the circuit 349 facing away from the wearer's head.

In one exemplary embodiment, substrate 46 comprises a brushed nylon tricot having a brushed side and a smooth side. Circuit 349 is printed on the smooth side of substrate 46 and includes individual heating regions 350, 352, and 354. Region 350 comprises ink sections 372, 374, and 376. Region 352 includes section 370. Region 354 comprises sections 364, 366, and 368. Bus 362 connects terminal 378 to region 354. Bus 360 connects terminal 380 to region 354 and region 352. Bus 358 connects terminal 382 to region 350 and 352, and bus 356 connects terminal 384 to region 350. Bus terminals 378, 380, 382, and 384 are preferably connected to an integrated circuit controller 353 that allows power to be supplied to buses 378, 380, 382, and 384 as desired.

By connecting terminals 378, 380, 382 and 384 to an integrated circuit controller, regions 350 and 354 can be individually heated, for example, by supplying alternating pulses of current to terminals 378 and 384, respectively, while connecting terminals 380 and 382 to ground. Region 352 can be heated by supplying current to terminal 380 and switching terminal 382 to ground (or vice-versa). Sections 364, 366, 368, 370, 372, 374, and 376 are preferably printed, washable conductive inks. Buses 356, 358, 360, and 362 are preferably printed, washable conductive inks. In an exemplary embodiment, textile heater circuit 349 heats up to a temperature of about 45° C. in about one (1) minute.

Figure 19:
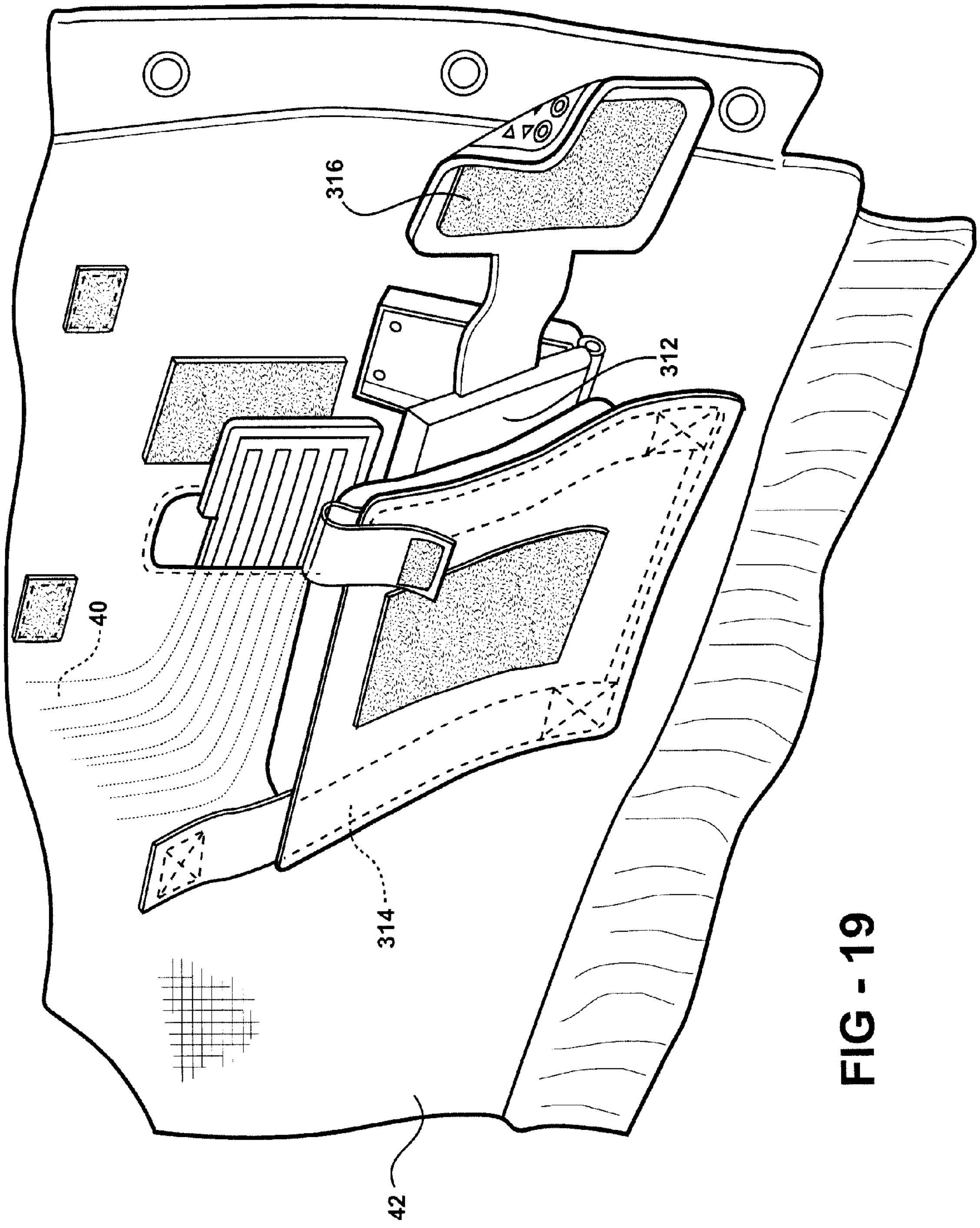
FIG. 19 is a fragmented perspective view of a jacket pocket used to retain a battery and control module for operating one or more heating elements disposed in the jacket.
Figure 20:
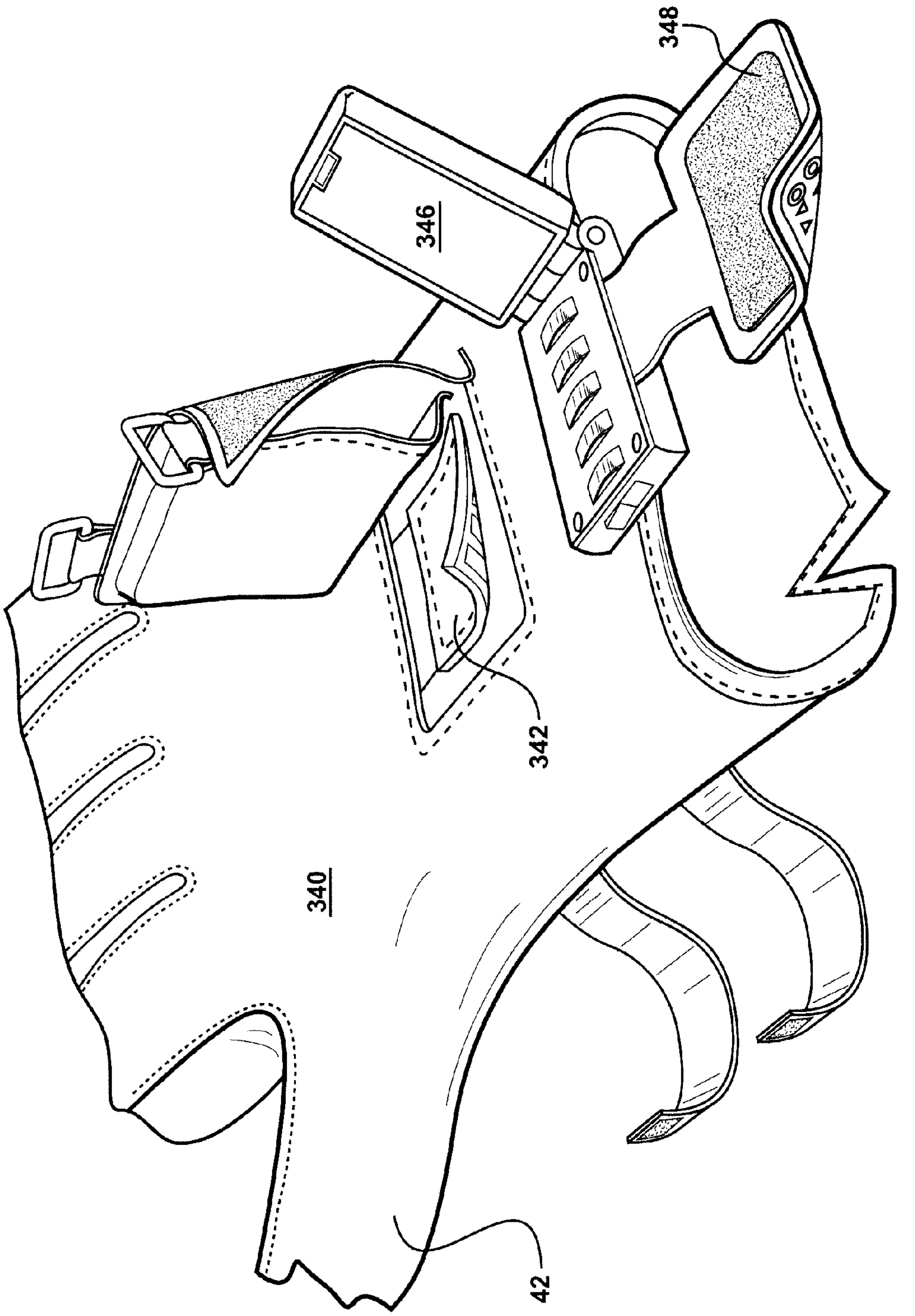
FIG. 20 is a fragmented perspective view of a glove apparatus for retaining a battery and control module for operating one or more heating elements attached to the glove.
Figure 21A:
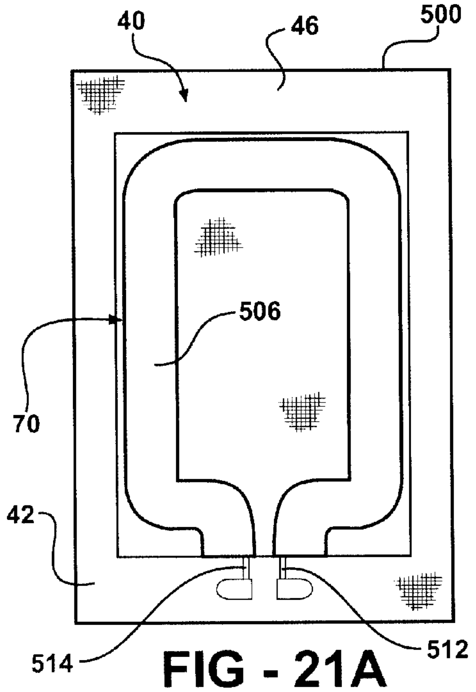
FIGS. 21A-21D are plan views of different configurations of stand-alone, heated textile inserts.
Figure 21B:
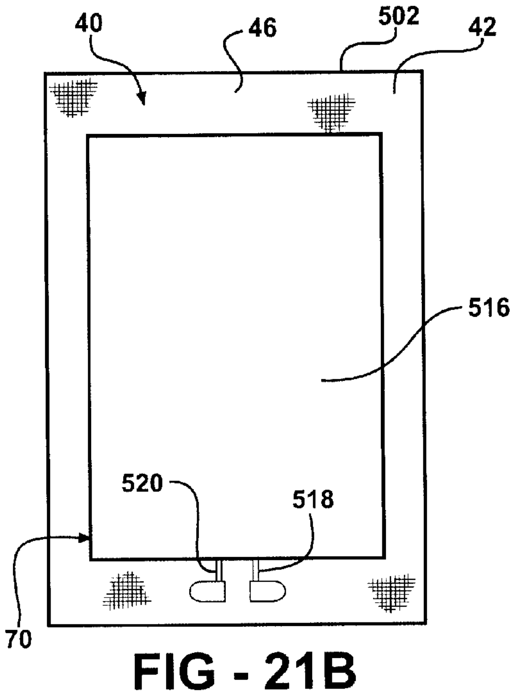
Figure 21C:
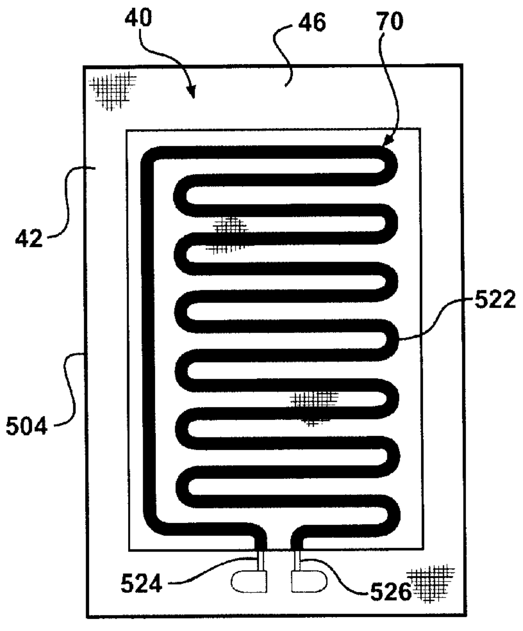
Figure 21D:
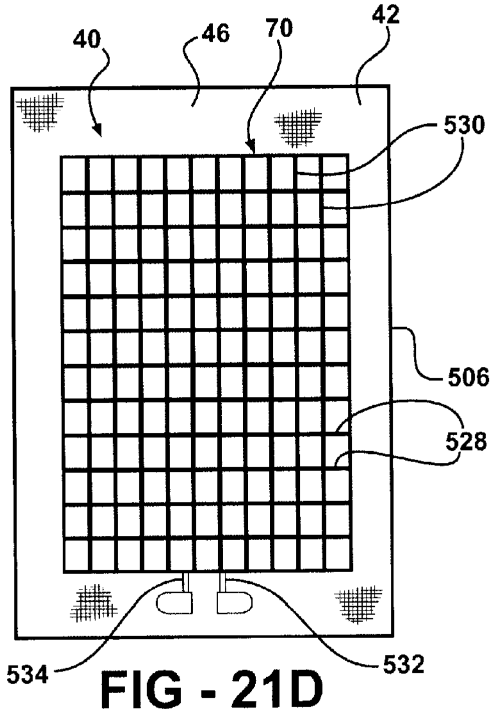

Referring to FIG. 19, a battery and control module of the type suitable for the jacket of FIGS. 16A and 16B is depicted. FIG. 20 depicts a similar module for use in a glove.

Heated textiles prepared in accordance with the embodiments described herein may also comprise stand alone heater pads that are sewn into the article 42, e.g. clothing, heated seats, etc., and which comprise a printed ink heater or an inherently conductive fabric. Referring to FIGS. 21A-D, four heater pad designs are shown. In one exemplary embodiment, heater pads 500, 502, 504, and 506 are about 8 inches by 5 about inches (length by width) and have ink coverage of about six inches by about 4 inches. Each pad comprises a conductive ink applied to a fabric substrate 46, preferably by one of the printing processes described previously. Each of the heater pads comprises an ink which may be conductive, but which is dimensioned to provide a loop resistance of from about 1252 to about 180. As these embodiments illustrate, even though the ink may be conductive, its surface area coverage can be modified to provide the loop resistance necessary to generate heat.

Each pad 500, 502, 504, and 506 is preferably washable and is sewn into the lining of a garment. Power is supplied to the pads by wires or conductive ink sections connected to a power supply, such as a battery.

Referring to heater pad 500, ink section 510 is comprises a washable, water-based silver ink that is dimensioned to provide the above-referenced loop resistance. Section 510 is connected to terminals 512 and 514 which are in turn connected to a power supply.

Pad 502 comprises a substantially uniform ink layer 516 printed across a rectangular portion of pad 502. Because of the extensive ink coverage in pad 502, layer 516 preferably comprises a combination of silver and carbon based inks in order to obtain a loop resistance in the range of from about 12Ω to about 18Ω. Terminals 518 and 520 connect pad 502 to a power supply.

Pad 504 comprises ink section 522 which preferably comprises a washable, silver-based ink that is dimensioned to provide the desired loop resistance. Section 522 defines several coils and includes terminals 524 and 526. The use of the coil design in pad 504 provides increased section length, which allows the desired loop resistance to be obtained with a conductive ink Pad 506 comprises a checker-board pattern of highly conductive ink rows 528 and columns 530. Terminals 532 and 534 connect pad 506 to a power supply. Pads 500, 502, 504, and 506 may also comprise one or more electrically insulative and thermally conductive film layers to protect their respective ink sections from environmental damage.

In accordance with additional embodiments of heated textiles, an inherently conductive fabric is provided which includes a conductive ink bus that is applied to it, preferably by printing. Referring to FIG. 22, heated textile 392 comprises an inherently conductive fabric substrate 46. Substrate 46 may be woven or non-woven. However, in an especially preferred embodiment substrate 46 comprises a conductive, non-woven carbon or carbon polyester fabric such as Grade 8000020 carbon fabric or Grade 8168902 carbon fabric supplied by Hollingsworth & Vose of East Walpole, Mass. Non-woven fabrics are especially preferred because of their lower cost and their multi-directional dimensional stability. Heated textile 392 preferably heats to a temperature of about 45° C. in about one (1) minute and has a loop resistance of from about 12Ω to about 18Ω. In an exemplary embodiment, the inherently conductive non-woven fabric has a resistivity of from about 1 KΩ per 2 cm square to about 1 MΩ per 2 cm square.

Heated textile 392 also comprises a conductive ink section 396, which in the embodiment of FIG. 22 is provided in the shape of a generally square spiral. Conductive ink section 396 is preferably a silver/nickel ink mixture. In an exemplary embodiment, conductive ink section 396 has a resistivity of from about 0.2Ω per 2 cm square to about 1Ω per 2 cm square. Ends 398 and 400 are preferably connected to a power supply to provide current to section 396. Section 396 is conductive and does not generate appreciable heat when power is supplied to it. However, when power is supplied to section 396, current is supplied to substrate 46, which generates heat due to its inherently conductive nature. Heated textile 392 is preferably provided in the form of an insert that is sewn into a garment, car seat, etc. In any given article, multiple heated textile inserts 392 may be used to provide the required heat load.

Conductive section 396 may be applied to one or both sides of substrate 46. In a preferred embodiment each side of substrate 46 is laminated with a protective film. An especially preferred protective film is a three-film composite of two low melt polyester films sandwiching a high-melt polyester or polyurethane film. In one embodiment, the low melt polyester films have a melting point of about 200° F. to about 220° F., and the high melt polyester film has a melting point of about 280° F. to about 300° F. The film composite is preferably self-cauterizing to allow conductive section 396 to be sealed off in the event of breakage, thereby reducing the possibility of overheating or temperature excursions. For example, if the conductive section 396 breaks or frays in a jagged manner, arcing may occur, which can cause the circuit to heat up. In that case, the three-film composite melts to seal off the jagged or frayed section, thereby reducing or preventing further arcing.

In an alternative embodiment, section 396 may be conductive and substrate 46 may be inherently conductive, e.g. a nickel coated carbon fiber non-woven fabric such as Grade 8000838 Nickel Carbon supplied by Hollingsworth & Vose. In an exemplary embodiment, the inherently conductive non-woven fabric has a resistivity of from about 1.4Ω per 2 cm square to about 75Ω per 2 cm square. In this embodiment, a power supply is preferably connected to two opposite sides of the inherently conductive fabric substrate 46.

FIG. 23 depicts another heated textile insert 391 comprising an inherently conductive fabric, non-woven substrate 46 and a conductive ink section 395. Exemplary resistivities of the fabric and the ink include those described in the previous embodiment. Substrate 46 is preferably an inherently conductive non-woven fabric such as the type described previously. Conductive ink section 395 is preferably a silver-nickel ink of the type described previously. Insert 391 preferably includes a self-cauterizing, three-film composite such as the one used in the embodiment of FIG. 22.

Referring to FIG. 24, another embodiment of a heated textile insert suitable for incorporation into a garment, car seat, etc., is described. Like the previous embodiments, heated textile 410 includes an inherently conductive, non-woven fabric substrate 46. Exemplary resistivities of the inherently conductive non-woven fabric range from about 1.0 KΩ per 2 cm square to about 1.4 MΩ per 2 cm square Instead of a conductive ink bus section, however, conductive bus bars 414*a* and 414*b* comprise an inherently conductive, non-woven fabric such as a nickel-coated carbon fiber non-woven fabric. In a preferred embodiment, bus bars 414*a* and 414*b* comprise Grade 8000838 Nickel Carbon fabric supplied by Hollingsworth & Vose. Exemplary resistivities of the inherently conductive non-woven fabric range from about 1.4Ω per 2 cm square to about 75Ω per 2 cm square.

Bus bars 414*a* and 414*b* are preferably connected to a power supply and supply current to substrate 46, which owing to its inherently conductive nature, generates heat. Bus bars 414*a* and 414*b* may be affixed to substrate 46 by a variety of means such as a conductive adhesive. In addition, they may simply be held in place by laminating the heated textile 410 with film layers on both sides thereof.

Figure 25:
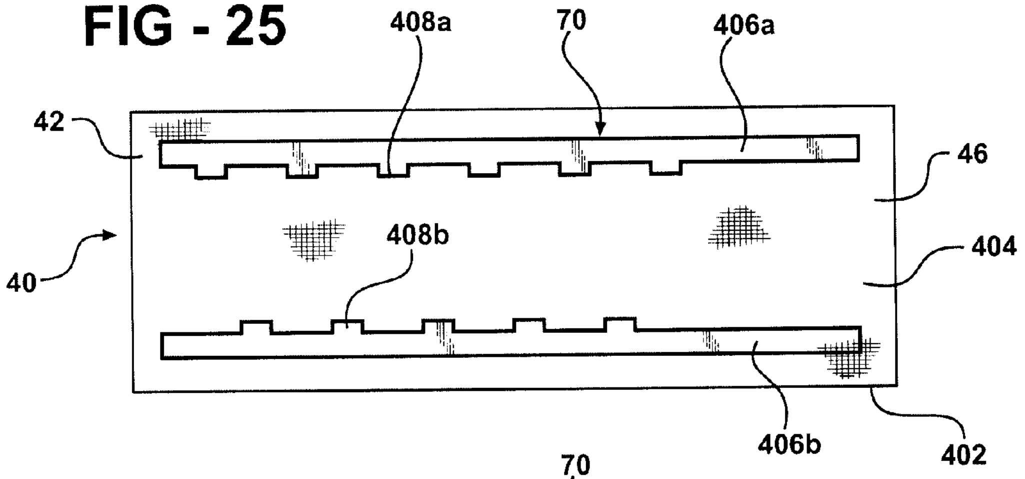
FIG. 25 is a plan view of another embodiment of the heating element comprising an inherently conductive fabric.

Referring to FIG. 25 a modified version of the embodiment of FIG. 24 is depicted. In this embodiment, conductive bus bars 406*a* and 406*b* are disposed on inherently conductive non-woven fabric substrate 46. Conductive bus bars are preferably a nickel-coated carbon fiber non-woven fabric. In this embodiment, however, bus bars 406*a* and 406*b* include projections 408*a* and 408*b* along the length of bus bars 406*a*-406*b*. Projections 408*a* and 408*b* are preferably offset from one another.

Figure 26:
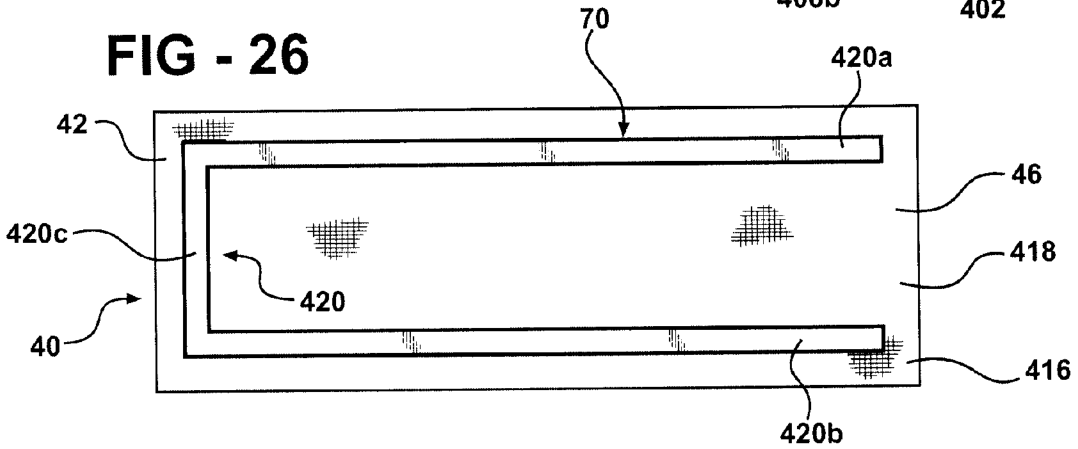
FIG. 26 is a plan view of another embodiment of the heating element comprising an inherently conductive fabric.

Referring to FIG. 26, another modified version of the embodiment of FIG. 24 is depicted. In this embodiment, a generally U-shaped conductive bus 420 is provided which comprises sections 420*a*, 420*b*, and 420*c*. Substrate 46 is an inherently conductive non-woven fabric of the type described previously. Conductive bus 420 is preferably a conductive non-woven fabric of the type described previously. A power supply is connected to bus 420 and substrate 46 proximate bus locations 420*a* and 420*b* to distribute current to substrate 46, thereby generating heat.

As indicated previously, heated textiles prepared in accordance with the embodiments described herein are well-suited for heating seats such as transportation seats, e.g. cars, boats, buses, airplanes, motorcycles, toddler seats, and bicycle seats. In heated seat applications, an inherently conductive foam, a foam impregnated with a conductive material or coating, or a foam with a conductive ink heating circuit may be used to generate heat by connecting the foam or ink to a power supply. As suggested above, a foam or fiberfill with a pressure responsive resistance may also be advantageously used to provide pressure responsive, switchable heating. In certain embodiments, a conductive bus and conductive heating circuit may be printed on a film, such as a PET film which is then placed between the seat fabric and inner seat foam.

Figure 27:
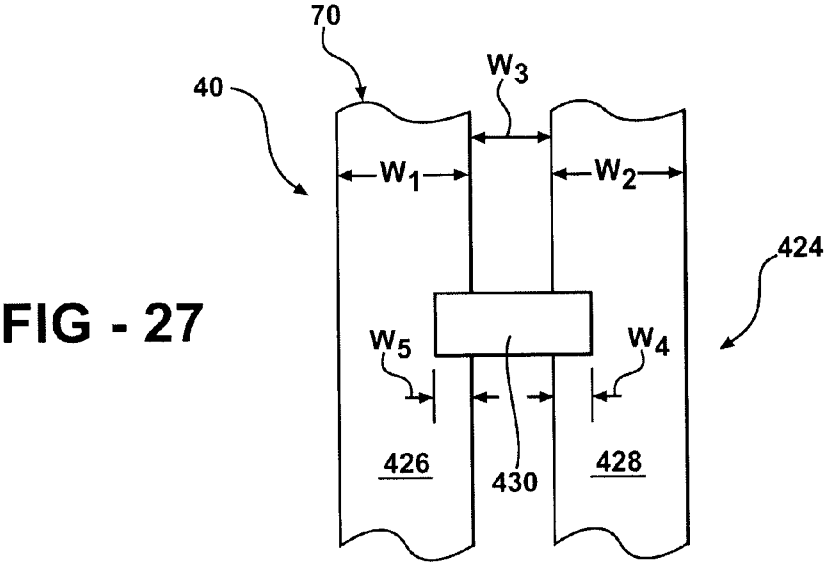
FIG. 27 is a fragmented plan view of an embodiment of the heating element.

Referring to FIG. 27, a portion of another embodiment of a textile heating circuit is depicted. In the embodiment of FIG. 27, conductive ink sections 426 and 428 are printed onto a fabric as described previously. Conductors 426 and 428 are connected to a power supply and are preferably spaced apart at a distance that is less than their respective widths. Conductive ink section 430 generates heat when a current is applied to it and is printed between conductive sections 426 and 428 so as to partially overlap each of them. In one exemplary embodiment, conductive ink section 430 overlaps about one-quarter of the width of conductive ink sections 426 and 428, and conductive ink sections 426 and 428 are separated by a distance that is less than or equal to half of their respective widths. In a preferred embodiment, section widths W1 and W2 are each about 4 mm wide and the conductive section separation, W3, is about 2 mm in width. The overlap widths, W4 and W5, between conductive section 430 and conductive sections 426 and 428 are about 1 mm each. It has been found that a heating circuit configured in accordance with the embodiment of FIG. 27 produces a higher current flow and a lower overall loop resistance, thereby allowing the conductive sections to generate more heat while consuming less power.

Heated textiles such as those described herein may also be advantageously used with certain classes of fabrics that are stretchable in a specific direction. For example, in woven or knit fabrics a heater circuit may be printed in the direction of the warp or weft. If the circuit is printed in the warp direction, upon stretching in the warp direction the warp threads will come closer together, thereby decreasing resistance. Conversely, if a warp-printed circuit is pulled in the weft direction, the warp threads will separate, causing resistance to increase. The changes in resistance can be advantageously used to detect a switching event.

As mentioned previously, heat transfer printing processes can be advantageously used to apply heating circuits of the type described herein to a textile. In accordance with an embodiment of a heat transfer printing process, an ink or paste circuit comprising a conductive portion and a conductive bus portion is printed on a release paper in reverse. One exemplary type of suitable release paper is a paper that is cast coated with a silicone release agent. Also, chromium complex-based release papers such as QUILON® may be used. In certain embodiments, a paper coated with a low-cohesive strength release coating made of an ethylene/acrylic acid copolymer coating may be used. The use of a low-cohesive strength release coating causes the release coating to split from the release paper, thereby improving ink transfer to the textile and applying a protective coating to the heating circuit.

Once the heating circuit has been printed on release paper, it may be stored for future use or transported to the location where it will be applied to the desired textile. The heating circuit is placed in contact with the textile, and heat and pressure are applied. Iron-on heat transferring can be used. However, for commercial applications, heat presses are preferred. After applying heat and pressure, the release paper is peeled off, leaving the printed circuit on the textile. The process advantageously reduces ink usage that is sometimes incurred by directly printing on fabric. Generally speaking, the heat transfer process runs at a temperature range from about 375° F. to about 425° F. and a pressure of from about 40 psi to about 80 psi. The inks used to form the heating circuit are preferably washable, durable, and flexible after being applied.

In one embodiment, the ink used to print the conductive sections of a heating circuit is a film forming ink. When applied to a fabric via a heat transfer printing process, a film-forming ink will form a film that bridges the gaps and interstices in the fabric. In one exemplary embodiment, the ink comprises the plastisol component, as described and exemplified above, that facilitates film formation. In another exemplary embodiment, a suitable film-forming conductive ink comprises about 49 percent CDI 14644 carbon dispersion, about 42.25 percent Zeneca R-972 Urethane dispersion, about one (1) percent RM-8W Rohm & Haas flow thickener, and about 7.75 percent diethylene glycol humectant (all percentages by weight). In a further exemplary embodiment, a suitable conductive film-forming ink comprises about 29.8 percent of a Zeneca R972 urethane dispersion, about 1 percent of a C. J. Patterson, Patcoat 841 Defoamer, about 45.2 percent of HRP Metals D3 Silver powder, and about 24 percent of Technics 135 silver flakes, with all percentages by weight.

In other embodiments where fabric breathability is desired, the ink is a non-film forming ink that surrounds individual fibers of the fabric without bridging the gaps and interstices. Generally speaking, non-film forming inks are low solids inks that comprise low solids resins or which are diluted with water to provide a low solids concentration. In addition to using heat transfer printing, non-film forming inks can advantageously be printed directly onto a textile.

The heated textile articles described herein can be applied in a plurality of situations, including, but not limited to, seats in planes, trains, cars, ships, bicycles, and subways, as well as bedding, towels, carpets, blankets, pillow cases, tents, sleeping bags, clothes, hats, gloves, water craft, portable seats or cushions, sofas and other furniture. They may also be used in other applications. For example, they may be set on the top, head liner, side panels, doors, floor panels, under the hood, and/or in the trunk of vehicles. When it is set on the top of vehicles, the electrically conductive section may be used as an antenna of the receiving and broadcast type. A heat reflecting device may also be provided to deflect heat generated by the heater.

In another embodiment, a heated article may include several heated textiles, each comprising its own substrate 46. The substrates 46 may be separately set in the object of interest. In one embodiment, a bus for supplying power to several substrates 46 is created. In accordance with this embodiment, several substrates 46, each comprising an inherently conductive fabric or a conductive ink printed on a fabric are connected by a conductive material, such as a metal. One substrate 46 is connected to the power supply and then routes power from the same power supply to all the other substrates 46. For example, separate substrates 46 can be set on the seat bottom, the seat back, head rest, and foot rest of a sofa while only the substrate 46 on the seat bottom (or one of the other parts) is connected to the power supply. Because the various substrates 46, e.g. the seat bottom, the seat back, head rest, and foot rest, are connected by conductive materials, the various circuits will be connected. This method advantageously uses only one power supply and power bus to distribute heat to several locations, e.g. the seat back, head rest and foot rest of a sofa.

Figure 28:
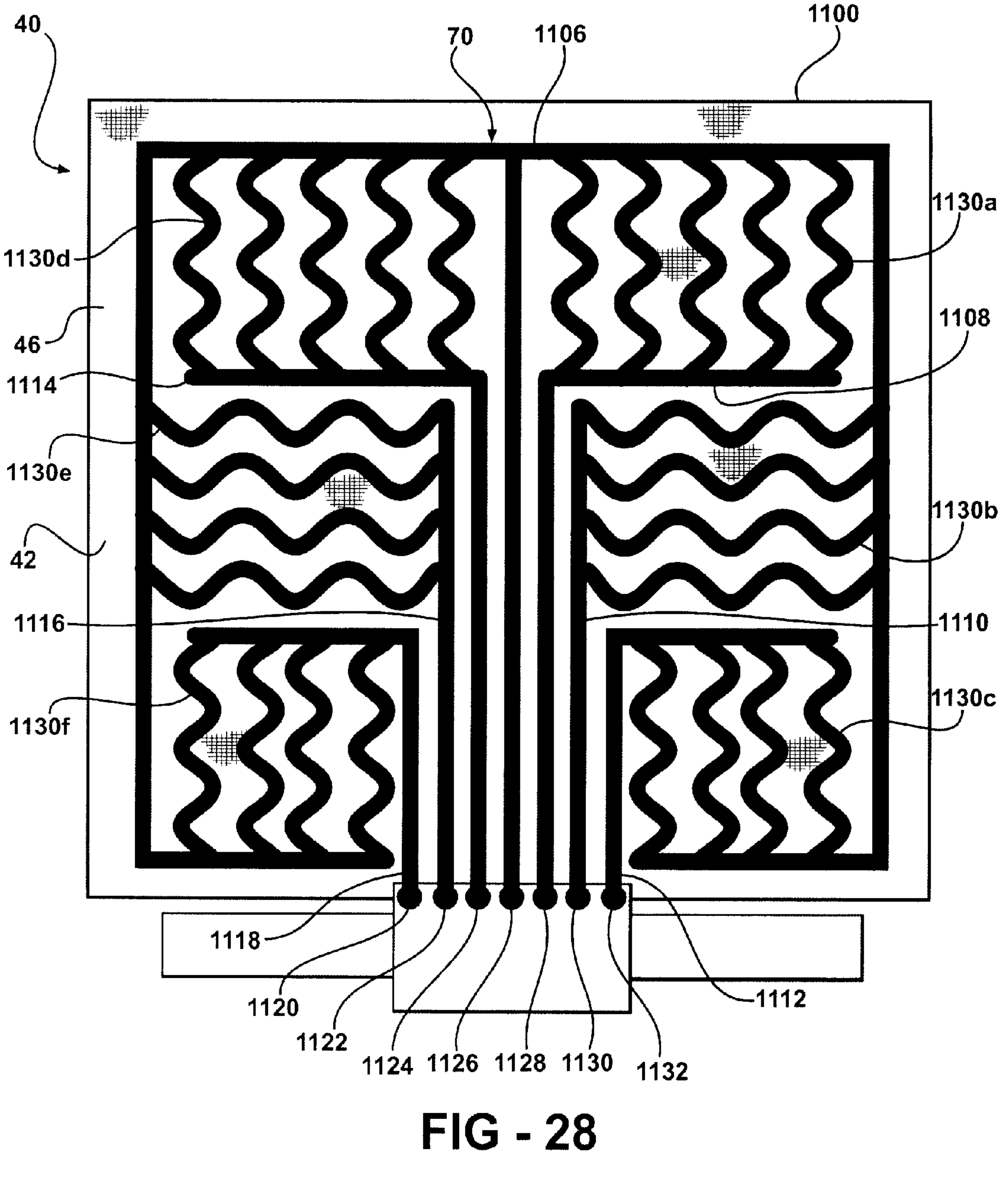
FIG. 28 is a plan view of a heating pad having a plurality of heating elements.

FIG. 28 shows a heating pad 1100 including multiple heating elements 1130*a*-1130*f*. Although heating pad 1100 may appear to be similar to circuit 100 of FIG. 11, heating pad 1100 is a non-switched multiple heating circuit embodiment used when to illustrate the driving circuits explained below in detail with respect to FIGS. 29-31. Heating pad 1100 includes contact terminals 1120, 1122, 1124, 1126, 1128, 1130, 1132. The driving circuits provide current through specific loop paths within heating pad 1100. For example, common bus 1106 connects to each heating element 1130*a*-1130*f*. Separate busses 1108, 1110, 1112, 1114, 1116, 1118 allow for individual switching of heating elements 1130*a*-1130*f* providing zone-based heating. As described below in detail, switching elements, e.g. transistors, are used to control current flow through heating elements 1130*a*-1130*f*. Heating pad 1100 includes six (6) switchable heating elements 1130*a*-1130*f*. The control circuits shown below include five (5) switching elements, but may include more or less depending upon the number of circuits for switching, and the type of load switched. Thus, where each of the six (6) heating elements 1130*a*-1130*f* is to be individually controlled, six elements are necessary in a low-side drive configuration.

Contact terminals 1120, 1122, 1124, 1126, 1128, 1130, 1132 are intended to be connected to driving circuits and power circuits. For example, in a low-side drive configuration for a controller, busses 1108, 1110, 1112, 1114, 1116, 1118 would be connected through terminals 1120, 1122, 1124, 1128, 1130, 1132. Terminal 1126 is then connected to a positive voltage supply, e.g. the positive terminal of a battery. As shown below in detail, the terminals 1120, 1122, 1124, 1126, 1128, 1130, 1132 provide access for power and driving circuits. Generally, each heating element 1130*a*-1130*f* may be switched "on," e.g. switched to provide current flowing through heating element 1130*a*-1130*f* to produce heat, either together or sequentially.

Figure 29:
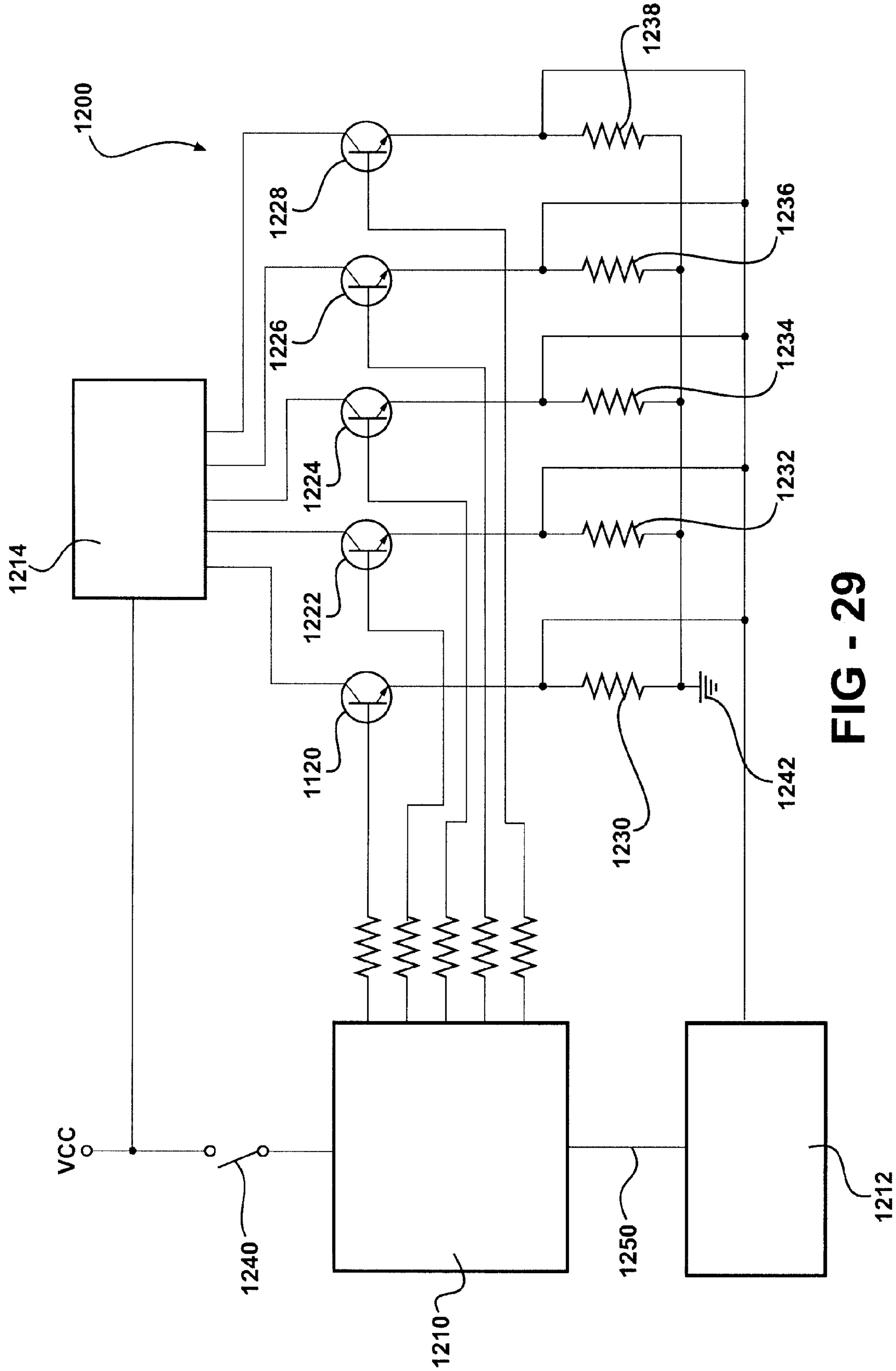
FIG. 29 is a schematic diagram of a heater circuit of a control system for driving the heating elements.

FIG. 29 shows a heater circuit 1200 that includes a control circuit 1210, a current sense circuit 1212, a heating pad 1214, a plurality of transistors 1220, 1222, 1224, 1226, 1228, a plurality of current sense resistors 1230, 1232, 1234, 1236, 1238, and a main switch 1240. Transistors 1220, 1222, 1224, 1226, 1228 are NPN type transistors in a low-side drive configuration. The collectors of transistors 1220, 1222, 1224, 1226, 1228 are connected to heating pad 1100 at contact points 1120, 1122, 1124, 1126, 1130 of heating pad 1100 (described in detail above with respect to FIG. 28). A selectively engageable positive voltage is applied to contact point 1126 of heating pad 1100 as a common distribution bus. As used herein, the term "transistor" is used for convenience to refer to a transistor, JFET, or pass element capable of passing sufficient current employing technologies known to those skilled in the art.

Current sense resistors 1230, 1232, 1234, 1236, 1238 are connected in series between the emitters of transistors 1220, 1222, 1224, 1226, 1228, respectively, and a common ground 1242. Current sense resistors 1230, 1232, 1234, 1236, 1238 may be all the same value, or may be selected based on the resistance and/or characteristics of the heating elements of heating pad 1100. The resistance ranges of current sense resistors 1230, 1232, 1234, 1236, and 1238 are generally from about 0.1Ω to about 1.0Ω, with a resistance of about 0.5Ω being preferred.

Current sense circuit 1212 provides a current sense signal 1250 to control circuit 1210 that represents the magnitude of current being passed through the presently operating heating element. The current may be determined for each of heating elements 1130*a*-1130*f* individually because, even though there is only one sensing circuit 1212, the sensed current is a measurement of the element under power at that time. That is to say, when one of heating elements 1130*a*-1130*f* is switched on by itself (alone), the current sensed is due to the current flowing through that heating element 1130*a*-1130*f* that has current flowing through it.

Controller 1210 includes logic and drives the bases of transistors 1220, 1222, 1224, 1226, 1228 to activate the heating elements. The drive waveforms are shown below in detail below, with respect to FIG. 30. Controller 1210 may be embodied as an analog control, a logic circuit, or a microcontroller-based solution. Main switch 1240 activates control circuit 1210 for powering the elements of heating pad 1214.

Through the use of current sense resistors 1230, 1232, 1234, 1236, 1238, heater circuit 1200 is a closed-loop system. That is to say that controller 1210 may increase or decrease the power of each heating element to a predetermined heating scheme. Moreover, current sense resistors 1230, 1232, 1234, 1236, 1238 allow an adjustment for variations in each of heating elements 1130*a*-1130*f*.

Figure 30:
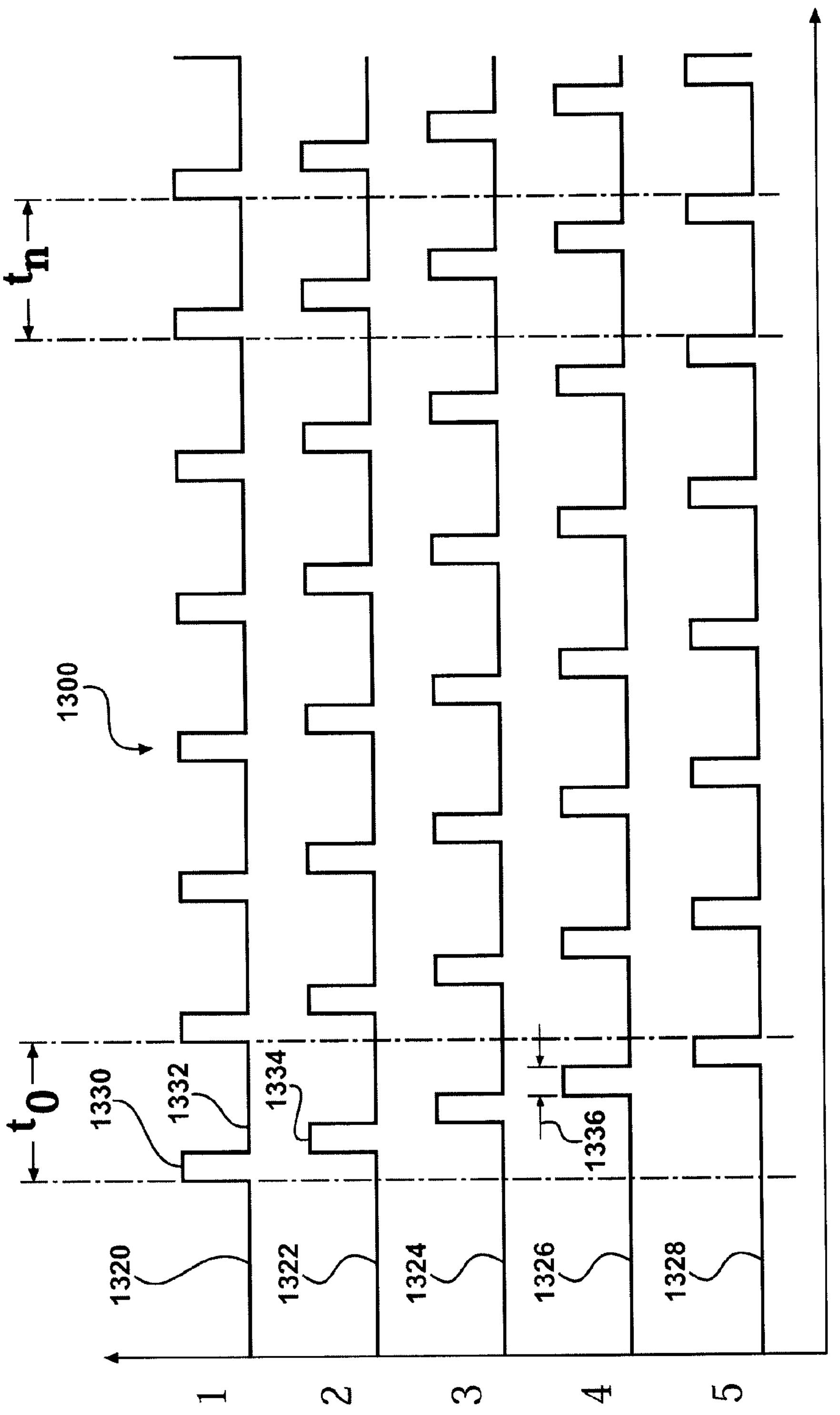
FIG. 30 is a schematic diagram of a pulse train of drive signals for use with the control system of FIG. 29.

FIG. 30 shows the a pulse train 1300 of drive signals 1320, 1322, 1324, 1326, 1328 from control circuit 1210 to the bases of transistors 1220, 1222, 1224, 1226, 1228. When the drive is a logical one (1), e.g. Vcc, then the respective transistor 1320, 1322, 1324, 1326, 1328 is switched to a conducting state (on) and current flows through the associated heating element. When the drive is a logical zero (0), e.g. ground, then the respective transistor 1320, 1322, 1324, 1326, 1328 is switched to a non-conducting state (off). Thus, current does not flow through the associated heating element.

As shown by pulse train 1300, heating elements 1130*a*-1130*f* of heater circuit 1214 are switched on and off in periodic intervals. Pulse train 1300 is divided into time periods starting with time period to through $t_0$, and is generally periodic. Looking in detail with respect to time period $t_0$, drive signals 1320, 1322, 1324, 1326, 1328 are respectively connected to the bases of transistors 1220, 1222, 1224, 1226, 1228 to provide on/off control. For example, when drive signal 1320 has a high signal level, e.g. Vcc, transistor 1220 is switched to the conducting state, e.g. on. When transistor 1220 is switched on, current flows from Vcc through the associated heating element and to ground 1242 through transistor 1220. In this way, each transistor 1220, 1222, 1224, 1226, 1228 controls its respective heating element.

Pulse train 1300 at time period to shows that each transistor 1220, 1222, 1224, 1226, 1228 is switched on sequentially. For example, at the start of time period to, transistor 1220 is switched on 1330. Thereafter, transistor 1220 is switched off 1332 and transistor 1222 is switched on 1334. The cycle continues through time period to where each transistor 1220, 1222, 1224, 1226, 1228 is switched on and off for a predetermined time 1336. As shown by pulse train 1300, the cycle of on and off switching of transistors 1220, 1222, 1224, 1226, 1228 is periodic while main switch 1240 is closed.

As shown in pulse train 1300, the switching on of each transistor 1220, 1222, 1224, 1226, 1228 is performed in a non-overlapping fashion. That is to say, only one transistor 1220, 1222, 1224, 1226, 1228 is switched on at any given time. In this way, related to the method of heating described above, a lower output battery may be used to drive the heated article as compared to an article having heating regions that cannot be individually or selectively operated. Thus, the zone-based heated article in combination with a controller described herein allows for greater flexibility of applications, designs, and portability. If, for example, all heating elements are switched on at the same time then a large output battery would be required. However, if a controller (such as controller 1210) is used to individually switch heating zones or heating elements, a comparatively lower output battery is required because comparatively smaller regions are being heated individually in a non-overlapping manner. In this way, a zone-based article heating configuration allows for smaller, lighter weight, and more portable batteries to be used. Additionally, the zone-based article heating allows for lower voltage sources to be used.

The driving scheme allows controller 1210 to regulate the power delivered to each of heating elements 1130*a*-1130*f*. Moreover, control circuit 1210 may increase or decrease the power to each of heating elements 1130*a*-1130*f* depending upon current sense signal 1250 from current sense circuit 1212 and current sense resistors 1230, 1232, 1234, 1236, 1238. If, for example, current is lower than a predetermined threshold for a particular heating element 1130*a*-1130*f*, controller 1210 may activate the associated transistor 1220, 1222, 1224, 1226, 1228 for a longer duration. However, if for example current is too high through a particular heating element 1130*a*-1130*f*, controller 1210 may reduce the current flowing through heating elements 1130*a*-1130*f* by reducing the duty cycle. Alternatively, controller 1210 may determine that the heating element should no longer be driven and may disable the drive for that heating element.

Figure 31:
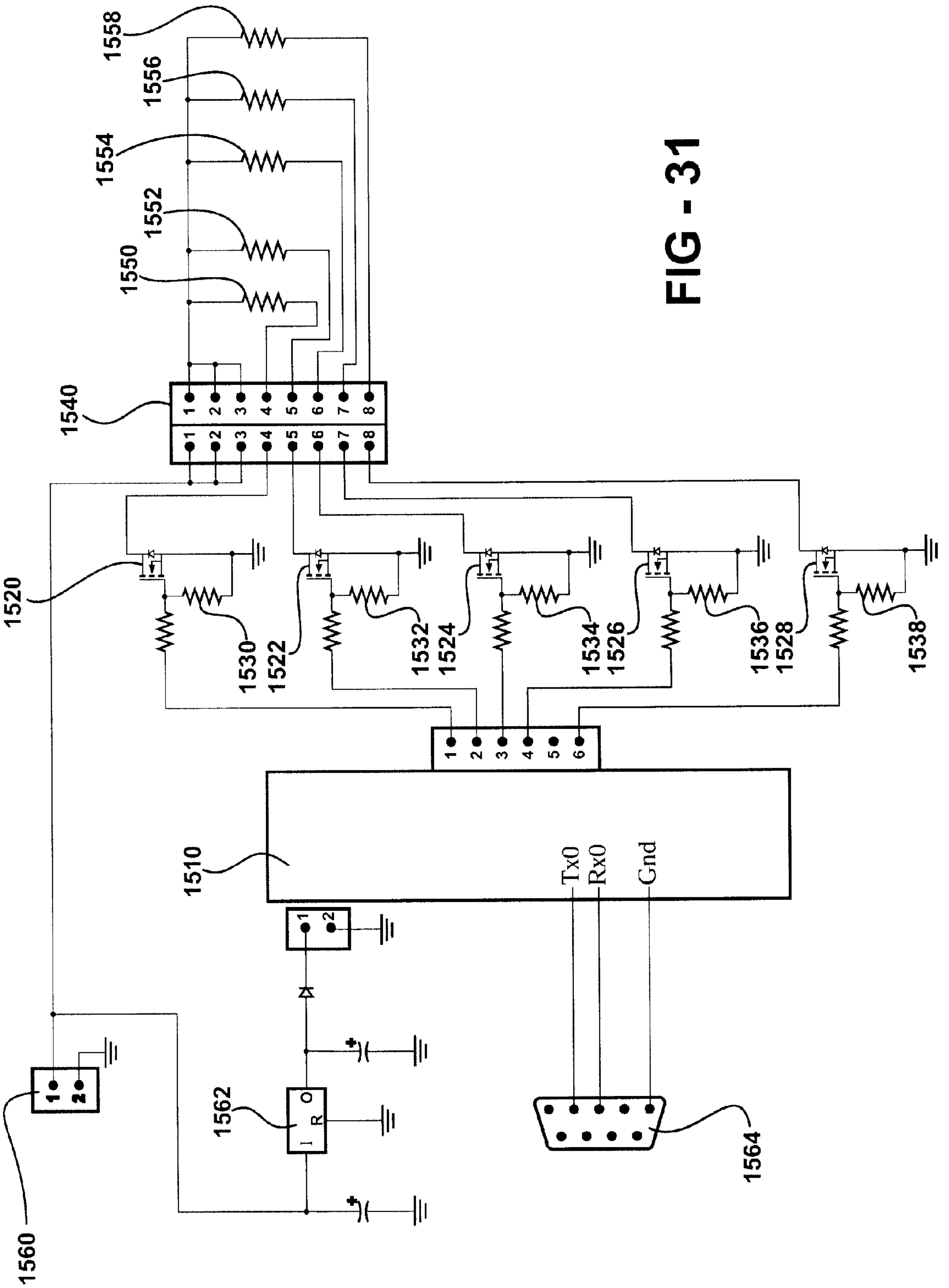
FIG. 31 is a schematic diagram of another heater circuit of a control system for driving a plurality of heating elements.

FIG. 31 shows an alternative driving circuit 1500 for multiple heating elements 1130*a*-1130*f*. Driving circuit 1500 includes a microcontroller 1510, a plurality of MOSFETs 1520, 1522, 1524, 1526, 1528 (metal-oxide semiconductor field-effect transistors), a plurality of pull-down resistors 1530, 1532, 1534, 1536, 1538, a connector 1540, heating elements 1550, 1552, 1554, 1556, 1558, a battery input 1560, a voltage regulator 1562, and a serial port 1564. Driving circuits similar to driving circuit 1500 may be used with heater embodiments described above, including for example those described in FIGS. 12-18 and 28.

Microcontroller 1510 is used to control the conduction of MOSFETs 1520, 1522, 1524, 1526, 1528 to power heating elements 1550, 1552, 1554, 1556, 1558. MOSFETs 1520, 1522, 1524, 1526, 1528 are N-type and are used in a low-side drive configuration to switch heating elements 1550, 1552, 1554, 1556, 1558. Pull-down resistors 1530, 1532, 1534, 1536, 1538 are used to prevent MOSFETs 1520, 1522, 1524, 1526, 1528 from conducting when no signal is present at the gate. This allows microcontroller 1510 to use a high voltage level to switch each MOSFETs 1520, 1522, 1524, 1526, 1528 on to a conducting state, e.g. on. Moreover, microcontroller 1510 may set the gate drives to a high-impedance (open) state, e.g. High-Z state, when switching MOSFETs 1520, 1522, 1524, 1526, 1528 to a non-conducting state, e.g. off. In this way, microcontroller 1510 does not have to drive an output low, e.g. to ground, to switch MOSFETs 1520, 1522, 1524, 1526, 1528 off. Rather, pull-down resistors 1530, 1532, 1534, 1536, 1538 switch off MOSFETs 1520, 1522, 1524, 1526, 1528. Additionally, each of MOSFETs 1520, 1522, 1524, 1526, 1528 switches a heating zone. A single heating zone may be switched on at any given time, or alternatively, a plurality of heating zones may be switched on as determined programmatically by microcontroller 1510 and/or based on a user input.

Voltage regulator 1564 is used to reduce the voltage at battery input 1560 to a five volt (5 v) level to operate microcontroller 1510. Unless microcontroller 1510 is designed to withstand higher voltages, voltage regulator 1564 reduces the voltage to normal operating conditions of microcontroller 1510 to prevent damage to the circuits of microcontroller 1510.

Battery input 1560 is intended for connection to a battery, e.g. a lithium-polymer battery at twenty four volts (24 v). The positive terminal of battery input 1560 is connected to the common bus connections of connector 1540 for supplying power to heating elements 1550, 1552, 1554, 1556, 1558 and is further connected to the input of voltage regulator 1562 for supplying power to microcontroller 1510. A preferred range of voltage for battery input 1560 is about seven volts to about thirty volts (7 v-30 v). By inputting seven volts (7 v) as a minimum, this allows voltage regulator 1562 to regulate a five volt (5 v) level efficiently. Connector 1540 allows for connection of a battery and control electronics module (not shown) to be easily attached to a heated garment or pad. Serial port 1564 may be used to program microcontroller 1510 with instructions on how to control the heaters, as well as specific calibrations related to the material and driving of heating elements 1130*a*-1130*f*. Such programming may be performed during manufacturing.

Microcontroller 1510 is essentially operating in an open-loop configuration. In contrast to heater circuit 1200 of FIG. 29, alternative driving circuit 1500 does not include current sense resistors. Thus, microcontroller 1510 is essentially operating to a predetermined heating program. However, such a heating program does not necessarily limit driving circuit 1500 to a simple driving scheme. For example, microcontroller 1510 has the ability to keep time. Thus, the driving of heating elements 1550, 1552, 1554, 1556, 1558 may include a time-based element and/or a power determination. In this way, microcontroller 1510 may begin a heating program with increased driving time to pre-heat heating elements 1550, 1552, 1554, 1556, 1558, e.g. using a look-up table, to a preferred operating range and then reduce power to maintain warmth over long durations.

Moreover, microcontroller 1510 may sense the input voltage at battery connector 1560 and adjust the driving scheme of heating elements 1550, 1552, 1554, 1556, 1558 accordingly. For example, if the input voltage at battery connector 1560 is seven volts (7 v) then the driving time for each of heating elements 1550, 1552, 1554, 1556, 1558 may be a first duration. In contrast if the input voltage at battery connector 1560 is thirty volts (30 v) then the driving time for each of heating elements 1550, 1552, 1554, 1556, 1558 may be reduced to a second duration because the amount of driving current is higher than with the seven volt (7 v) input.

In an exemplary embodiment, the battery voltage at battery connector 1560 is twelve volts (12 v). The heating element resistances are six ohms (6Ω) for each of heating elements 1550, 1552, 1554, 1556, 1558. Microcontroller 1510 may then drive the heating elements 1550, 1552, 1554, 1556, 1558 in a one hundred millisecond (100 ms) cycle corresponding a time period set by to of FIG. 30. Microcontroller 1510 is programmed, either as an initial state, or through user inputs (shown in FIG. 16A as inputs 1580). In a predetermined programming mode, microcontroller 1510 activates heating elements 1550, 1552, 1554, 1556 for ten milliseconds (10 ms) in a first time period. The power drain during the first driving cycle is twenty four watts (24 w). The second time period includes operating heating elements 1550, 1558 for forty milliseconds (40 ms). The power drain during the second driving cycle is twelve watts (12 w). For the remaining fifty milliseconds (50 ms) of the set by to heating elements 1550, 1552, 1554, 1556, 1558 are switched off. Thus, the current draw is nearly zero and is based on voltage regulator 1562 and microcontroller 1510.

In open loops systems, a look-up table may be used to provide the necessary power switching to heating elements 1550, 1552, 1554, 1556, 1558 at a predetermined duty cycle to achieve the desired results. Alternatively, a calculation may be performed to determine the preferred operating conditions. The look up table and/or calculation may take into account conditions such as battery voltage, duration activated, loop resistance of heating elements 1550, 1552, 1554, 1556, 1558, etc.

With respect to FIGS. 28-31 discussed above, heater 1100 is discussed as a generic switchable heater having multiple separately controllable heating elements. However, it is understood that the control embodiments discussed with respect to FIGS. 29-31 are applicable to the other heating embodiments described herein, and their equivalents. For example, FIGS. 12-16 are simply integrated with either system of FIGS. 29-31.

FIG. 32 depicts an embodiment of a control module housing 800 and battery housing showing spring contacts 802, 804, 806 for interfacing heated articles, e.g. glove 700 of FIG. 17 and the other embodiments of a heated article discussed herein. Housing 800 may contain the control circuits described above with respect to control circuit 1210 of FIG. 29, and driving circuit 1500 of FIG. 31. Moreover, housing 800 may contain batteries for powering the control circuits and/or directly driving heating elements. The battery may be a typical alkaline, nickel cadmium (NiCd), nickel metal hydride (NiMh), lithium ion (Li-Ion), lithium polymer (LiPo), or other battery chemistry. Moreover, housing 800 may be able to receive external power based on an alternating current (AC) source or a direct current (DC) source.

FIG. 33 depicts an alternative view of control module housing 800 of FIG. 32 showing a pressure surface for the spring contacts to interface the heated article. A printed circuit board 860 (PCB) or other substrate may carry electronics associate with a control circuit.

A front opening 862 receives conductive sections on a heated article. Preferably, the conductive sections are on a "tail" of a garment. Moreover, the conductive sections line up with spring contacts 802, 804, 806. A battery, as described above, may be contained in a battery area 870.

Referring now to both FIGS. 32 and 33, housing 800 further includes a spring contact holder 810 that provides a surface for spring contacts 802, 804, 806 to press against. Spring contact holder 810 is located inside housing 800 behind a door 822 that is snapped open and closed. Spring contacts 802, 804, 806 are illustrated here as only three (3) individual contacts. However, contacts of any number may be included in housing 800. For example, the heated article of FIG. 28 includes seven (7) contacts. The article of FIG. 15 includes five (5) contacts. In yet another example the heated glove 700 of FIG. 17 includes four (4) contacts to the control module.

In connecting housing 800 to a heated article, door 822 must be released and the tail including the conductive sections placed in line with spring contacts 802, 804, 806. The opening and closing action takes place where a snap 840 interfaces with a receiving slot 844. Similarly, snap 842 is received by a slot (not shown). When door 822 is closed, pins 830 and 832 line up and protrude through locating holes 834, 836 to orient spring contact holder 810 and then seat in holes 850, 852 in door 822. If housing 800 is to be removed, for example for washing of the heated article, the user presses snaps 840, 842 to release them from slots 844. Once pressure is relieved, the conductive sections on the "tail" of the heated article may be removed from slot 862.

In one embodiment, the electrical components making up a controller module, i.e., the components for powering the heating circuits and/or reading user inputs, may be located on spring contact holder 810. Thus, spring contacts 802, 804, 806 may directly and electrically engage the conductive sections of the heated article. In this case, the contacts are beryllium copper electrical contacts as a high conductivity and high strength alloy. If however, PCB 860 contains the electrical components of the controller module, spring contacts 802, 804, 806 may merely push the conductive sections of the heated article against electrical pads on PCB 860 arranged in-line with spring contacts 802, 804, 806. Moreover, in another embodiment, housing 800 may include an external power interface for receiving a current to charge the battery housed in battery area 870.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A composite heating element suitable for heating an article when activated by a power source, said composite heating element comprising:

a first backing layer;

a discontinuous circuit formed of a conductive material disposed on said first backing layer with said discontinuous circuit having terminal ends for electrical connection with the power source and defining at least one gap between said terminal ends;

a second backing layer spaced from said first backing layer; and a trace formed of a conductive material disposed on said second backing layer and aligned with said at least one gap for forming a complete circuit when said first and second backing layers at least partially abut each other with said trace extending across said gap and contacting said discontinuous circuit.

2. A composite heating element as set forth in claim 1 wherein said discontinuous circuit includes at least one pair of opposing terminals creating a break in said discontinuous circuit and defining said gap.

3. A composite heating element as set forth in claim 2 wherein said trace includes at least one pair of opposing trace terminals aligned with said terminals of said discontinuous circuit for engaging said terminals of said discontinuous circuit.

4. A composite heating element as set forth in claim 1 wherein said conductive material of said discontinuous circuit and said trace are each formed from a conductive ink composition.

5. A composite heating element as set forth in claim 4 wherein each of said conductive ink compositions comprise a plastisol component and a conductive component.

6. A composite heating element as set forth in claim 5 wherein said conductive component comprises a conductive material selected from the group of silver particles, nickel particles, iron particles, stainless steel particles, graphite particles, carbon particles, carbon nanotubes, conductive polymer, gold particles, platinum particles, palladium particles, copper particles, zinc particles, aluminum particles, silver-coated glass particles, silver coated-copper particles, silver-coated nickel particles, and combinations thereof.

7. A composite heating element as set forth in claim 5 wherein said plastisol component comprises a polyvinyl chloride resin and a plasticizer.

8. A composite heating element as set forth in claim 5 wherein at least one of said conductive ink compositions further comprises a solvent component.

9. A composite heating element as set forth in claim 4 wherein each of said first and second backing layers are formed of a dielectric material.

10. A composite heating element as set forth in claim 9 wherein at least one of said dielectric materials comprises a plastisol.

11. A composite heating element as set forth in claim 1 further comprising a first dielectric layer disposed over said discontinuous circuit opposite said first backing layer and having at least one aperture aligned with said at least one gap for allowing said trace to contact said discontinuous circuit when said first and second backing layers are compressed.

12. A composite heating element as set forth in claim 11 further comprising a second dielectric layer disposed over at least a portion of said trace opposite said second backing layer with a remaining portion of said trace being exposed for allowing said trace to contact said discontinuous circuit when said first and second backing layers are compressed.

13. A composite heating element as set forth in claim 1 wherein said conductive material of said discontinuous circuit is different than said conductive material of said trace.

14. A composite heating element as set forth in claim 1 wherein each of said conductive materials of said discontinuous circuit and said trace are formed from at least one of a metal, a conductive polymer, a conductive ink composition, a conductive fabric, a conductive thread, and combinations thereof.

15. A composite heating element suitable for heating an article when activated by a power source, said composite heating element comprising:

a first backing layer formed of a dielectric material;

a discontinuous circuit formed from a conductive ink composition disposed on said first backing layer with said discontinuous circuit having terminal ends for electrical connection with the power source and defining at least one gap between said terminal ends;

a second backing layer spaced from said first backing layer; and a trace formed from a conductive material disposed on said second backing layer and aligned with said at least one gap for forming a complete circuit when said first and second backing layers at least partially abut each other with said trace extending across said gap and contacting said discontinuous circuit.

16. A composite heating element as set forth in claim 15 wherein said conductive ink composition of said discontinuous circuit comprises a plastisol component and a conductive component.

17. A composite heating element as set forth in claim 16 wherein said dielectric material of said first backing layer comprises a plastisol.

18. A composite heating element as set forth in claim 15 wherein said conductive material of said trace is formed from at least one of a metal, a conductive polymer, a conductive ink composition, a conductive fabric, and combinations thereof.

19. An article capable of being heated when activated by a power source, said article comprising:

a substrate, a first backing layer, a discontinuous circuit formed of a conductive material disposed on said first backing layer with said discontinuous circuit having terminal ends for electrical connection with the power source and defining at least one gap between said terminal ends, a second backing layer spaced from said first backing layer with said second backing layer coupled to said substrate, and a trace formed of a conductive material disposed on said second backing layer and aligned with said at least one gap for forming a complete circuit when said first and second backing layers abut each other with said trace extending across said gap and contacting said discontinuous circuit.

20. An article set forth in claim 19 wherein said discontinuous circuit includes at least one pair of opposing terminals creating a break in said discontinuous circuit and defining said gap.

21. An article as set forth in claim 19 wherein said trace includes at least one pair of opposing trace terminals aligned with said terminals of said discontinuous circuit for engaging said terminals of said discontinuous circuit.

22. An article as set forth in claim 19 wherein each of said conductive ink compositions of said discontinuous circuit and said trace comprise a plastisol component and a conductive component.

23. An article as set forth in claim 19 wherein said conductive component comprises a conductive material selected from the group of silver particles, nickel particles, iron particles, stainless steel particles, graphite particles, carbon particles, carbon nanotubes, conductive polymer, gold particles, platinum particles, palladium particles, copper particles, zinc particles, aluminum particles, silver-coated glass particles, silver coated-copper particles, silver-coated nickel particles, and combinations thereof.

24. An article as set forth in claim 19 wherein each of said first and second backing layers are formed of a dielectric material with said dielectric material comprising a plastisol.

25. An article as set forth in claim 19 wherein said article is selected from the group of jackets, vests, shirts, pants, shorts, bibs, coveralls, seats, mattresses, mattress-pads, pads, sleeping-bags, shoes, boots, ski-boots, snowboard-boots, waders, socks, mittens, gloves, hats, scarves, headbands, ear-muffs, underwear, bandages, neck-gators, face-masks, balaclavas, wetsuits, drysuits, hoods, helmets, wraps, bandages, sheets, blankets, pillows, pillow-cases, comforters, duvet-covers, bags, containers, carpet, flooring, wallboards, and ceiling tiles.

* * * * *